(12) United States Patent
Shimizu et al.

(10) Patent No.: US 11,843,833 B2
(45) Date of Patent: *Dec. 12, 2023

(54) BROADCAST RECEIVING APPARATUS

(71) Applicant: MAXELL, LTD., Kyoto (JP)

(72) Inventors: Takuya Shimizu, Kyoto (JP);
Kazuhiko Yoshizawa, Kyoto (JP);
Yasunobu Hashimoto, Kyoto (JP);
Nobuo Masuoka, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,993

(22) Filed: Jul. 22, 2022

(65) Prior Publication Data
US 2022/0400315 A1 Dec. 15, 2022

Related U.S. Application Data

(63) Continuation of application No. 17/239,736, filed on Apr. 26, 2021, now Pat. No. 11,438,661, which is a
(Continued)

(30) Foreign Application Priority Data

Jun. 7, 2016 (JP) .................................. 2016-113529
Jun. 15, 2016 (JP) .................................. 2016-119027
(Continued)

(51) Int. Cl.
*H04N 21/4627* (2011.01)
*G06F 3/14* (2006.01)
(Continued)

(52) U.S. Cl.
CPC ....... *H04N 21/4627* (2013.01); *G06F 3/1454* (2013.01); *H04H 60/13* (2013.01);
(Continued)

(58) Field of Classification Search
CPC ........ G06F 3/1454; G09G 5/14; H04H 60/13; H04H 60/18; H04H 60/23; H04H 60/27;
(Continued)

(56) References Cited

U.S. PATENT DOCUMENTS

| 4,750,053 A | 6/1988 | Allen |
| 6,914,637 B1 | 7/2005 | Wolf et al. |

(Continued)

FOREIGN PATENT DOCUMENTS

| CN | 105681882 | 6/2016 |
| JP | 2001-186486 | 7/2001 |

(Continued)

OTHER PUBLICATIONS

Digital Transmission Licensing Administrator, DTCP2, Presentation to CPTWG, Jan. 27, 2016.
(Continued)

*Primary Examiner* — Michael B. Pierorazio
(74) *Attorney, Agent, or Firm* — Mattingly & Malur, PC

(57) ABSTRACT

In a broadcast receiving apparatus including: a broadcast receiving unit configured to receive control information regarding contents of digital broadcasting and content protection for the contents; an accumulation unit configured to accumulate the contents received by the broadcast receiving unit; a video output unit configured to output video of the contents received by the broadcast receiving unit or video of the contents accumulated by the accumulation unit to external equipment; an interface; and a control unit, switching of content protecting processes are executed in accordance with the number of pixels of video of contents in a first video outputting process state to output contents to external equipment without accumulation, a second video outputting process state to output contents to external equipment after an (Continued)

accumulating process, a copying process state, and a moving process state, and control is executed.

9 Claims, 49 Drawing Sheets

Related U.S. Application Data continuation of application No. 16/884,235, filed on May 27, 2020, now Pat. No. 11,019,400, which is a continuation of application No. 16/307,496, filed as application No. PCT/JP2017/020106 on May 30, 2017, now Pat. No. 10,715,868.

(30) Foreign Application Priority Data

| Jun. 16, 2016 | (JP) | 2016-119505 |
|---|---|---|
| Jun. 17, 2016 | (JP) | 2016-120411 |
| Jun. 20, 2016 | (JP) | 2016-121862 |

(51) Int. Cl.
| | |
|---|---|
| *H04H 60/18* | (2008.01) |
| *H04N 21/44* | (2011.01) |
| *H04N 21/6377* | (2011.01) |
| *H04N 5/913* | (2006.01) |
| *H04H 60/13* | (2008.01) |
| *H04N 5/765* | (2006.01) |
| *H04H 60/27* | (2008.01) |
| *H04N 21/433* | (2011.01) |

(52) U.S. Cl.
CPC ............ *H04H 60/18* (2013.01); *H04H 60/27* (2013.01); *H04N 5/765* (2013.01); *H04N 5/913* (2013.01); *H04N 21/44* (2013.01); *H04N 21/6377* (2013.01); *H04N 21/433* (2013.01)

(58) Field of Classification Search
CPC ...... H04N 5/765; H04N 5/913; H04N 21/433; H04N 21/4345; H04N 21/435; H04N 21/44; H04N 21/462; H04N 21/4627; H04N 21/6377; H04N 21/6582
See application file for complete search history.

(56) References Cited

U.S. PATENT DOCUMENTS

| | | | |
|---|---|---|---|
| 7,131,004 | B1 | 10/2006 | Lyle |
| 7,179,980 | B2 | 2/2007 | Kirkeby et al. |
| 7,242,766 | B1 | 7/2007 | Lyle |
| 7,499,462 | B2 | 3/2009 | MacMullan et al. |
| 8,213,768 | B2 | 7/2012 | Morioka et al. |
| 8,479,236 | B2 | 7/2013 | Tao |
| 8,744,230 | B2 | 6/2014 | Hovagim et al. |
| 9,848,218 | B2 | 12/2017 | Oh |
| 9,912,903 | B2 | 3/2018 | Kozuka et al. |
| 10,291,879 | B2 | 5/2019 | Kozuka et al. |
| 10,298,972 | B2 | 5/2019 | Oh |
| 10,455,189 | B2 | 10/2019 | Kozuka et al. |
| 10,664,624 | B2 | 5/2020 | Luo et al. |
| 10,694,229 | B2 | 6/2020 | Oh |
| 10,715,868 | B2 * | 7/2020 | Shimizu ............... H04H 60/23 |
| 11,019,400 | B2 * | 5/2021 | Shimizu ............... H04H 60/27 |
| 11,438,661 | B2 * | 9/2022 | Shimizu ............... H04N 5/913 |
| 2001/0005236 | A1 | 6/2001 | Nakada et al. |
| 2005/0066356 | A1 | 3/2005 | Stone et al. |
| 2005/0268323 | A1 | 12/2005 | Yamaguchi et al. |
| 2006/0031889 | A1 | 2/2006 | Bennett et al. |
| 2007/0237332 | A1 | 10/2007 | Lyle |
| 2007/0274348 | A1 | 11/2007 | Friedman et al. |
| 2008/0077998 | A1 | 3/2008 | Hirosawa et al. |
| 2008/0180518 | A1 | 7/2008 | Miyazaki |
| 2008/0292286 | A1 | 11/2008 | Noguchi et al. |
| 2008/0307496 | A1 | 12/2008 | Kurose |
| 2009/0040287 | A1 * | 2/2009 | Miyazaki ........... H04N 21/4367 |
| | | | 348/14.01 |
| 2009/0287940 | A1 * | 11/2009 | Carr .................... H04L 63/0428 |
| | | | 713/189 |
| 2010/0037253 | A1 | 2/2010 | Sheehan et al. |
| 2010/0299264 | A1 | 11/2010 | Berger et al. |
| 2010/0322417 | A1 | 12/2010 | Altmann |

FOREIGN PATENT DOCUMENTS

| | | |
|---|---|---|
| JP | 2002-262252 | 9/2002 |
| JP | 2004-336576 | 11/2004 |
| JP | 2005-354432 | 12/2005 |
| JP | 2008-071472 | 3/2008 |
| JP | 2009-076154 | 4/2009 |
| JP | 2014-147065 | 8/2014 |
| JP | 2015-149680 | 8/2015 |
| JP | 2016-103801 | 6/2016 |
| WO | 2006/095742 | 9/2006 |
| WO | 2015/194102 | 12/2015 |

OTHER PUBLICATIONS

International Search Report of PCT/JP2017/020106 dated Sep. 5, 2017.
Notice of Reasons for Refusal issued in corresponding Japanese Patent Application No. 2016-113529 dated Jul. 28, 2020.
Notice of Reasons for Refusal issued in corresponding Japanese Patent Application No. 2016-119505 dated Jul. 28, 2020.

\* cited by examiner (*AU: ACCESS UNIT)

FIG. 3
(A)
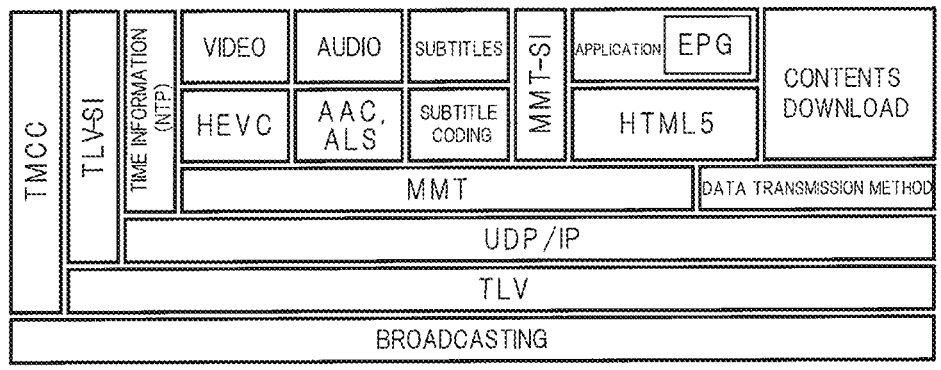
(*TMCC: Transmission and Multiplexing Configuration Control)
(B)
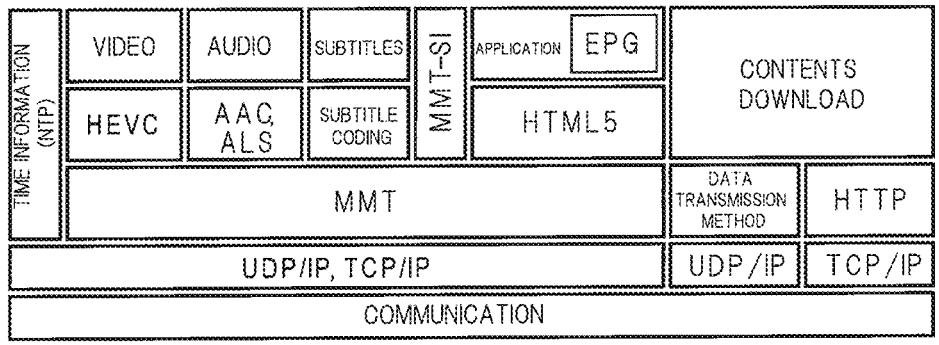
FIG. 4
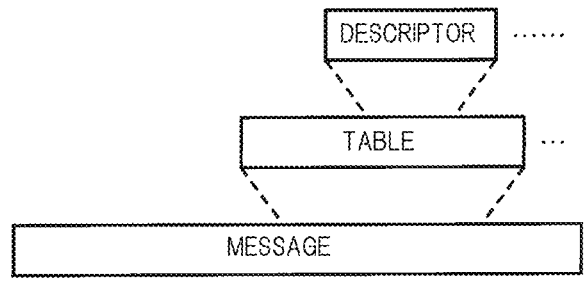

FIG. 5A

| Table Name | Outline of Function |
|---|---|
| Network Information Table for TLV (TLV-NIT) | Transmitting information that correlates information of a transmission path such as a modulation frequency with a broadcasting program in TLV packet transmission |
| Address Map Table (AMT) | Transmitting information that correlates a service identifier for identifying a broadcasting program number with an IP packet |
| Table Set by Provider | |

FIG. 5B

| Descriptor Name | Outline of Function |
|---|---|
| Service List Descriptor | Describing a list of sub-channels and types of the sub-channels |
| Satellite Delivery System Descriptor | Describing physical conditions for a satellite transmission path |
| System Management Descriptor | Distinguishing broadcasting and non-broadcasting |
| Network Name Descriptor | Describing a network name |
| Remote Control Key Descriptor | Setting service assigned to one-touch selecting button of remote controller for receiver |
| Descriptor Set by Provider | |

FIG. 6A

| Message Name | Outline of Function |
|---|---|
| Package Access (PA) Message | Serving as an entry point for MMT-SI and transmitting MMT-SI table |
| M2 Section Message | Transmitting section extension format of MPEG-2 Systems |
| CA Message | Transmitting information related to conditional access method |
| M2 Short Section Message | Transmitting section short format of MPEG-2 Systems |
| Data Transmission Message | Transmitting a table related to data transmission |
| Message Set by Provider | |

FIG. 6B

| Table Name | Outline of Function |
|---|---|
| MMT Package Table (MPT) | Providing package configuration information such as a list of assets and locations thereof |
| Package List Table (PLT) | Presenting a list of IP data flows for transmitting PA messages of MMT packages provided as a broadcasting service, packet IDs, and IP data flows for transmitting IP services |
| Layout Configuration Table (LCT) | Correlating layout information for presentation with layout numbers |
| Entitlement Control Message (ECM) | Transmitting common information made up of program information (program data, a descrambling key, etc.) and control information |
| Entitlement Management Message (EMM) | Transmitting personal information including contract information of individual subscribers and a work key for decoding encoded common information |
| CA Table (MH) (Conditional Access Table) | Transmitting a descriptor related to conditional access method |
| Download Control Message (DCM) | Transmitting key-related information including a key for decoding a transmission path code for downloading |
| Download Management Message (DMM) | Transmitting key-related information including a download key for decoding encoded DCM |
| MH-Event Information Table (MH-EIT) | Transmitting program-related information such as program name, broadcasting date, and details of program |
| MH-Application Information Table (MH-AIT) | Transmitting dynamic control information related to application and additional information necessary for execution of the application |
| MH-Broadcaster Information Table (MH-BIT) | Providing information of broadcasters present on the network |
| MH-Software Download Trigger Table (MH-SDTT) | Transmitting download announcement information such as a service ID, schedule information, and the type of a receiver to be updated |
| MH-Service Description Table (MH-SDT) | Transmitting information related to a sub-channel such as the name of the sub-channel and the name of a broadcaster |
| MH-Time Offset Table (MH-TOT) | Transmitting current date/time and offset time between the actual time and display time to human system |
| MH-Common Data Table (MH-CDT) | Transmitting data such as logo mark of provider that is necessary for receivers in common and is assumed to be stored in a non-volatile memory |
| Data Directory Management (DDM) Table | Providing directory configuration of files making up an application |
| Data Asset Management (DAM) Table | Providing the configuration of MPU in an asset and version information of each MPU |
| Data Content Configuration (DCC) Table | Providing configuration information of files as data contents |
| Event Message Table (EMT) | Transmitting information related to event message |
| Table Set by Provider | |

FIG. 6C

| Descriptor Name | Outline of Function |
|---|---|
| Asset Group Descriptor | Providing a relation of an asset group and priority in the group |
| Event Package Descriptor | Providing the corresponding relation between an event representing a program and a package |
| Background Color Specifying Descriptor | Specifying the background color of the rearmost plane in layout specification |
| MPU Presentation Region Specifying Descriptor | Providing the location of presentation of MPU |
| MPU Timestamp Descriptor | Providing the time of presentation of MPU |
| Dependency Relation Descriptor | Providing asset IDs for assets dependent on each other |
| Access Control Descriptor | Identifying the conditional access method |
| Scramble Method Descriptor | Identifying a scramble subsystem |
| Message Authentication Method Descriptor | Identifying a message authentication method |
| Emergency Information Descriptor (MH) | Providing description of information and functions necessary as emergency warning signal |
| MH-MPEG-4 Audio Descriptor | Describing basic information for specifying coding parameters of an MPEG-4 audio stream |
| MH-MPEG-4 Audio Extension Descriptor | Describing a profile, level, and specific setting of coding method of an MPEG-4 audio stream |
| MH-HEVC Video Descriptor | Describing basic coding parameters for a video stream (HEVC stream) defined in ITU-T Recommendation H.265 and ISO/IEC 23008-2 |
| MH-Link Descriptor | Describing link with another sub-channel |
| MH-Event Group Descriptor | Describing information on grouping of a plurality of events |
| MH-Service List Descriptor | Describing a list of sub-channels and their types |
| MH-Short Format Event Descriptor | Describing a program name and a brief description of the program |
| MH-Extension Format Event Descriptor | Describing detailed information of a program |
| Video Component Descriptor | Describing parameters and descriptions for a video signal among program element signals |
| MH-Stream Identifying Descriptor | Identifying individual program element signals |
| MH-Content Descriptor | Describing the genre of a program |
| MH-Parental Rate Descriptor | Describing an age-based viewing restriction |
| MH-Audio Component Descriptor | Describing parameters for an audio signal among program element signals |
| MH-Target Area Descriptor | Describing a target area |
| MH-Series Descriptor | Describing series information across a plurality of events |
| MH-SI Transmission Parameter Descriptor | Describing SI transmission parameters (cycle group, retransmission cycle, etc.) |
| MH-Broadcaster Name Descriptor | Describing the name of a broadcaster |
| MH-Service Descriptor | Describing the name of a sub-channel and the name of a provider thereof |
| IP Data Flow Descriptor | Describing information of an IP data flow included in a service |

FIG. 6D

| Descriptor Name | Outline of Function |
|---|---|
| MH-CA Startup Descriptor | Describing information related to start of a CAS program having a conditional access function |
| MH-Type Descriptor | Indicating the type of a file transmitted by an application transmission method |
| MH-Info Descriptor | Describing information related to MPU or an item |
| MH-Expire Descriptor | Describing the expiration date of an item |
| MH-Compression Type Descriptor | Indicating a compression algorithm for an item to be transmitted in a compressed form and the number of bytes of the item before compression |
| MH-Data Coding Method Descriptor | Identifying a data coding method |
| UTC-NPT Reference Descriptor | Transmitting information of the relation between NPT and UTC |
| Event Message Descriptor | Transmitting general information related to event messages |
| MH-Local Time Offset Descriptor | Describing an offset time between the actual time (e.g., UTC + 9 hours) and display time to human system when a daylight saving time system is implemented |
| MH-Component Group Descriptor | Describing information on grouping of a plurality of components |
| MH-Logo Transmission Descriptor | Describing pointing to a character string for a simplified logo and a logo in a CDT format |
| MPU Extension Timestamp Descriptor | Providing a time to decode an access unit in MPU |
| MPU Download Contents Descriptor | Describing property information of contents downloaded using MPU |
| MH-Network Download Contents Descriptor | Describing property information of contents downloaded through network |
| MH-Application Descriptor | Describing information of an application |
| MH-Transmission Protocol Descriptor | Specifying a transmission protocol and describing location information of an application depending on the transmission protocol |
| MH-Simplified Application Location Descriptor | Describing the details of an acquisition destination of an application |
| MH-Application Boundary Authority Setting Descriptor | Describing setting of an application boundary and setting of an authority for access to broadcasting resources for each region (URL) |
| MH-Startup Priority Information Descriptor | Describing the startup priority of an application |
| MH-Cache Information Descriptor | Describing information of cache control for saving resources making up an application in a cache |
| MH-Probability Applied Delay Descriptor | Describing setting of a delay time by which the time of execution of application control is probabilistically delayed |
| Link Destination PU Descriptor | Describing information of a presentation unit to be link destination |
| Lock Cache Specifying Descriptor | Describing specification of a file to be cached and locked |
| Unlock Cache Specifying Descriptor | Describing specification of a file to be unlocked |

FIG. 6E

| Descriptor Name | Outline of Function |
|---|---|
| MH-download protection descriptor | Describing location information and transmission information of an MMTP packet to transmit a DCM and/or a DMM |
| Application service descriptor | Describing entry information and the like of an application related to service |
| MPU node descriptor | Indicating that the MPU corresponds to a directory node defined by a data directory management table |
| PU configuration descriptor | Indicating a list of MPUs making up a presentation unit |
| MH-hierarchical coding descriptor | Describing information for identifying a video stream component that is subjected to hierarchical coding |
| Contents copy control descriptor | Indicating control information or the maximum transmission rate regarding digital copy of contents |
| Contents usage control descriptor | Describing control information regarding accumulation and output of contents |
| Descriptor Set by Provider | |

FIG. 7B

| DATA STRUCTURE OF MPT | NUMBER OF BITS | DATA NOTATION |
|---|---|---|
| MMT_Package_Table(){ | | |
|     table_id | 8 | uimsbf |
|     version | 8 | uimsbf |
|     length | 16 | uimsbf |
|     reserved | 6 | bslbf |
|     MPT_mode | 2 | bslbf |
|     MMT_package_id_length | 8 | uimsbf |
|     for(i=0; i<N; i++){ | | |
|         MMT_package_id_byte | 8 | bslbf |
|     } | | |
|     MPT_descriptors_length | 16 | uimsbf |
|     for(i=0; i<N; i++){ | | |
|         MPT_descriptors_byte | 8 | bslbf |
|     } | | |
|     number_of_assets | 8 | uimsbf |
|     for(i=0; i<N; i++){ | | |
|         identifier_type | 8 | uimsbf |
|         asset_id_scheme | 32 | uimsbf |
|         asset_id_length | 8 | uimsbf |
|         for(j=0; j<M; j++){ | | |
|             asset_id_byte | 8 | uimsbf |
|         } | | |
|         asset_type | 32 | char |
|         reserved | 7 | bslbf |
|         asset_clock_relation_flag | 1 | bslbf |
|         location_count | 8 | uimsbf |
|         for(j=0; j<M; j++){ | | |
|             MMT_general_location_info() | | |
|         } | | |
|         asset_descriptors_length | 16 | uimsbf |
|         for(j=0; j<M; j++){ | | |
|             asset_descriptors_byte | 8 | bslbf |
|         } | | |
|     } | | |
| } | | |

*FIG. 7C*

| DATA STRUCTURE OF MMT_general_location_info | NUMBER OF BITS | DATA NOTATION |
|---|---|---|
| MMT_general_location_info(){ <br>     location_type <br>     if(location_type == 0x00){ <br>         packet_id <br>     } <br>     if(location_type == 0x01){ <br>         ipv4_src_addr <br>         ipv4_dst_addr <br>         dst_port <br>         packet_id <br>     } <br>     if(location_type == 0x02){ <br>         ipv6_src_addr <br>         ipv6_dst_addr <br>         dst_port <br>         packet_id <br>     } <br>     if(location_type == 0x03){ <br>         network_id <br>         MPEG_2_transport_stream_id <br>         reserved <br>         MPEG_2_PID <br>     } <br>     if(location_type == 0x04){ <br>         ipv6_src_addr <br>         ipv6_dst_addr <br>         dst_port <br>         reserved <br>         MPEG_2_PID <br>     } <br>     if(location_type == 0x05){ <br>         URL_length <br>         for(i=0; i<N; i++){ <br>             URL_byte <br>         } <br>     } <br> } | <br> 8 <br><br> 16 <br><br><br> 32 <br> 32 <br> 16 <br> 16 <br><br><br> 128 <br> 128 <br> 16 <br> 16 <br><br><br> 16 <br> 16 <br> 3 <br> 13 <br><br><br> 128 <br> 128 <br> 16 <br> 3 <br> 13 <br><br><br> 8 <br><br> 8 | <br> uimsbf <br><br> uimsbf <br><br><br> uimsbf <br> uimsbf <br> uimsbf <br> uimsbf <br><br><br> uimsbf <br> uimsbf <br> uimsbf <br> uimsbf <br><br><br> uimsbf <br> uimsbf <br> bslbf <br> uimsbf <br><br><br> uimsbf <br> uimsbf <br> uimsbf <br> bslbf <br> uimsbf <br><br><br> uimsbf <br><br> char |

*FIG. 7D*

| DATA STRUCTURE OF MPU TIMESTAMP DESCRIPTOR | NUMBER OF BITS | DATA NOTATION |
|---|---|---|
| MPU_Timestamp_Descriptor(){ <br>     descriptor_tag <br>     descriptor_length <br>     for(i=0; i<N; i++){ <br>         mpu_sequence_number <br>         mpu_presentation_time <br>     } <br> } | <br> 16 <br> 8 <br><br> 32 <br> 64 | <br> uimsbf <br> uimsbf <br><br> uimsbf <br> uimsbf |

FIG. 7E

| DATA STRUCTURE OF MH-EIT | NUMBER OF BITS | DATA NOTATION |
|---|---|---|
| MH-Event_Information_Table(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     tlv_stream_id | 16 | uimsbf |
|     original_network_id | 16 | uimsbf |
|     segment_last_section_number | 8 | uimsbf |
|     last_table_id | 8 | uimsbf |
|     for(i=0; i<N; i++){ | | |
|         event_id | 16 | uimsbf |
|         start_time | 40 | bslbf |
|         duration | 24 | uimsbf |
|         running_status | 3 | uimsbf |
|         free_CA_mode | 1 | bslbf |
|         descritors_loop_length | 12 | uimsbf |
|         for(j=0; j<M; j++){ | | |
|             descriptor() | | |
|         } | | |
|     } | | |
|     CRC_32 | 32 | rpchof |
| } | | |

FIG. 7F

| DATA STRUCTURE OF EVENT PACKAGE DESCRIPTOR | NUMBER OF BITS | DATA NOTATION |
|---|---|---|
| Event_Package_Descriptor(){ | | |
|     descriptor_tag | 16 | uimsbf |
|     descriptor_length | 8 | uimsbf |
|     MMT_package_id_length | 8 | uimsbf |
|     for(i=0; i<N; i++){ | | |
|         MMT_package_id_byte | 8 | uimsbf |
|     } | | |
| } | | |

FIG. 12B

| DATA STRUCTURE OF NTP FORMAT | NUMBER OF BITS | DATA NOTATION |
|---|---|---|
| Network_Time_Protocol_Data(){ | | |
|     leap_indicator | 2 | uimsbf |
|     version | 3 | uimsbf |
|     mode | 3 | uimsbf |
|     stratum | 8 | uimsbf |
|     poll | 8 | uimsbf |
|     precision | 8 | uimsbf |
|     root_delay | 32 | uimsbf |
|     root_dispersion | 32 | uimsbf |
|     reference_identification | 32 | uimsbf |
|     reference_timestamp | 64 | uimsbf |
|     origin_timestamp | 64 | uimsbf |
|     receive_timestamp | 64 | uimsbf |
|     transmit_timestamp | 64 | uimsbf |
| } | | |

FIG. 12C

| DATA STRUCTURE OF MH-TOT | NUMBER OF BITS | DATA NOTATION |
|---|---|---|
| MH-Time_Offset_Table(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     JST_time | 40 | bslbf |
|     reserved | 4 | bslbf |
|     descriptors_loop_length | 12 | uimsbf |
|     for(i=0; i<N; i++){ | | |
|         descriptor() | | |
|     } | | |
|     CRC_32 | 32 | rpchof |
| } | | |

FIG. 12D

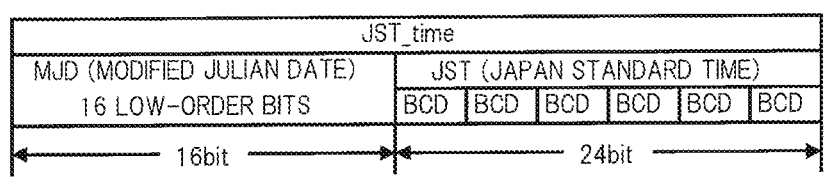

FIG. 12E

| DATA STRUCTURE OF TIME INFORMATION IN TMCC EXTENSION INFORMATION REGION | NUMBER OF BITS | DATA NOTATION |
|---|---|---|
| TMCC_Time_Information (){ <br>    reserved <br>    common_time_indicator <br>    extended_payload_indicator <br>    if(common_time_indicator==0){ <br>        time_flag <br>        for(i=0; i<16; i++){ <br>            delta <br>            transmit_timestamp <br>        } <br>    } <br>    if(common_time_indicator==1){ <br>        reserved <br>        delta <br>        transmit_timestamp <br>    } <br>    next_extended_payload_indicator <br>} | <br>6<br>1<br>1<br><br>16<br><br><br>32<br>64<br><br><br><br><br>16<br>32<br>64<br><br>16 | <br>bslbf<br>bslbf<br>bslbf<br><br>bslbf<br><br><br>simsbf<br>uimsbf<br><br><br><br><br>bslbf<br>simsbf<br>uimsbf<br><br>uimsbf |

FIG. 12F

| FIRST CALCULATION METHOD (MJD IS EQUAL TO OR LARGER THAN 32768) |
|---|
| $Y' = \text{int}[(MJD - 15078.2) / 365.25]$ <br> $M' = \text{int}\{[MJD - 14956.1 - \text{int}(Y' \times 365.25)] / 30.6001\}$ <br> $D = MJD - 14956 - \text{int}(Y' \times 365.25) - \text{int}(M' \times 30.6001)$ <br><br> BUT,    WHEN $M'=14$ OR $15$, $K=1$ <br>            WHEN $M' \neq 14$ AND $15$, $K=0$ <br><br> $Y = Y' + K$ <br> $M = M' - 1 - K \times 12$     Y: NUMBER OF YEARS COUNTED FROM YEAR OF 1900 <br>                                                M: MONTH   D: DAY |

| SECOND CALCULATION METHOD (MJD IS SMALLER THAN 32768) |
|---|
| $Y' = \text{int}[((MJD + 65536) - 15078.2) / 365.25]$ <br> $M' = \text{int}\{[(MJD + 65536) - 14956.1 - \text{int}(Y' \times 365.25)] / 30.6001\}$ <br> $D = (MJD + 65536) - 14956 - \text{int}(Y' \times 365.25) - \text{int}(M' \times 30.6001)$ <br><br> BUT,    WHEN $M'=14$ OR $15$, $K=1$ <br>            WHEN $M' \neq 14$ AND $15$, $K=0$ <br><br> $Y = Y' + K$ <br> $M = M' - 1 - K \times 12$     Y: NUMBER OF YEARS COUNTED FROM YEAR OF 1900 <br>                                                 M: MONTH   D: DAY |

FIG. 13B

| DATA STRUCTURE OF TLV-NIT | NUMBER OF BITS | DATA NOTATION |
|---|---|---|
| TLV_Network_Information_Table(){ | | |
|     table_id | 8 | uimsbf |
|     section_syntax_indicator | 1 | bslbf |
|     '1' | 1 | bslbf |
|     '11' | 2 | bslbf |
|     section_length | 12 | uimsbf |
|     network_id | 16 | uimsbf |
|     '11' | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     network_descriptors_length | 12 | bslbf |
|     for(i=0; i<N; i++){ | | |
|         descriptor() | | |
|     } | | |
|     reserved_future_use | 4 | bslbf |
|     TLV_stream_loop_length | 12 | uimsbf |
|     for(i=0; i<N; i++){ | | |
|         tlv_stream_id | 16 | uimsbf |
|         original_network_id | 16 | uimsbf |
|         reserved_future_use | 4 | bslbf |
|         tlv_stream_descriptors_length | 12 | uimsbf |
|         for(j=0; j<M; j++){ | | |
|             descriptor() | | |
|         } | | |
|     } | | |
|     CRC_32 | 32 | rpchof |
| } | | |

FIG. 13C

| DATA STRUCTURE OF SATELLITE DELIVERY SYSTEM DESCRIPTOR | NUMBER OF BITS | DATA NOTATION |
|---|---|---|
| Satellite_Delivery_System_Descriptor(){ | | |
|     descriptor_tag | 8 | uimsbf |
|     descriptor_length | 8 | uimsbf |
|     frequency | 32 | bslbf |
|     orbital_position | 16 | bslbf |
|     west_east_flag | 1 | bslbf |
|     polarisation | 2 | bslbf |
|     modulation | 5 | bslbf |
|     symbol_rate | 28 | bslbf |
|     FEC_inner | 4 | bslbf |
| } | | |

FIG. 13D

| DATA STRUCTURE OF SERVICE LIST DESCRIPTOR | NUMBER OF BITS | DATA NOTATION |
|---|---|---|
| Service_List_Descriptor(){ <br>    descriptor_tag <br>    descriptor_length <br>    for(i=0; i<N; i++){ <br>        service_id <br>        service_type <br>    } <br>} | <br>8<br>8<br><br>16<br>8 | <br>uimsbf<br>uimsbf<br><br>uimsbf<br>uimsbf |

FIG. 13E

| DATA STRUCTURE OF AMT | NUMBER OF BITS | DATA NOTATION |
|---|---|---|
| Address_Map_Table(){ <br>    table_id <br>    section_syntax_indicator <br>    '1' <br>    '11' <br>    section_length <br>    table_id_extension <br>    '11' <br>    version_number <br>    current_next_indicator <br>    section_number <br>    last_section_number <br>    num_of_service_id <br>    reserved_future_use <br>    for(i=0; i<num_of_service_id; i++){ <br>        service_id <br>        ip_version <br>        reserved_future_use <br>        service_loop_length <br>        if(ip_version=='0'){ <br>            src_address_32 <br>            src_address_mask_32 <br>            dst_address_32 <br>            dst_address_mask_32 <br>        } <br>        else if(ip_version=='1'){ <br>            src_address_128 <br>            src_address_mask_128 <br>            dst_address_128 <br>            dst_address_mask_128 <br>        } <br>        for(j=0; j<M; j++){ <br>            private_data_byte <br>        } <br>    } <br>    CRC_32 <br>} | <br>8<br>1<br>1<br>2<br>12<br>16<br>2<br>5<br>1<br>8<br>8<br>10<br>6<br><br>16<br>1<br>5<br>10<br><br>32<br>8<br>32<br>8<br><br><br>128<br>8<br>128<br>8<br><br><br>8<br><br><br>32 | <br>uimsbf<br>bslbf<br>bslbf<br>bslbf<br>uimsbf<br>uimsbf<br>bslbf<br>uimsbf<br>bslbf<br>uimsbf<br>uimsbf<br>uimsbf<br>bslbf<br><br>uimsbf<br>bslbf<br>bslbf<br>uimsbf<br><br>bslbf<br>uimsbf<br>bslbf<br>uimsbf<br><br><br>bslbf<br>uimsbf<br>bslbf<br>uimsbf<br><br><br>bslbf<br><br><br>rpchof |

FIG. 14C

| DATA STRUCTURE OF PLT | NUMBER OF BITS | DATA NOTATION |
|---|---|---|
| Package_List_Table(){ | | |
|     table_id | 8 | uimsbf |
|     version | 8 | uimsbf |
|     length | 16 | uimsbf |
|     num_of_package | 8 | uimsbf |
|     for(i=0; i<N; i++){ | | |
|         MMT_package_id_length | 8 | uimsbf |
|         for(j=0; j<M; j++){ | | |
|             MMT_package_byte | 8 | bslbf |
|         } | | |
|         MMT_general_location_info() | | |
|     } | | |
|     num_of_ip_delivery | 8 | uimsbf |
|     for(i=0; i<N; i++){ | | |
|         transport_file_id | 32 | uimsbf |
|         location_type | 8 | uimsbf |
|         if(location_type==0x01){ | | |
|             ipv4_src_addr | 32 | uimsbf |
|             ipv4_dst_addr | 32 | uimsbf |
|             dst_port | 16 | uimsbf |
|         } | | |
|         if(location_type==0x02){ | | |
|             ipv6_src_addr | 128 | uimsbf |
|             ipv6_dst_addr | 128 | uimsbf |
|             dst_port | 16 | uimsbf |
|         } | | |
|         if(location_type==0x05){ | | |
|             URL_length | 8 | uimsbf |
|             for(j=0; j<M; j++){ | | |
|                 URL_byte | 8 | char |
|             } | | |
|         } | | |
|         descriptor_loop_length | 16 | uimsbf |
|         for(j=0; j<M; j++){ | | |
|             descriptor() | | |
|         } | | |
|     } | | |
| } | | |

| DATA STRUCTURE OF REMOTE CONTROL KEY DESCRIPTOR | NUMBER OF BITS | DATA NOTATION |
|---|---|---|
| Remote_Control_Key_Descriptor(){ descriptor_tag descriptor_length num_of_remote_control_key_id for(i=0; i< num_of_remote_control_key_id; i++){ remote_control_key_id service_id reserved } } | 8 8 8 8 16 16 | uimsbf uimsbf uimsbf uimsbf uimsbf bslbf |

FIG. 16A (A)

In case of

| NO MULTI PROGRAMMING | CHANNEL NUMBER | KEY ASSIGNMENT |
|---|---|---|
| MAIN CHANNEL | 011 | 1 |
| — | — | — |
| — | — | — |

| OPERATION | CHANNEL SELECTION |
|---|---|
| [1] | Display 011ch |
| [1] → [1] | Display 011ch |
| [1] → [1] → [1] | Display 011ch |
| [1] → [1] → [1] → [1] | Display 011ch |

(B)

In case of

| MULTI PROGRAMMING | CHANNEL NUMBER | KEY ASSIGNMENT |
|---|---|---|
| Main channel | 011 | 1 |
| Sub channel 1 | 012 | Non |
| Sub channel 2 | 013 | Non |

| OPERATION | CHANNEL SELECTION |
|---|---|
| [1] | Display 011ch |
| [1] → [1] | Display 012ch |
| [1] → [1] → [1] | Display 013ch |
| [1] → [1] → [1] → [1] | Display 011ch |

FIG. 16B

| OPERATION | CHANNEL SELECTION |
|---|---|
| [1] | Display main view |
| [1] → [1] | Display sub view 1 |
| [1] → [1] → [1] | Display sub view 2 |
| [1] → [1] → [1] → [1] | Display main view |

FIG. 17A

| DATA STRUCTURE OF LCT | NUMBER OF BITS | DATA NOTATION |
|---|---|---|
| Layout_Configuration_Table(){ | | |
|     table_id | 8 | uimsbf |
|     version | 8 | uimsbf |
|     length | 16 | uimsbf |
|     number_of_loop | 8 | uimsbf |
|     for(i=0; i<N; i++){ | | |
|         layout_number | 8 | uimsbf |
|         device_id | 8 | uimsbf |
|         number_of_region | 8 | uimsbf |
|         for(j=0; j<M; j++){ | | |
|             region_number | 8 | uimsbf |
|             left_top_pos_x | 8 | uimsbf |
|             left_top_pos_y | 8 | uimsbf |
|             right_down_pos_x | 8 | uimsbf |
|             right_down_pos_y | 8 | uimsbf |
|             layer_order | 8 | uimsbf |
|         } | | |
|     } | | |
|     descriptor() | | |
| } | | |

FIG. 17B

| DATA STRUCTURE OF MPU PRESENTATION REGION SPECIFYING DESCRIPTOR | NUMBER OF BITS | DATA NOTATION |
|---|---|---|
| MPU_Presentation_Region_Descriptor(){ | | |
|     descriptor_tag | 16 | uimsbf |
|     descriptor_length | 8 | uimsbf |
|     for(i=0; i<N; i++){ | | |
|         mpu_sequence_number | 32 | uimsbf |
|         layout_number | 8 | uimsbf |
|         region_number | 8 | uimsbf |
|         length_of_reserved | 8 | uimsbf |
|         for(j=0; j<M; j++){ | | |
|             reserved_future_use | 8 | bslbf |
|         } | | |
|     } | | |
| } | | |

FIG. 17C

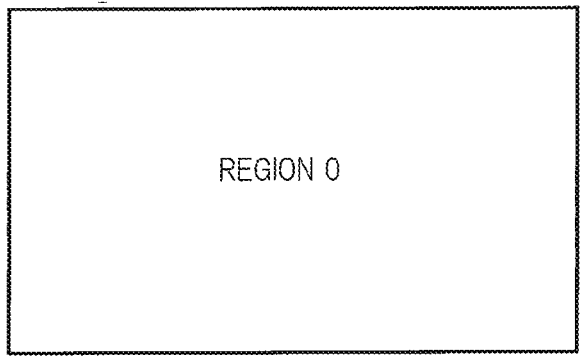

LAYOUT NUMBER: 0

| number_of_loop | | 1 |
|---|---|---|
| | layout_number | 0 |
| | device_id | 0 |
| | number_of_region | 1 |
| | region_number | 0 |
| | left_top_pos_x | 0 |
| | left_top_pos_y | 0 |
| | right_down_pos_x | 100 |
| | right_down_pos_y | 100 |
| | layer_order | 0 |

FIG. 17D

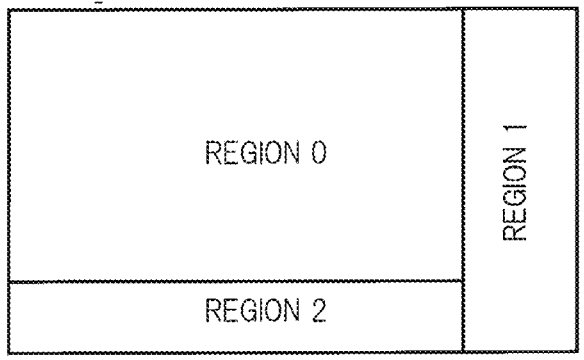

LAYOUT NUMBER: 1

| number_of_loop | | 1 |
|---|---|---|
| | layout_number | 1 |
| | device_id | 0 |
| | number_of_region | 3 |
| | region_number | 0 |
| | left_top_pos_x | 0 |
| | left_top_pos_y | 0 |
| | right_down_pos_x | 80 |
| | right_down_pos_y | 80 |
| | layer_order | 0 |
| | region_number | 1 |
| | left_top_pos_x | 80 |
| | left_top_pos_y | 0 |
| | right_down_pos_x | 100 |
| | right_down_pos_y | 100 |
| | layer_order | 0 |
| | region_number | 2 |
| | left_top_pos_x | 0 |
| | left_top_pos_y | 80 |
| | right_down_pos_x | 80 |
| | right_down_pos_y | 100 |
| | layer_order | 0 |

FIG. 17E

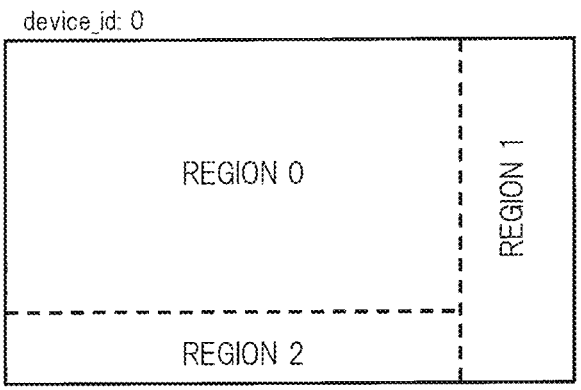

LAYOUT NUMBER: 2
(REGION 1 AND REGION 2 ARE IN
FRONT OF REGION 0)

| number_of_loop | | 1 |
|---|---|---|
| | layout_number | 2 |
| | device_id | 0 |
| | number_of_region | 3 |
| | region_number | 0 |
| | left_top_pos_x | 0 |
| | left_top_pos_y | 0 |
| | right_down_pos_x | 100 |
| | right_down_pos_y | 100 |
| | layer_order | 0 |
| | region_number | 1 |
| | left_top_pos_x | 80 |
| | left_top_pos_y | 0 |
| | right_down_pos_x | 100 |
| | right_down_pos_y | 100 |
| | layer_order | 1 |
| | region_number | 2 |
| | left_top_pos_x | 0 |
| | left_top_pos_y | 80 |
| | right_down_pos_x | 80 |
| | right_down_pos_y | 100 |
| | layer_order | 1 |

FIG. 17F

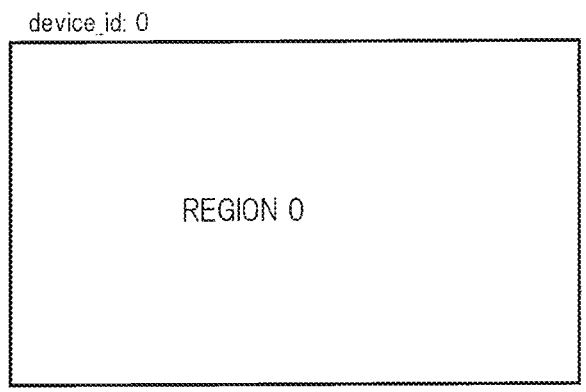

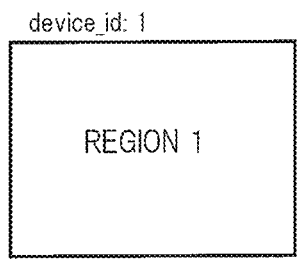

LAYOUT NUMBER: 3

| number_of_loop | | 2 |
|---|---|---|
| | layout_number | 3 |
| | device_id | 0 |
| | number_of_region | 1 |
| | region_number | 0 |
| | left_top_pos_x | 0 |
| | left_top_pos_y | 0 |
| | right_down_pos_x | 100 |
| | right_down_pos_y | 100 |
| | layer_order | 0 |
| | layout_number | 3 |
| | device_id | 1 |
| | number_of_region | 1 |
| | region_number | 1 |
| | left_top_pos_x | 0 |
| | left_top_pos_y | 0 |
| | right_down_pos_x | 100 |
| | right_down_pos_y | 100 |
| | layer_order | 0 |

FIG. 19A

| DATA STRUCTURE OF VIDEO COMPONENT DESCRIPTOR | NUMBER OF BITS | DATA NOTATION |
|---|---|---|
| Video_Component_Descriptor (){<br>    descriptor_tag<br>    descriptor_length<br>    video_resolution<br>    video_aspect_ratio<br>    video_scan_flag<br>    reserved<br>    video_frame_rate<br>    component_tag<br>    ISO_639_language_code<br>    for(i=0; i<N; i++){<br>        text_char<br>    }<br>} | <br>16<br>8<br>4<br>4<br>1<br>2<br>5<br>16<br>24<br><br>8 | <br>uimsbf<br>uimsbf<br>uimsbf<br>uimsbf<br>bslbf<br>bslbf<br>uimsbf<br>uimsbf<br>bslbf<br><br>uimsbf |

FIG. 19B

| VALUE OF VIDEO SIGNAL ASPECT RATIO | MEANING |
|---|---|
| 0 | Not specifying video signal aspect ratio |
| 1 | 4:3 |
| 2 | 16:9 (Pan vector) |
| 3 | 16:9 (No pan vector) |
| 4 | > 16:9 (excluding 21:9) |
| 5 | 21:9 |
| 6-15 | Reserve for future use |

FIG. 20C
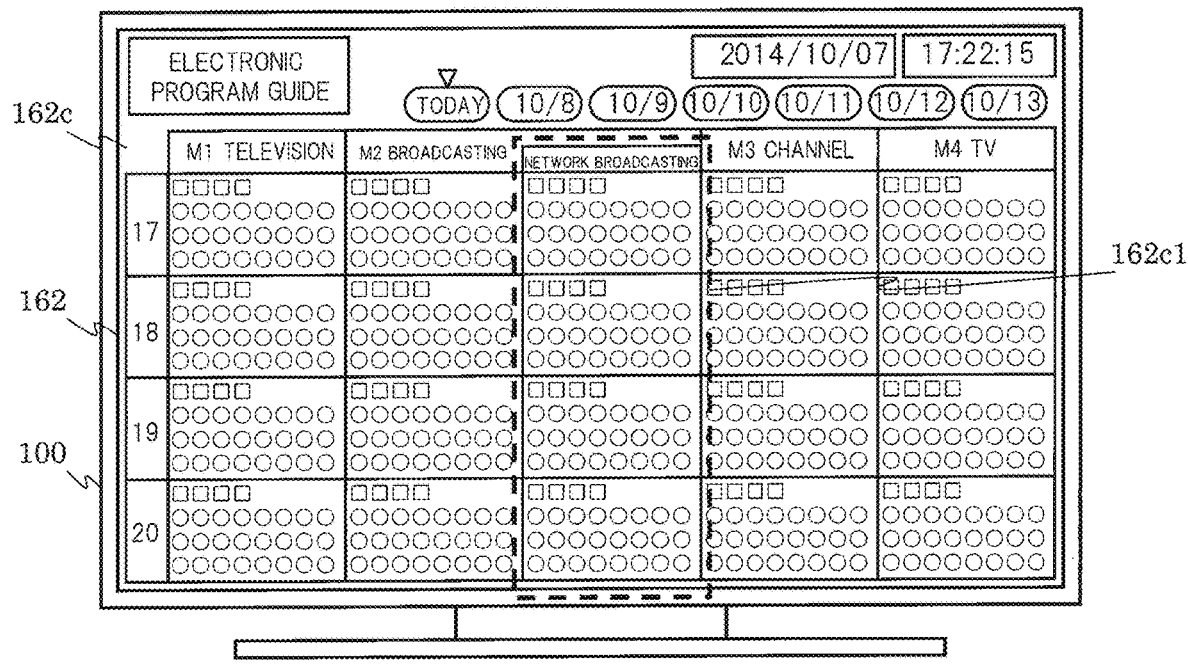
(A) WITH NETWORK CONNECTION
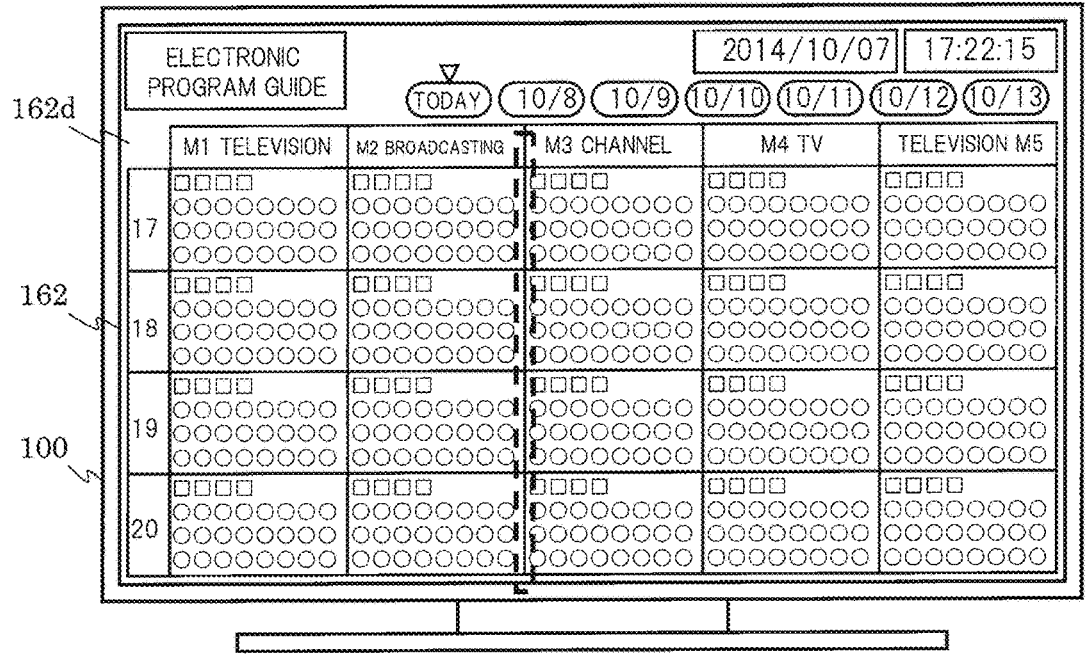
(B) WITHOUT NETWORK CONNECTION FIG. 21
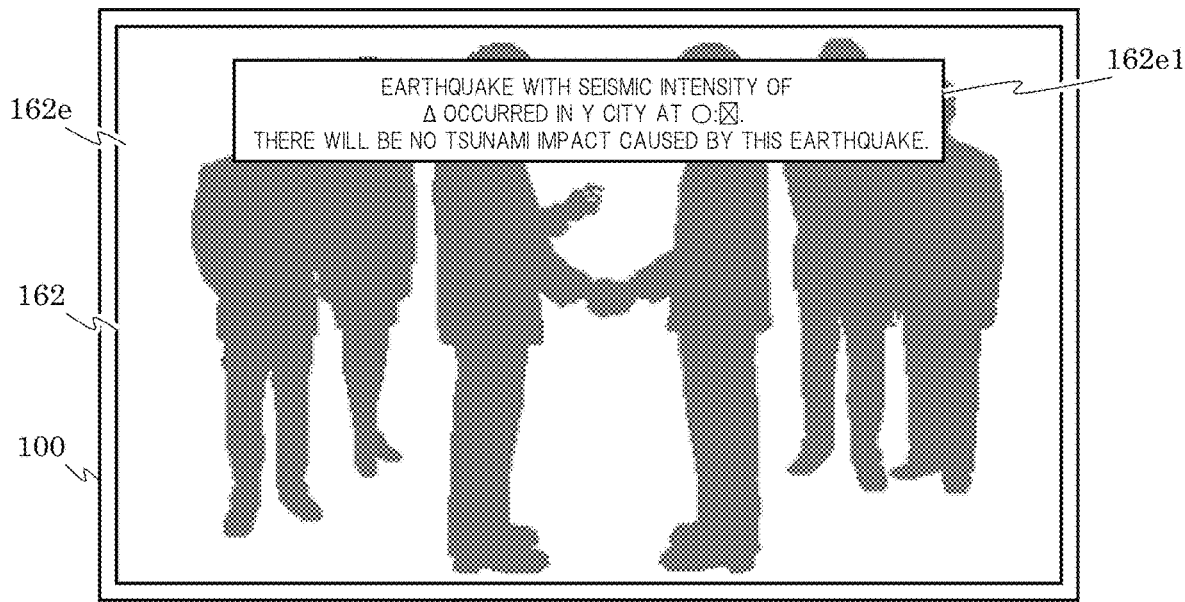
(A) EMERGENCY BROADCASTING MESSAGE DISPLAYED ON BROADCASTING PROGRAM SCREEN
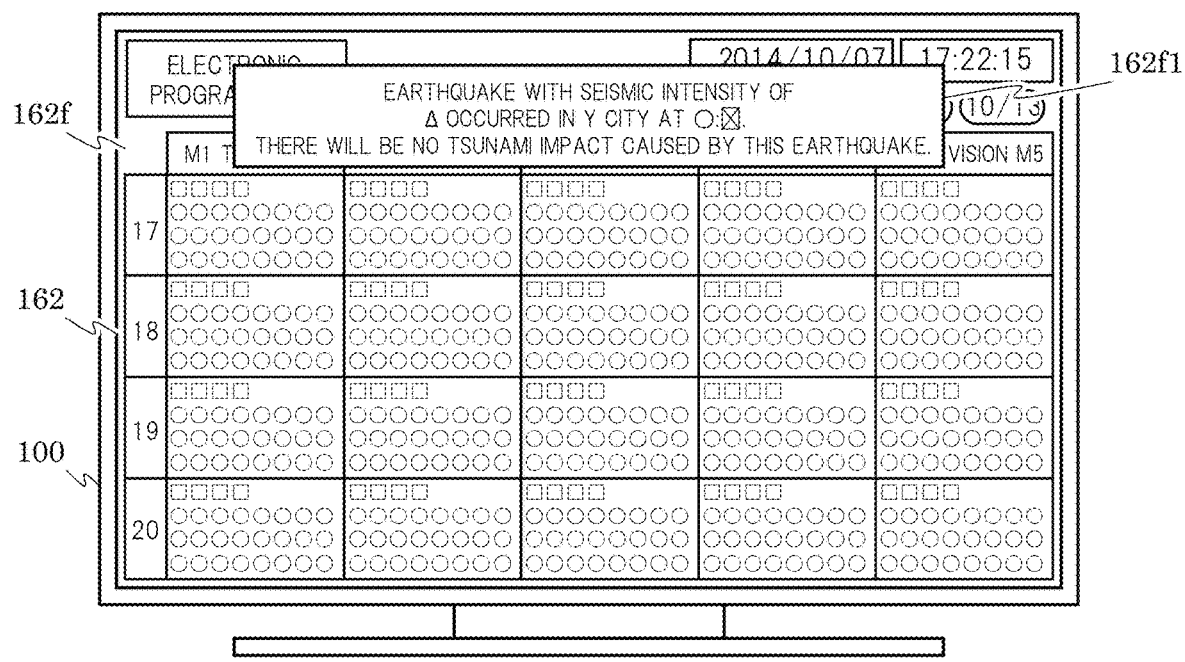
(B) EMERGENCY BROADCASTING MESSAGE DISPLAYED ON EPG SCREEN

FIG. 22A

| DATA STRUCTURE OF CONTENTS COPY CONTROL DESCRIPTOR | NUMBER OF BITS | DATA NOTATION |
|---|---|---|
| Content_Copy_Control_Descriptor(){ | | |
|     descriptor_tag | 16 | uimsbf |
|     descriptor_length | 8 | uimsbf |
| | | |
|     digital_recording_control_data | 2 | bslbf |
|     maximum_bit_rate_flag | 1 | bslbf |
|     component_control_flag | 1 | bslbf |
|     reserved_future_use | 4 | bslbf |
|     reserved_future_use | 8 | bslbf |
| | | |
|     if(maximum_bit_rate_flag==1){ | | |
|         maximum_bitrate | 8 | uimsbf |
|     } | | |
|     if(component_control_flag==1){ | | |
|         component_control_length | 8 | uimsbf |
|         for(i=0; i<N; i++){ | | |
|             component_tag | 16 | uimsbf |
|             digital_recording_control_data | 2 | bslbf |
|             maximum_bitrate_flag | 1 | bslbf |
|             reserved_future_use | 5 | bslbf |
|             reserved_future_use | 8 | bslbf |
| | | |
|             if(maximum_bitrate_flag==1){ | | |
|                 maximum_bitrate | 8 | uimsbf |
|             } | | |
|         } | | |
|     } | | |
| } | | |

FIG. 22B

| DIGITAL COPY CONTROL INFORMATION | MEANING |
|---|---|
| 00 | Copiable without limitation |
| 01 | Definition by provider |
| 10 | Copiable only for one generation |
| 11 | Copy prohibited |

FIG. 23

| DATA STRUCTURE OF CONTENTS USAGE CONTROL DESCRIPTOR | NUMBER OF BITS | DATA NOTATION |
|---|---|---|
| Content_Usage_Control_Descriptor(){ | | |
|     descriptor_tag | 16 | uimsbf |
|     descriptor_length | 8 | uimsbf |
|     remote_view_mode | 1 | bslbf |
|     copy_restriction_mode | 1 | bslbf |
|     image_constraint_token | 1 | bslbf |
|     reserved_future_use | 5 | bslbf |
|     reserved_future_use | 3 | bslbf |
|     retention_mode | 1 | bslbf |
|     retention_state | 3 | bslbf |
|     encryption_mode | 1 | bslbf |
|     for(i=0; i<N; i++){ | | |
|         reserved_future_use | 8 | bslbf |
|     } | | |
| } | | |

FIG. 24

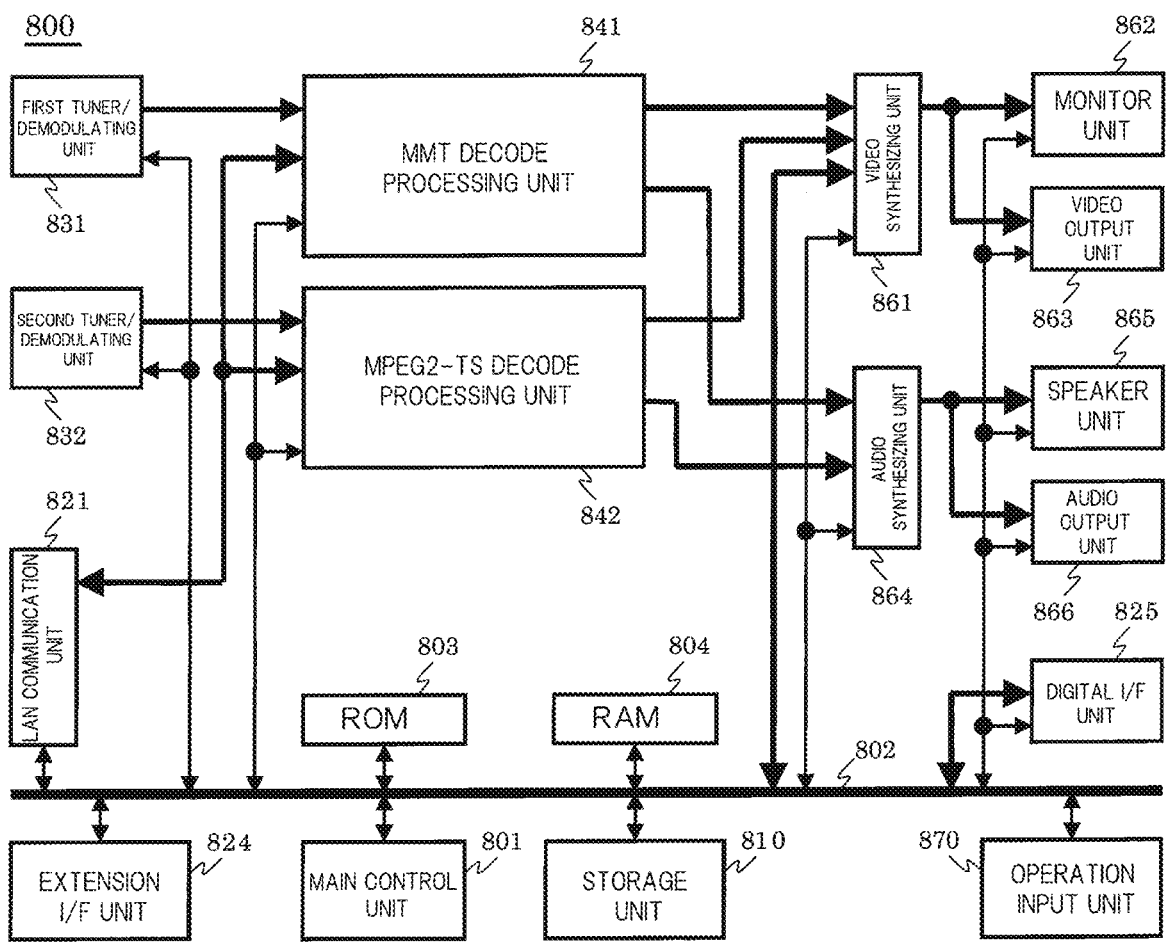

FIG. 25
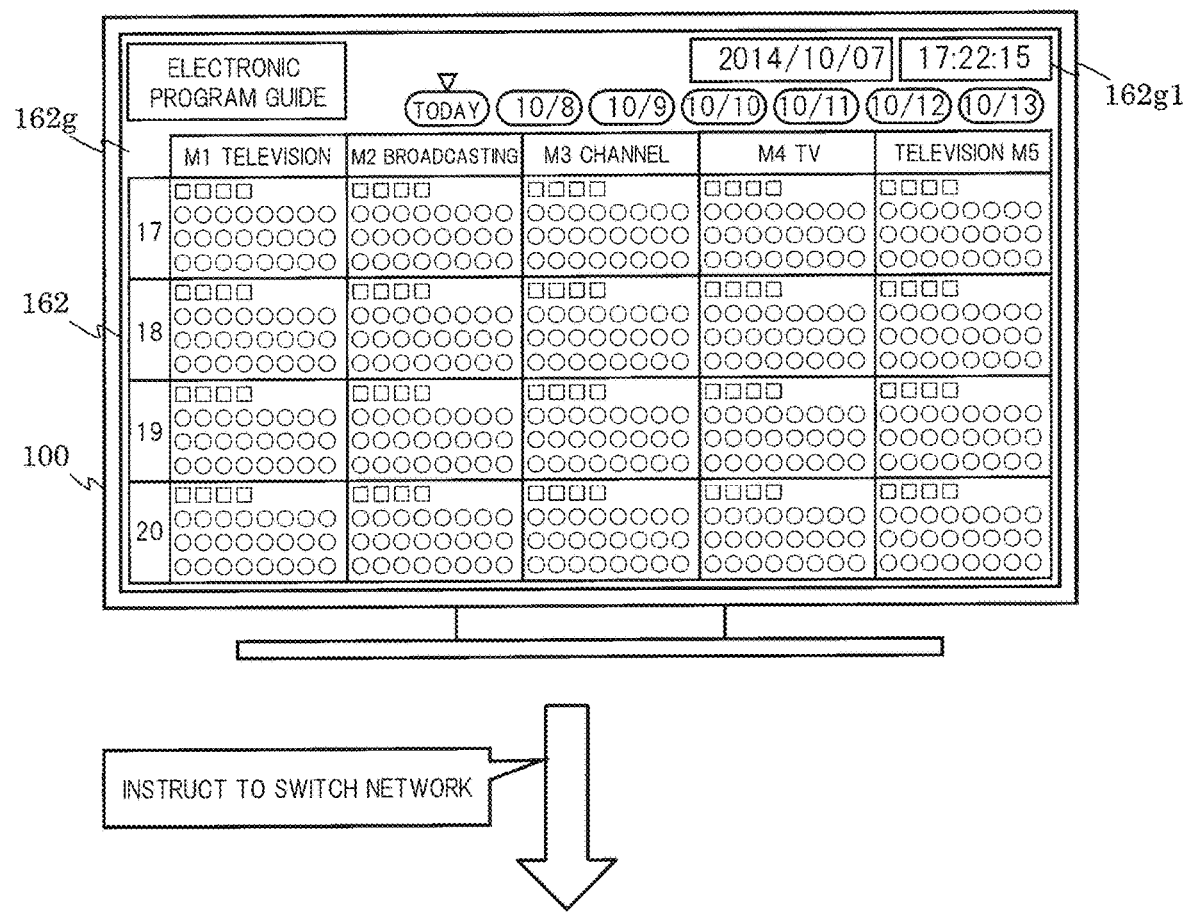
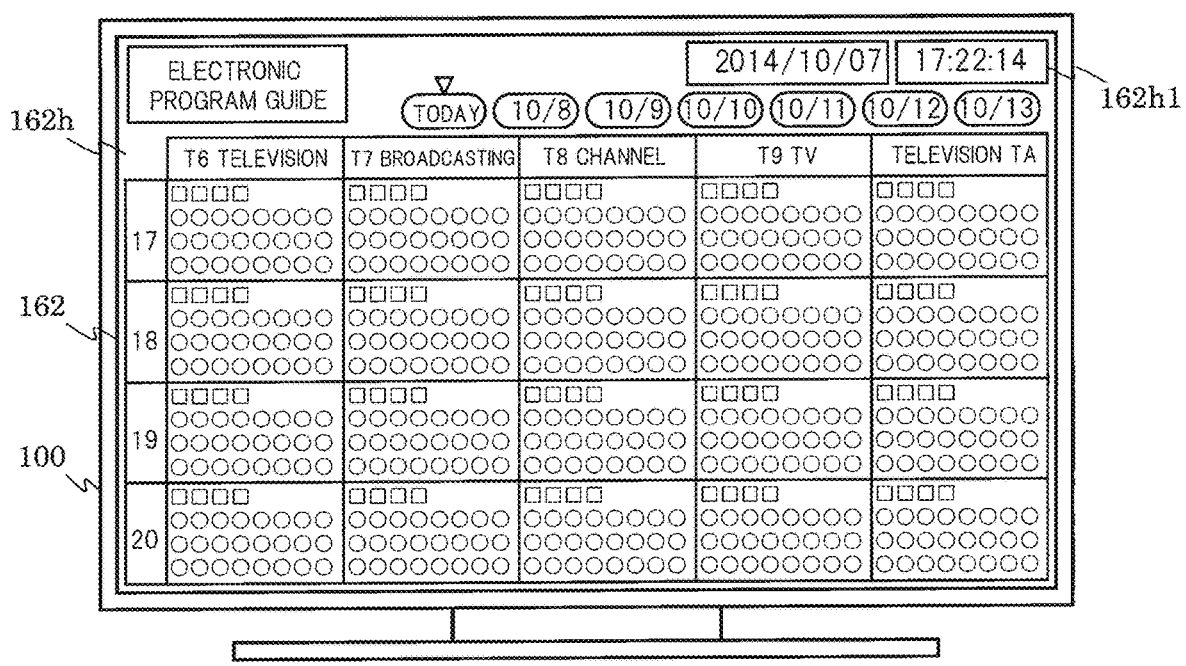

| | RECEPTION STATE OF BROADCASTING SERVICE | | | |
|---|---|---|---|---|
| MMT BROADCASTING SERVICE | NOT RECEIVABLE | RECEIVABLE | NOT RECEIVABLE | RECEIVABLE |
| MPEG2-TS BROADCASTING SERVICE | NOT RECEIVABLE | NOT RECEIVABLE | RECEIVABLE | RECEIVABLE |
| REFERENCE SOURCE OF CURRENT TIME INFORMATION | — | MH-TOT | TOT | TOT |

| TRANSMISSION METHOD | AT THE TIME OF RECEPTION | ACCUMULATION PREPROCESSING | | ACCUMULATING PROCESS | ACCUMULATION POSTPROCESSING | | | |
|---|---|---|---|---|---|---|---|---|
| | | PIXEL NUMBER CONVERSION AFTER RECEPTION | EXTERNAL OUTPUT BEFORE ACCUMULATION | | PIXEL NUMBER CONVERSION AT THE TIME OF OUTPUT AFTER ACCUMULATION (OR MOVEMENT OR COPY) | EXTERNAL OUTPUT AFTER ACCUMULATION | EXTERNAL MOVEMENT AFTER ACCUMULATION | EXTERNAL COPY AFTER ACCUMULATION |
| MMT | CONTENTS WITH OVER 2K (4K, 8K AND THE LIKE) | NO CONVERSION OR CONVERSION INTO CONTENTS WITH OVER 2K (4K, 8K AND THE LIKE) | PROTECTING PROCESS FOR CONTENTS WITH OVER 2K | COMMON ACCUMULATION PROTECTING PROCESS | NO CONVERSION OR CONVERSION INTO CONTENTS WITH OVER 2K (4K, 8K AND THE LIKE) | PROTECTING PROCESS FOR CONTENTS WITH OVER 2K | PROTECTING PROCESS FOR CONTENTS WITH OVER 2K | PROTECTING PROCESS FOR CONTENTS WITH OVER 2K |
| | | NO CONVERSION OR CONVERSION INTO CONTENTS WITH OVER 2K (4K, 8K AND THE LIKE) | PROTECTING PROCESS FOR CONTENTS WITH OVER 2K | COMMON ACCUMULATION PROTECTING PROCESS | CONVERSION INTO CONTENTS WITH 2K OR LESS | PROTECTING PROCESS FOR CONTENTS WITH 2K OR LESS | PROTECTING PROCESS FOR CONTENTS WITH 2K OR LESS | PROTECTING PROCESS FOR CONTENTS WITH 2K OR LESS |
| | | CONVERSION INTO CONTENTS WITH 2K OR LESS | PROTECTING PROCESS FOR CONTENTS WITH 2K OR LESS | COMMON ACCUMULATION PROTECTING PROCESS | NO CONVERSION OR CONVERSION INTO CONTENTS WITH 2K OR LESS | PROTECTING PROCESS FOR CONTENTS WITH 2K OR LESS | PROTECTING PROCESS FOR CONTENTS WITH 2K OR LESS | PROTECTING PROCESS FOR CONTENTS WITH 2K OR LESS |
| | CONTENTS WITH 2K OR LESS | NO CONVERSION OR CONVERSION INTO CONTENTS WITH 2K OR LESS | PROTECTING PROCESS FOR CONTENTS WITH 2K OR LESS | COMMON ACCUMULATION PROTECTING PROCESS | NO CONVERSION OR CONVERSION INTO CONTENTS WITH 2K OR LESS | PROTECTING PROCESS FOR CONTENTS WITH 2K OR LESS | PROTECTING PROCESS FOR CONTENTS WITH 2K OR LESS | PROTECTING PROCESS FOR CONTENTS WITH 2K OR LESS |

FIG. 29

| Transmission Method | At the time of reception | Accumulation Preprocessing | | Accumulating Process | Accumulation Postprocessing | | | |
|---|---|---|---|---|---|---|---|---|
| | | Pixel Number Conversion After Reception | External Output Before Accumulation | | Pixel Number Conversion At The Time Of Output After Accumulation (Or Movement Or Copy) | External Output After Accumulation | External Movement After Accumulation | External Copy After Accumulation |
| MMT | Contents with over 2K (4K, 8K and the like) | No conversion or conversion into contents with over 2K (4K, 8K and the like) | Protecting process for contents with over 2K | Common accumulation protecting process | No conversion or conversion into contents with over 2K (4K, 8K and the like) | Protecting process for contents with over 2K | Protecting process for contents with over 2K | Protecting process for contents with over 2K |
| MMT | Contents with over 2K (4K, 8K and the like) | No conversion or conversion into contents with over 2K (4K, 8K and the like) | Protecting process for contents with over 2K | Common accumulation protecting process | Conversion into contents with 2K or less | Protecting process for contents with 2K or less | Protecting process for contents with 2K or less | Protecting process for contents with 2K or less |
| MMT | Contents with 2K or less | Conversion into contents with 2K or less | Protecting process for contents with 2K or less | Common accumulation protecting process | No conversion or conversion into contents with 2K or less | Protecting process for contents with 2K or less | Protecting process for contents with 2K or less | Protecting process for contents with 2K or less |
| MMT | Contents with 2K or less | No conversion or conversion into contents with 2K or less | Protecting process for contents with 2K or less | Common accumulation protecting process | No conversion or conversion into contents with 2K or less | Protecting process for contents with 2K or less | Protecting process for contents with 2K or less | Protecting process for contents with 2K or less |
| MPEG-TS | Contents with 2K or less | No conversion or conversion into contents with 2K or less | Protecting process for contents with 2K or less | Common accumulation protecting process | No conversion or conversion into contents with 2K or less | Protecting process for contents with 2K or less | Protecting process for contents with 2K or less | Protecting process for contents with 2K or less |

BROADCAST RECEIVING APPARATUS

TECHNICAL FIELD

The present invention relates to a broadcast receiving apparatus.

BACKGROUND ART

One of extended functions of the digital broadcasting service is data broadcasting in which digital data is transmitted by broadcast waves to display various types of information such as weather forecasts, news, and recommended TV programs. Many types of television receivers capable of receiving data broadcasting have already been on the market, and a lot of techniques for receiving data broadcasting including the technique disclosed in Patent Document 1 listed below have been released to the public.

RELATED ART DOCUMENTS

Patent Documents

Patent document 1: Japanese Unexamined Patent Application Publication No. 2001-186486

SUMMARY OF THE INVENTION

Problems to be Solved by the Invention

In association with the recent changes in the content distribution environment, various functional extensions have been demanded for the television receivers. In particular, there are a lot of demands for the distribution of contents and cooperated applications using a broadband network environment such as the Internet and demands for the video contents with higher resolution and higher definition. However, no matter how the data broadcasting receiving function that the current television receiver has is utilized or extended, it is difficult to provide a high-value added television receiver capable of satisfying the above-mentioned demands.

It is an object of the present invention to provide a broadcast receiving apparatus capable of executing a function with a higher added value and a portable information terminal that can cooperate with the broadcast receiving apparatus.

Means for Solving the Problem

Techniques described in claims are used as means for solving the problem described above.

One example is a broadcast receiving apparatus including: a broadcast receiving unit configured to receive control information regarding contents of digital broadcasting and content protection for the contents; an accumulation unit configured to accumulate the contents received by the broadcast receiving unit; a video output unit configured to output video of the contents received by the broadcast receiving unit or video of the contents accumulated by the accumulation unit to external equipment; an interface configured to copy or move, to the external equipment, the contents that have been accumulated by the accumulation unit; and a control unit, wherein control states of the accumulation unit, the video output unit, and the interface by the control unit include: a first video outputting process state in which the accumulation unit does not accumulate the contents and the contents are outputted from the video output unit to the external equipment; an accumulating process state in which the accumulation unit accumulates the contents; a second video outputting process state in which the contents are outputted from the video output unit to the external equipment after an accumulating process for the contents by the accumulation unit; a copying process state in which the contents are copied to the external equipment via the interface after the accumulating process for the contents by the accumulation unit; and a moving process state in which the contents are moved to the external equipment via the interface after the accumulating process for the contents by the accumulation unit, wherein the control unit is allowed to control content protecting processes on a basis of control information regarding the content protection, and wherein the control unit is configured to execute switching of the content protecting processes in accordance with a number of pixels of the video of the contents in any of the first video outputting process state, the second video outputting process state, the copying process state, or the moving process state, and the control unit is configured not to execute the switching of the content protecting processes in accordance with the number of pixels of the video of the contents in the accumulating process state.

Effects of the Invention

By utilizing a technique of the present invention, it is possible to provide a broadcast receiving apparatus capable of executing a function with a higher added value.

BRIEF DESCRIPTIONS OF THE DRAWINGS

FIG. 3 is a conceptual diagram of a protocol stack for a broadcasting system using the MMT;

FIG. 4 is a layered configuration diagram of control information used in a broadcasting system;

FIG. 5A is a list of tables used for TLV-SI of the broadcasting system;

FIG. 5B is a list of descriptors used for TLV-SI of the broadcasting system;

FIG. 6A is a list of messages used for MMT-SI of the broadcasting system;

FIG. 6B is a list of tables used for MMT-SI of the broadcasting system;

FIG. 6C is a list (1) of descriptors used for MMT-SI of the broadcasting system;

FIG. 6D is a list (2) of descriptors used for MMT-SI of the broadcasting system;

FIG. 6E is a list (3) of descriptors used for MMT-SI of the broadcasting system;

FIG. 7B is a diagram showing a data structure of an MPT in the broadcasting system;

FIG. 7C is a diagram showing a data structure of location information in the broadcasting system;

FIG. 7D is a diagram showing a data structure of an MPU timestamp descriptor in the broadcasting system;

FIG. 7E is a diagram showing a data structure of an MH-EIT in the broadcasting system;

FIG. 7F is a diagram showing a data structure of an event package descriptor in the broadcasting system;

FIG. 12B is a diagram showing a data structure of an NTP format of the broadcasting system;

FIG. 12C is a diagram showing a data structure of an MH-TOT of the broadcasting system;

FIG. 12D is a diagram showing a format of a JST_time parameter of the broadcasting system;

FIG. 12E is a diagram showing a data structure of time information in a TMCC extension information region of the broadcasting system;

FIG. 12F is a diagram showing a method of calculating the current date from MJD of the broadcast receiving apparatus according to the first embodiment;

FIG. 13B is a diagram showing a data structure of a TLV-NIT of the broadcasting system;

FIG. 13C is a diagram showing a data structure of a satellite delivery system descriptor of the broadcasting system;

FIG. 13D is a diagram showing a data structure of a service list descriptor of the broadcasting system;

FIG. 13E is a diagram showing a data structure of an AMT of the broadcasting system;

FIG. 14C is a diagram showing a data structure of a PLT of the broadcasting system;

FIG. 16A is an explanatory diagram of a program selecting process of a multi programming channel;

FIG. 16B is an explanatory diagram of an angle selecting process for a multiview compliant program;

FIG. 17A is a diagram showing a data structure of an LCT of the broadcasting system;

FIG. 17B is a diagram showing a data structure of an MPU presentation region specifying descriptor of the broadcasting system;

FIG. 17C is a diagram showing layout assignment to a layout number based on the LCT;

FIG. 17D is a diagram showing layout assignment to a layout number based on the LCT;

FIG. 17E is a diagram showing layout assignment to a layout number based on the LCT;

FIG. 17F is a diagram showing layout assignment to a layout number based on the LCT;

FIG. 19A is a diagram showing a data structure of a video component descriptor of the broadcasting system;

FIG. 19B is an explanatory diagram of meanings of video signal aspect ratios of the video component descriptor;

FIG. 20C is a screen display diagram of an EPG screen of the broadcast receiving apparatus according to the first embodiment;

FIG. 21 is a screen display diagram at the time of displaying an emergency warning broadcasting message of the broadcast receiving apparatus according to the first embodiment;

FIG. 22A is a diagram showing a data structure of a contents copy control descriptor of the broadcasting system;

FIG. 22B is a diagram showing meanings of copy control information for the contents copy control descriptors;

FIG. 23 is a diagram showing a data structure of a contents usage control descriptor of the broadcasting system;

FIG. 24 is a block diagram of a broadcast receiving apparatus according to a second embodiment;

FIG. 25 is an explanatory diagram of inconsistent display of current time at the time of switching broadcasting services;

FIG. 27A is a screen display diagram of an EPG screen of the broadcast receiving apparatus according to the second embodiment;

FIG. 28 is an explanatory diagram of a content protecting process according to a third embodiment; and FIG. 29 is an explanatory diagram of a content protecting process according to a fourth embodiment.

DETAILED DESCRIPTION OF EMBODIMENTS

Hereinafter, embodiments of the present invention will be described with reference to the drawings.

First Embodiment

[System Configuration]

Figure 1:
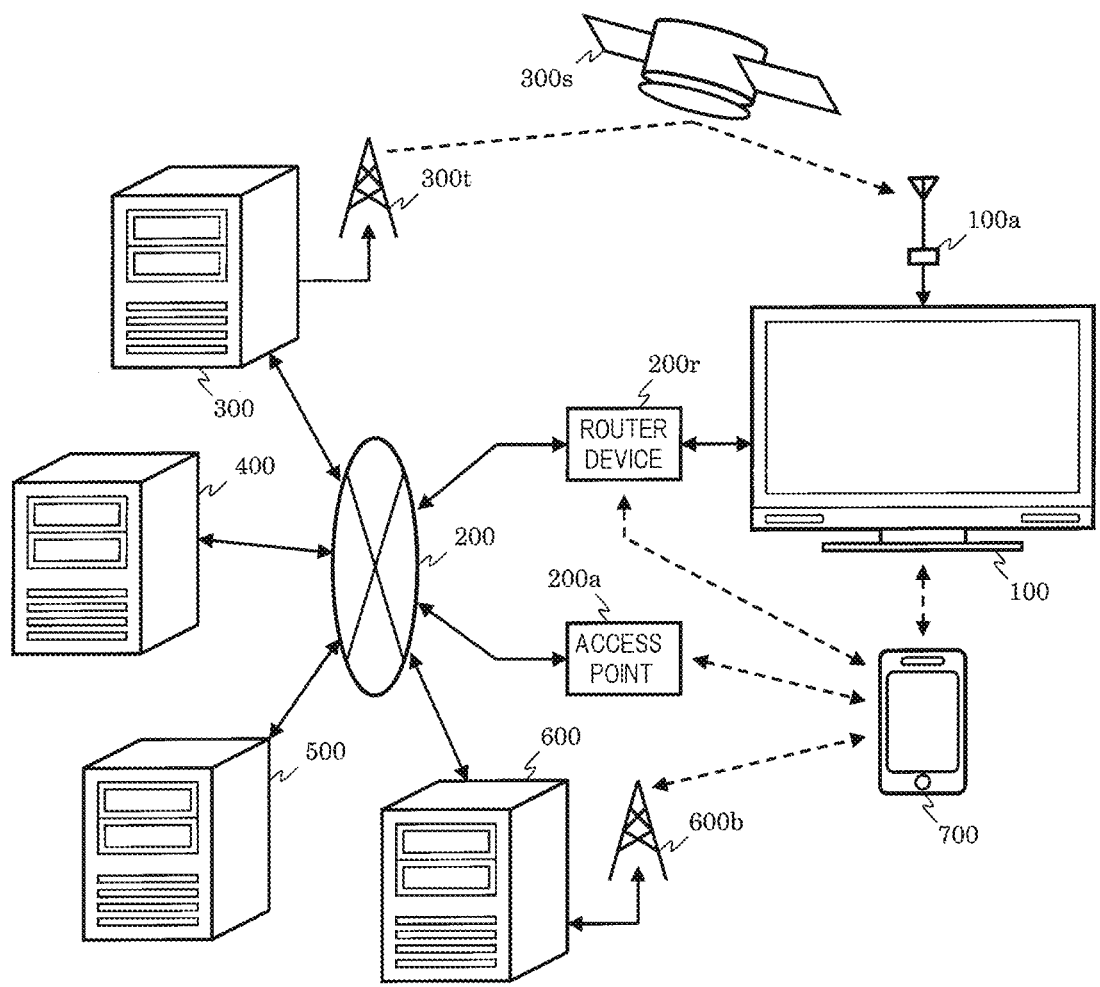
FIG. 1 is a configuration diagram of a broadcast communication system including a broadcast receiving apparatus according to a first embodiment.

FIG. 1 is a system configuration diagram showing an example of a broadcast communication system including a broadcast receiving apparatus according to the present embodiment. The broadcast communication system of the present embodiment includes a broadcast receiving apparatus 100, an antenna 100a, a broadband network such as the Internet 200, a router device 200r, an access point 200a, a radio tower 300t and a broadcast satellite (or communication satellite) 300s of a broadcast station, a broadcast station server 300, a service provider server 400, an other application server 500, a mobile phone communication server 600, a base station 600b of a mobile phone communication network, and a portable information terminal 700.

The broadcast receiving apparatus 100 receives broadcast waves transmitted from the radio tower 300t via the broadcast satellite (or communication satellite) 300s and the antenna 100a. Alternatively, the broadcast receiving apparatus 100 may receive broadcast waves transmitted from the radio tower 300t directly from the antenna 100a without passing through the broadcast satellite (or communication satellite) 300s. In addition, the broadcast receiving apparatus 100 can be connected to the Internet 200 via the router device 200r, and thus can perform data transmission and reception through the communication with server devices and other communication equipment on the Internet 200.

The router device 200r is connected to the Internet 200 through wired communication, to the broadcast receiving apparatus 100 through wired or wireless communication, and to the portable information terminal 700 through wireless communication. The wireless communication may be established by Wi-Fi (registered trademark) or the like. This allows the server devices and other communication equipment on the Internet 200, the broadcast receiving apparatus 100, and the portable information terminal 700 to perform data transmission and reception between one another via the router device 200r. Note that the communication between the broadcast receiving apparatus 100 and the portable information terminal 700 may be performed as direct communication by BlueTooth (registered trademark), NFC (Near Field Communication) or the like without passing through the rooter 200r.

The radio tower 300t is a broadcasting facility of the broadcast station and transmits broadcast waves including coded data of broadcasting programs, subtitle information, other applications, general-purpose data, and the like. The broadcast satellite (or communication satellite) 300s is a relay device that receives broadcast waves transmitted from the radio tower 300t of the broadcast station, performs frequency conversion and the like as appropriate, and then transmits the radio waves to the antenna 100a connected to the broadcast receiving apparatus 100. In addition, the broadcast station has the broadcast station server 300. The broadcast station server 300 can store metadata such as broadcasting programs (video contents, etc.) and the titles, IDs, summaries, casts, broadcasting dates and the like of the broadcasting programs, and provide the video contents and metadata to a service provider based on a contract. Note that the video contents and metadata may be provided to the service provider through an API (Application Programming Interface) in the broadcast station server 300.

The service provider server 400 is a server device prepared by the service provider, and can provide various services cooperated with broadcasting programs distributed from the broadcast station. In addition, the service provider server 400 stores, manages, and distributes video contents and metadata delivered from the broadcast station server 300 and various contents, applications and the like cooperated with the broadcasting programs. In addition, the service provider server 400 further has a function of searching for deliverable contents, applications and the like and presenting a list of them in response to an inquiry from the television receiver and the like. Note that the storage, management, and distribution of the contents and metadata and those of the applications may be performed by different server devices. The broadcast station and the service provider may be the same or different from each other. A plurality of service provider servers 400 may be prepared for different services. In addition, the broadcast station server 300 may be provided with the functions of the service provider server 400.

The other application server 500 is a publicly known server device that stores, manages, and distributes other general applications, operating programs, contents, data, and the like. A plurality of other application servers 500 may be provided on the Internet 200.

The mobile phone communication server 600 is connected to the Internet 200 and is further connected to the portable information terminal 700 via the base station 600b. The mobile phone communication server 600 manages telephone communication (telephone call) and data transmission and reception performed by the portable information terminal 700 through the mobile phone communication network, and allows the portable information terminal 700 to perform data transmission and reception through the communication with server devices and other communication equipment on the Internet 200. The communication between the base station 600b and the portable information terminal 700 may be performed by W-CDMA (Wideband Code Division Multiple Access: registered trademark), GSM (Global System for Mobile Communications: registered trademark), LTE (Long Term Evolution), or other communication methods.

The portable information terminal 700 has a function of telephone communication (telephone call) and data transmission and reception through the mobile phone communication network and a function of wireless communication through Wi-Fi (registered trademark) or the like. The portable information terminal 700 can be connected to the Internet 200 via the router device 200r or the access point 200a or via the base station 600b and the mobile phone communication server 600 on the mobile phone communication network, and thus can perform data transmission and reception through the communication with server devices and other communication equipment on the Internet 200. The access point 200a is connected to the internet 200 through wired communication and is further connected to the portable information terminal 700 through wireless communication. The wireless communication may be established by Wi-Fi (registered trademark) or the like. Note that the communication between the portable information terminal 700 and the broadcast receiving apparatus 100 may be performed via the access point 200a, the Internet 200, and the router device 200*r* or via the base station 600*b*, the mobile phone communication server 600, the Internet 200, and the router device 200*r*.

[Outline of MMT Method]

The broadcast receiving apparatus 100 shown in FIG. 1 is a television receiver that supports MMT (MPEG Media Transport) as a media transport method for transmitting video and audio data, in place of TS (Transport Stream) defined in the MPEG (Moving Picture Experts Group)-2 system (hereinafter, "MPEG2-TS") mainly adopted by conventional digital broadcasting systems. The broadcast receiving apparatus 100 may be a television receiver supporting both MPEG2-TS and MMT.

MPEG2-TS has a characteristic of multiplexing video and audio components and the like making up a program, in a single stream together with control signals and clocks. Since the components are treated as single stream with the inclusion of clocks, MPEG2-TS is suitable for the transmission of single contents through a single transmission path with an ensured transmission quality, and thus has been adopted by many conventional digital broadcasting systems. On the other hand, because of the functional limitations of MPEG2-TS for the recent changes in the content distribution environment including the diversification of contents, diversification of equipment using contents, diversification of transmission paths through which contents are distributed, and diversification of contents accumulation environment, MMT has been established as a new media transport method.

Figure 2A:
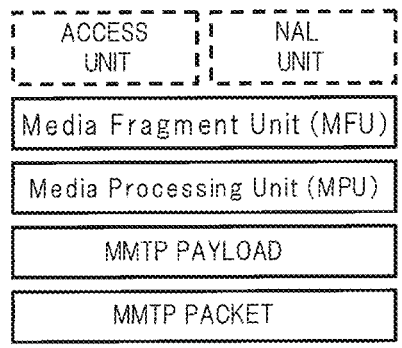
FIG. 2A is an explanatory diagram of a component of a coded signal in an MMT.

FIG. 2A shows one example of an outline of a coded signal in MMT of the present embodiment. As shown in FIG. 2A, MMT of the present embodiment has an MFU (Media Fragment Unit), an MPU (Media Processing Unit), an MMTP (MMT Protocol) payload, and an MMTP packet as elements making up the coded signal.

Figure 2B:
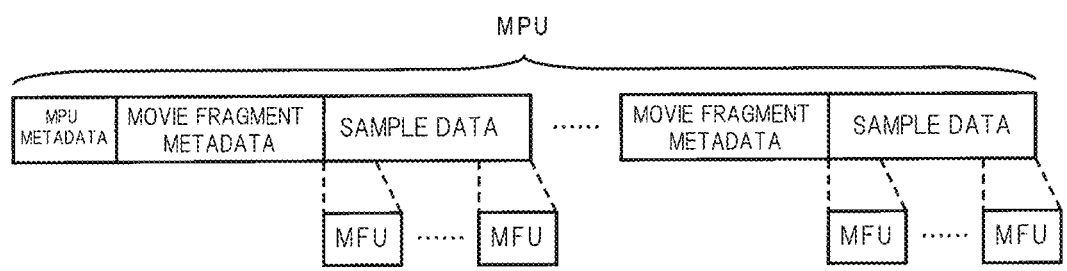
FIG. 2B is a configuration diagram of an MPU in MMT.

The MFU is a format at the time of transmitting video, audio, and the like, and may be configured in units of NAL (Network Abstraction Layer) unit or access unit. The MPU includes one or more access unit, and the MPU can execute a decoding process of video and/or audio by a single body. The MPU may be configured of MPU metadata including information related to the overall configuration of the MPU, movie fragment metadata including information of coded media data, and sample data that is coded media data. Plural sets of movie fragment data and sample data may exist in one MPU. Further, the MFU can be extracted from the sample data. FIG. 2B shows one example of a configuration of the MPU. By adding a sequence number to each MPU belonging to the same asset, an arbitrary MPU can be distinguished from other MPUs on the basis of an asset ID for identifying an asset and the sequence number of the MPU. Further, in the case of media such as video components and audio components, presentation time and decoding time may be specified in units of MPU or access unit.

Figure 2C:
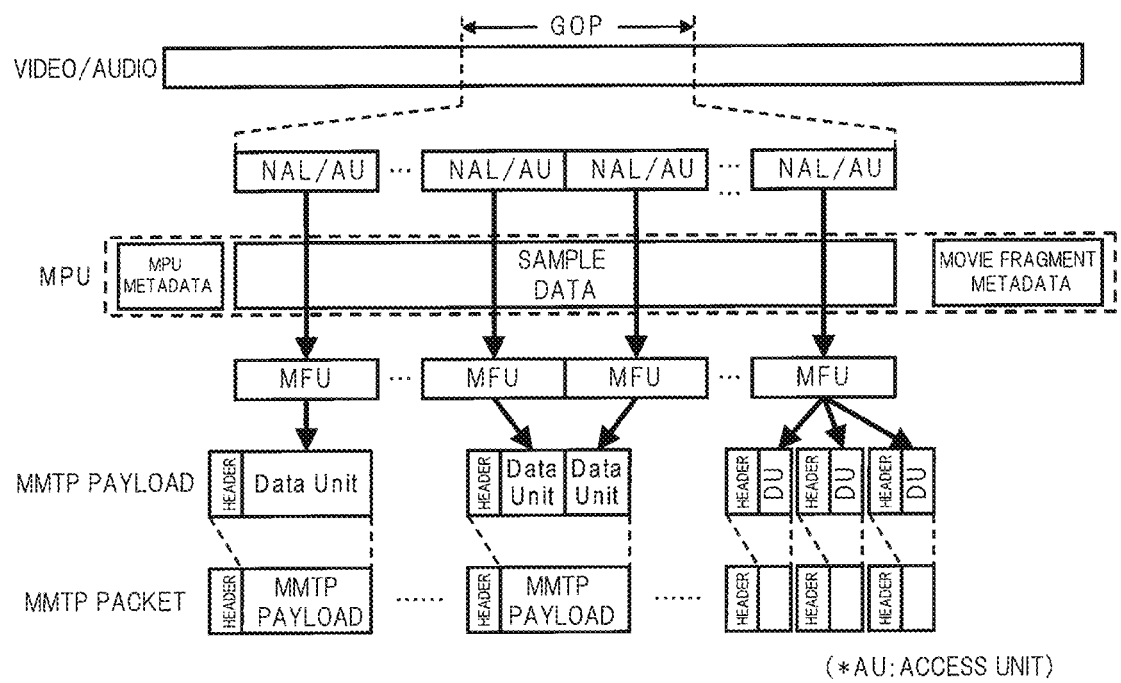
FIG. 2C is a configuration diagram of an MMTP packet in the MMT.

The MMTP packet is configured of a header and an MMTP payload, and transmits control information of the MFU and MMT. The MMTP payload has a payload header corresponding to contents (data unit) stored in a payload section. FIG. 2C shows one example of an outline of a process of making the MFU from video and audio signals, storing the MFU in the MMTP payload, and then creating the MMTP packet. In the case of a video signal that is coded using inter-frame prediction, the MPU is desirably configured in units of GOP (Group of Pictures). In addition, when the size of MFU to be transmitted is small, a single MFU may be stored in a single payload section, or a plurality of MFUs of the same kind may be stored in a single payload section. In addition, when the size of MFU to be transmitted is large, a single MFU may be divided and then stored in a plurality of payload sections. In order to recover a packet loss on a transmission path, the MMTP packet may be protected by such techniques as AL-FEC (Application Layer Forward Error Correction) and ARQ (Automatic Repeat Request).

The broadcasting system of the present embodiment uses MPEG-H HEVC (High Efficiency Video Coding) as a video coding method, and uses MPEG-4 AAC (Advanced Audio Coding) or MPEG-4 ALS (Audio Lossless Coding) as an audio coding method. Coded data of video, audio, and the like of broadcasting programs that are coded by the methods described above is formatted into MFU or MPU, stored in an MMTP payload, encapsulated in an MMTP packet, and then transmitted in the form of an IP (Internet Protocol) packet. In addition, data contents related to broadcasting programs may also be formatted into MFU or MPU, stored in an MMTP payload, encapsulated in an MMTP packet, and then transmitted in the form of an IP packet. Four types of data contents transmission methods are prepared, which include: (1) a subtitle/caption transmission method used for data steaming synchronous with broadcasting; (2) an application transmission method used for data transmission service asynchronous with broadcasting; (3) an event message transmission method used for synchronous/asynchronous message notification to applications operating on the television receiver from a broadcast station; and (4) a general-purpose data transmission method for synchronous/asynchronous transmission of other general-purpose data.

In the transmission of MMTP packets, UDP/IP (User Datagram Protocol/Internet Protocol) is used for the broadcast transmission path, and UDP/IP or TCP/IP (Transmission Control Protocol/Internet Protocol) is used for the communication line. Further, TLV (Type Length Value) multiplexing is used in the broadcast transmission path for efficient transmission of IP packets. Examples of protocol stack for the broadcasting system of the present embodiment are shown in FIG. 3. In FIG. 3, (A) shows one example of a protocol stack for the broadcast transmission path, and (B) shows one example of a protocol stack for the communication line.

The broadcasting system of the present embodiment provides a scheme for transmitting two types of control information, that is, MMT-SI (MMT-Signaling Information) and TLV-SI (TLV-Signaling Information). MMT-SI is control information indicating the configuration of a broadcasting program and the like. This control information is formatted into an MMT control message, stored in an MMTP payload, encapsulated in an MMTP packet, and then transmitted in the form of an IP packet. TLV-SI is control information related to IP packet multiplexing, and provides information for channel selection and correspondence information of IP addresses and services.

Further, even the broadcasting system using the MMT transmits time information in order to provide an absolute time. Note that component presentation time is indicated for each TS based on different clocks in the MPEG2-TS, while component presentation time is indicated based on the coordinated universal time (UTC) in the MMT. This scheme allows a terminal device to display components transmitted from different transmission points through different transmission paths in synchronization. IP packets conforming to an NTP (Network Time Protocol) are used for providing the UTC.

[Control Information of Broadcasting System Using MMT]

As described above, in the broadcasting system compatible with the broadcast receiving apparatus 100 of the present embodiment, TLV-SI related to a TLV multiplexing method for multiplexing IP packets and MMT-SI related to MMT which is a media transport method are prepared as the control information. TLV-SI provides information with which the broadcast receiving apparatus 100 demultiplexes IP packets multiplexed in the broadcast transmission path. TLV-SI is composed of a "table" and a "descriptor". The "table" is transmitted in a section format, and the "descriptor" is placed in the "table". MMT-SI is transmission control information indicating the information related to configuration of an MMT package and broadcasting services. MMT-SI has a three-layer structure composed of a "message" layer storing "table" and "descriptor", a "table" layer having an element and property that indicate specific information, and a "descriptor" layer indicating more detailed information. An example of the layer structure of the control information used in the broadcasting system of the present embodiment is shown in FIG. 4.

<Tables Used for TLV-SI>

FIG. 5A shows a list of "tables" used for TLV-SI of the broadcasting system compatible with the broadcast receiving apparatus 100 of the present embodiment. In the present embodiment, the following tables are used as "tables" of TLV-SI.

(1) TLV-NIT

A network information table for TLV (TLV-NIT) provides information related to the physical configuration of a TLV stream transmitted through a network and indicates the characteristics of the network.

(2) AMT

An address map table (AMT) provides a list of multicast groups of IP packets making up respective services transmitted through the network.

(3) Table Set by Provider

Other tables set uniquely by the service provider and the like may be prepared.

<Descriptors Used for TLV-SI>

FIG. 5B shows a list of "descriptors" included in TLV-SI of the broadcasting system compatible with the broadcast receiving apparatus 100 of the present embodiment. In the present embodiment, the following descriptors are used as "descriptors" of TLV-SI.

(1) Service List Descriptor

A service list descriptor provides a list of services classified by service identifications and service types.

(2) Satellite Delivery System Descriptor

A satellite delivery system descriptor indicates physical conditions for a satellite transmission path.

(3) System Management Descriptor

A system management descriptor is used to distinguish broadcasting from non-broadcasting.

(4) Network Name Descriptor

A network name descriptor describes a network name with character codes.

(5) Remote Control Key Descriptor

A remote control key descriptor is used to set a service that is assigned to a one-touch selecting button of a remote controller for a receiver.

(6) Descriptor Set by Provider

Other descriptors set uniquely by the service provider and the like may be prepared.

<Messages Used for MMT-SI>

FIG. 6A shows a list of "messages" used for MMT-SI of the broadcasting system compatible with the broadcast receiving apparatus 100 of the present embodiment. In the present embodiment, the following messages are used as "messages" of MMT-SI.

(1) PA Message

A package access (PA) message is used to transmit various tables.

(2) M2 Section Message

An M2 section message is used to transmit section extension format of the MPEG-2 Systems.

(3) CA Message

A CA message is used to transmit a table for identifying a conditional access method.

(4) M2 Short Section Message

An M2 short section message is used to transmit section short format of the MPEG-2 Systems.

(5) Data Transmission Message

A data transmission message is a message storing a table related to data transmission.

(6) Message Set by Provider

Other messages set uniquely by the service provider and the like may be prepared.

<Tables Used for MMT-SI>

FIG. 6B shows a list of "tables" used for MMT-SI of the broadcasting system compatible with the broadcast receiving apparatus 100 of the present embodiment. A table is control information having an element and property that indicate specific information. A table is stored in a message and is encapsulated in an MMTP packet to be transmitted. Note that a message that stores a table may be determined in accordance with the type of the table. In the present embodiment, the following tables are used as "tables" of MMT-SI.

(1) MPT

An MMT package table (MPT) provides package configuration information such as a list of assets and locations of assets on the network. An MPT may be stored in a PA message.

(2) PLT

A package list table (PLT) presents a list of IP data flows for transmitting PA messages of MMT packages provided as a broadcasting service, packet IDs, and IP data flows for transmitting IP services. A PLT may be stored in a PA message.

(3) LCT

A layout configuration table (LCT) is used to correlate layout information for presentation with layout numbers. An LCT may be stored in a PA message.

(4) ECM

An entertainment control message (ECM) is common information made up of program information and control information, and delivers key information for descrambling and others. An ECM may be stored in an M2 section message.

(5) EMM

An entitlement management message (EMM) is used to transmit personal information including contract information for individual subscribers and key information for decoding ECM (common information). An EMM may be stored in an M2 section message.

(6) CAT (MH)

A conditional access table (CA table (CAT)) (MH) is used to store a descriptor for identifying a conditional access method. A CAT (MH) may be stored in a CA message.

(7) DCM

A download control message (DCM) transmits key-related information including a key for decoding a transmission path code for downloading. A DCM may be stored in an M2 section message.

(8) DMM

A download management message (DMM) transmits key-related information including a download key for decoding an encoded DCM. A DMM may be stored in an M2 section message.

(9) MH-EIT

An MH-event information table (MH-EIT) is time-series information related to events included in each service. An MH-EIT may be stored in an M2 section message.

(10) MH-AIT

An MH-application information table (MH-AIT) stores all the information related to applications and startup conditions required for applications. An MH-AIT may be stored in an M2 section message.

(11) MH-BIT

An MH-broadcaster information table (MH-BIT) is used to provide information of broadcasters present on the network. An MH-BIT may be stored in an M2 section message.

(12) MH-SDTT

An MH-software download trigger table (MH-SDTT) is used to provide download announcement information. An MH-SDTT may be stored in an M2 section message.

(13) MH-SDT

An MH-service description table (MH-SDT) has a sub-table indicating a service included in a specific TLV stream and transmits information related to a sub-channel such as a name of sub-channel and a name of a broadcaster. An MH-SDT may be stored in an M2 section message.

(14) MH-TOT

An MH-time offset table (MH-TOT) transmits JST time and date (Modified Julian Date) information. An MH-TOT may be stored in an M2 short section message.

(15) MH-CDT

An MH-common data table (MH-CDT) is used to transmit common data, which should be stored in a non-volatile memory, in a section format to all receivers that receive the MH-CDT. An MH-CDT may be stored in an M2 section message.

(16) DDM Table

A data directory management (DDM) table provides a directory configuration of files making up an application in order to separate a file configuration of the application from a configuration for file transmission. A DDM table may be stored in a data transmission message.

(17) DAM Table

A data asset management (DAM) table provides a configuration of MPU in an asset and version information of each MPU. A DAM table may be stored in a data transmission message.

(18) DCC Table

A data content configuration (DCC) table provides configuration information of files as data contents in order to achieve flexible and effective cache control. A DCC table may be stored in a data transmission message.

(19) EMT

An event message table (EMT) is used to transmit information related to an event message. An EMT may be stored in an M2 section message.

(20) Table Set by Provider

Other tables set uniquely by the service provider and the like may be provided.

<Descriptors Used for MMT-SI>

FIG. 6C, FIG. 6D and FIG. 6E show lists of "descriptors" included in MMT-SI of the broadcasting system compatible with the broadcast receiving apparatus 100 of the present embodiment. A descriptor is control information that provides more detailed information, and is included in a table. Note that a table in which a descriptor is included may be determined in accordance with the type of the descriptor. In the present embodiment, the following descriptors are used as "descriptors" of MMT-SI.

(1) Asset Group Descriptor

An asset group descriptor provides a relation of an asset group and a priority in the group. An asset group descriptor may be included in the MPT.

(2) Event Package Descriptor

An event package descriptor provides a correlation between an event, which represents a program, and a package. An event package descriptor may be included in MH-EIT stored in an M2 section message to be transmitted.

(3) Background Color Specifying Descriptor

A background color specifying descriptor provides a background color of a rearmost plane in layout specification. A background color specifying descriptor may be included in LOT.

(4) MPU Presentation Region Specifying Descriptor

An MPU presentation region specifying descriptor provides a location of presentation of MPU. An MPU presentation region specifying descriptor may be included in the MPT.

(5) MPU Timestamp Descriptor

An MPU timestamp descriptor indicates the time of presentation of the first access unit in the presentation order in the MPU. An MPU timestamp descriptor may be included in the MPT.

(6) Dependency Relation Descriptor

A dependency relation descriptor provides asset IDs for assets dependent on each other. A dependency relation descriptor may be included in the MPT.

(7) Access Control Descriptor

An access control descriptor provides information for identifying the conditional access method. An access control descriptor may be included in the MPT or CAT (MH).

(8) Scramble Method Descriptor

A scramble method descriptor provides information for identifying a target to be encoded at the time of scrambling and a type of an encoding algorithm. A scramble method descriptor may be included in the MPT or CAT (MH).

(9) Message Authentication Method Descriptor

A message authentication method descriptor provides information for identifying a message authentication method when message authentication is performed. A message authentication method descriptor may be included in the MPT or CAT (MH).

(10) Emergency Information Descriptor (MH)

An emergency information descriptor (MH) is used when emergency warning broadcasting is performed. An emergency information descriptor (MH) may be included in the MPT.

(11) MH-MPEG-4 Audio Descriptor

An MH-MPEG-4 audio descriptor is used to describe basic information for specifying coding parameters of an audio stream defined in ISO/IEC 14496-3 (MPEG-4 audio). An MH-MPEG-4 audio descriptor may be included in the MPT.

(12) MH-MPEG-4 Audio Extension Descriptor

An MH-MPEG-4 audio extension descriptor is used to describe a profile, level, and specific setting to a coding method of an MPEG-4 audio stream. An MH-MPEG-4 audio extension descriptor may be included in the MPT.

(13) MH-HEVC Video Descriptor

An MH-HEVC video descriptor is used to describe basic coding parameters for a video stream (HEVC stream) defined in ITU-T Recommendation H.265 and ISO/IEC 23008-2. An MH-HEVC video descriptor may be included in the MPT.

(14) MH-Link Descriptor

An MH-link descriptor identifies a service that is provided when a viewer demands additional information related to a specific matter described in a program arrangement information system. An MH-link descriptor may be included in the MPT, MH-EIT, MH-SDT, and the like.

(15) MH-Event Group Descriptor

An MH-event group descriptor is used to indicate that a plurality of events forms a group when these events are related to one another. An MH-event group descriptor may be included in MH-EIT.

(16) MH-Service List Descriptor

An MH-service list descriptor provides a list of services classified by service identifications and service types. An MH-service list descriptor may be included in MH-BIT.

(17) MH-Short Format Event Descriptor

An MH-short format event descriptor represents an event name and a short description of the event in a text format. An MH-short format event descriptor may be included in MH-EIT.

(18) MH-Extension Format Event Descriptor

An MH-extension format event descriptor is added to an MH-short format event descriptor, and provides a detailed description of an event. An MH-extension format event descriptor may be included in MH-EIT.

(19) Video Component Descriptor

A video component descriptor provides parameters and description for a video component, and is used also for expressing an elementary stream in a text format. A video component descriptor may be included in the MPT or MH-EIT.

(20) MH-Stream Identifying Descriptor

An MH-stream identifying descriptor is used to attach a label to a component stream for a service so that descriptive contents indicated by a video component descriptor in MH-EIT can be referred to with the label. An MH-stream identifying descriptor may be included in the MPT.

(21) MH-Content Descriptor

An MH-content descriptor indicates the genre of an event. An MH-content descriptor may be included in MH-EIT.

(22) MH-Parental Rate Descriptor

An MH-parental rate descriptor indicates age-based viewing restriction, and is used to extend the range of restriction based on other restriction conditions. An MH-parental rate descriptor may be included in the MPT or MH-EIT.

(23) MH-Audio Component Descriptor

An MH-audio component descriptor provides parameters for an audio elementary stream, and is used also for expressing the elementary stream in a text format. An MH-audio component descriptor may be included in the MPT or MH-EIT.

(24) MH-Target Area Descriptor

An MH-target area descriptor is used to describe a target area of a program or some streams making up the program. An MH-target area descriptor may be included in the MPT.

(25) MH-Series Descriptor

An MH-series descriptor is used to identify a series program. An MH-series descriptor may be included in MH-EIT.

(26) MH-SI Transmission Parameter Descriptor

An MH-SI transmission parameter descriptor is used to indicate SI transmission parameters. An MH-SI transmission parameter descriptor may be included in MH-BIT.

(27) MH-Broadcaster Name Descriptor

An MH-broadcaster name descriptor describes a name of a broadcaster. An MH-broadcaster name descriptor may be included in MH-BIT.

(28) MH-Service Descriptor

An MH-service descriptor expresses a name of a sub-channel and a name of a provider of the sub-channel in character code together with a service type. An MH-service descriptor may be included in MH-SDT.

(29) IP Data Flow Descriptor

An IP data flow descriptor provides information of IP data flow making up a service. An IP data flow descriptor may be included in MH-SDT.

(30) MH-CA Startup Descriptor

An MH-CA startup descriptor describes startup information for starting a CAS program on a CAS board. An MH-CA startup descriptor may be included in the MPT or CAT (CA).

(31) MH-Type Descriptor

An MH-Type descriptor indicates a type of a file transmitted by an application transmission method. An MH-Type descriptor may be included in a DAM table.

(32) MH-Info Descriptor

An MH-Info descriptor describes information related to MPU or an item. An MH-Info descriptor may be included in a DAM table.

(33) MH-Expire Descriptor

An MH-Expire descriptor describes an expiration date of an item. An MH-Expire descriptor may be included in a DAM table.

(34) MH-Compression Type Descriptor

An MH-Compression Type descriptor states that an item to be transmitted is compressed, and indicates a compression algorithm for the compression and the number of bytes of the item before the compression. An MH-Compression Type descriptor may be included in a DAM table.

(35) MH-Data Coding Method Descriptor

An MH-data coding method descriptor is used to identify a data coding method. An MH-data coding method descriptor may be included in the MPT.

(36) UTC-NPT Reference Descriptor

A UTC-NPT reference descriptor is used to transmit a relation between NPT (Normal Play Time) and UTC. A UTC-NPT reference descriptor may be included in EMT.

(37) Event Message Descriptor

An event message descriptor transmits information generally related to event messages. An event message descriptor may be included in EMT.

(38) MH-Local Time Offset Descriptor

An MH-local time offset descriptor is used to provide a given offset value to actual time (e.g., UTC+9 hours) and display time to a human system when a daylight saving time system is implemented. An MH-local time offset descriptor may be included in an MH-TOT.

(39) MH-Component Group Descriptor

An MH-component group descriptor defines and identifies a combination of components in an event. An MH-component group descriptor may be included in MH-EIT.

(40) MH-Logo Transmission Descriptor

An MH-logo transmission descriptor is used to describe pointing to a character string for a simplified logo and a logo in a CDT format. An MH-logo transmission descriptor may be included in MH-SDT.

(41) MPU Extension Timestamp Descriptor

An MPU extension timestamp descriptor provides a time to decode an access unit in MPU. An MPU extension timestamp descriptor may be included in the MPT.

(42) MPU Download Contents Descriptor

An MPU download contents descriptor is used to describe property information of contents that are downloaded using MPU. An MPU download contents descriptor may be included in MH-SDTT.

(43) MH-Network Download Contents Descriptor

An MH-network download contents descriptor is used to describe property information of contents that are downloaded through the network. An MH-network download contents descriptor may be included in MH-SDTT.

(44) MH-Application Descriptor

An MH-application descriptor describes information of an application. An MH-application descriptor may be included in an MH-AIT.

(45) MH-Transmission Protocol Descriptor

An MH-transmission protocol descriptor is used to specify a transmission protocol for broadcasting, communication, and the like, and to provide location information of an application depending on the transmission protocol. An MH-transmission protocol descriptor may be included in the MH-AIT.

(46) MH-Simplified Application Location Descriptor

An MH-simplified application location descriptor provides the detailed description of an acquisition destination of an application. An MH-simplified application location descriptor may be included in the MH-AIT.

(47) MH-Application Boundary Authority Setting Descriptor

An MH-application boundary authority setting descriptor provides a description for setting an application boundary and setting an authority for access to broadcasting resources for each region (URL). An MH-application boundary authority setting descriptor may be included in the MH-AIT.

(48) MH-Startup Priority Information Descriptor

An MH-startup priority information descriptor provides a description for specifying a startup priority of an application. An MH-startup priority information descriptor may be included in the MH-AIT.

(49) MH-Cache Information Descriptor

An MH-cache information descriptor provides a description used for cache control in a case where resources making up an application are saved in a cache when reuse of the application is assumed. An MH-cache information descriptor may be included in the MH-AIT.

(50) MH-Probability-Applied Delay Descriptor

An MH-probability-applied delay descriptor provides a description for delaying the time of execution of application control by a delay time set probabilistically, with the expectation that server access loads for acquiring the application are to be dispersed. An MH-probability-applied delay descriptor may be included in the MH-AIT.

(51) Link Destination PU Descriptor

A link destination PU descriptor describes another presentation unit (PU) to which a presentation unit may possibly make transition. A link destination PU descriptor may be included in a DCC table.

(52) Lock Cache Specifying Descriptor

A lock cache specifying descriptor describes a description for specifying a file to be cached and locked in a presentation unit. A lock cache specifying descriptor may be included in a DCC table.

(53) Unlock Cache Specifying Descriptor

An unlock cache specifying descriptor provides a description for specifying a file to be unlocked among locked files in a presentation unit. An unlock cache specifying descriptor may be included in a DCC table.

(54) MH-Download Protection Descriptor

An MH-download protection descriptor describes location information and transmission information of an MMTP packet to transmit a DCM or a DMM. An MH-download protection descriptor may be included in an MPT or an MH-SDTT.

(55) Application Service Descriptor

An application service descriptor describes entry information and the like of an application related to service. An application service descriptor may be included in an MPT.

(56) MPU Node Descriptor

An MPU node descriptor indicates that the MPU corresponds to a directory node defined by a data directory management table. An MPU node descriptor may be included in a DAM table.

(57) PU Configuration Descriptor

A PU configuration descriptor indicates a list of MPUs making up a presentation unit as mapping information of the presentation unit and a transmission unit. A PU configuration descriptor may be included in a DCC table.

(58) MH-Hierarchical Coding Descriptor

An MH-hierarchical coding descriptor describes information for identifying a video stream component that is subjected to hierarchical coding. An MH-hierarchical coding descriptor may be included in an MPT.

(59) Contents Copy Control Descriptor

A contents copy control descriptor indicates information for controlling copy generation in a digital recording apparatus with respect to the whole service, and is used by a broadcast station (a copyright owner side) to transmit information regarding copy or the maximum transmission rate to the digital recording apparatus in a case where it is supposed to execute digital recording. A contents copy control descriptor may be included in an MPT, an MH-EIT, an MH-SDT, or the like.

(60) Contents Usage Control Descriptor

A contents usage control descriptor is used for indicating information regarding copy control and remote viewing control in a case where with respect to a program data thereof are accumulated in a hard disk or the like or in a case where video/audio signals thereof are output from a receiver. A contents usage control descriptor may be included in an MPT, an MH-EIT, an MH-SDT, or the like.

(61) Descriptor Set by Provider

Other descriptors set uniquely by the service provider and the like may be prepared.

<Relation Between Data Transmission and Control Information in MMT Method>

Here, a relation between each of components, such as video and audio transmitted by a broadcasting system to which the broadcast receiving apparatus 100 according to the present embodiment corresponds, and typical tables of the MMT-SI will be described with reference to FIG. 7A. Note that in an MMT method, each of the components is defined as an asset and in the following, a component may be represented as an asset.

The broadcasting system compatible with the broadcast receiving apparatus 100 of the present embodiment can perform data transmission through a plurality of routes such as TLV streams transmitted through the broadcast transmission path and IP data flows transmitted through the communication line. A TLV stream includes TLV-SI such as a TLV-NIT and an AMT and an IP data flow which is a data flow of IP packets. The IP data flow includes a video asset including a series of video MPUs and an audio asset including a series of audio MPUs. Similarly, the IP data flow may include a subtitle asset including a series of subtitle MPUs, a caption asset including a series of caption MPUs, and a data asset including a series of data MPUs.

These various assets are associated with "package" by the description of the MPT (MMT package table) which is stored in a PA message to be transmitted. Specifically, these assets may be associated with each other by describing a package ID for identifying a package and an asset ID for identifying each asset contained in the package in the MPT. FIG. 7B shows one example of a data structure of the MPT. In FIG. 7B, a "MMT_package_id_byte" parameter corresponds to the package ID, and an "asset_id_byte" parameter corresponds to the asset ID.

Figure 7A:
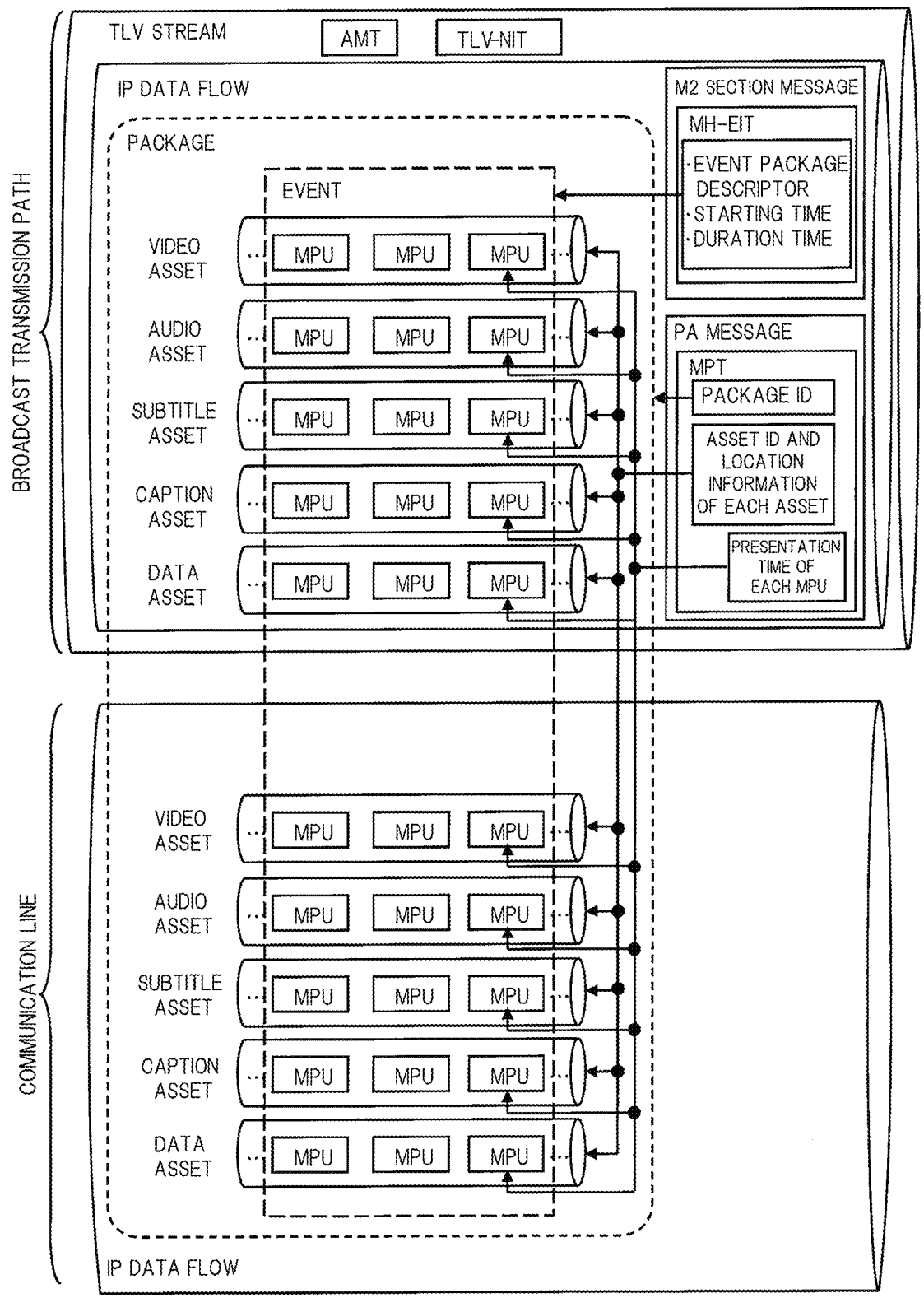
FIG. 7A is a diagram showing a relation between components and respective tables in the broadcasting system.

The assets making up a package may be limited to assets in a TLV stream, but may include assets transmitted by an IP data flow through the communication line as shown in FIG. 7A. This is made possible by describing location information of the asset in the MPT together with the asset ID for identifying each asset contained in the package so that the broadcast receiving apparatus 100 according to the present embodiment can know the reference destination of each asset. The location information is specified by "MMT_general_location_info( )" in the data structure of the MPT shown in FIG. 7B. FIG. 7C shows one example of a data structure of the location information.

In accordance with a value of a "location_type" parameter of the location information, the broadcast receiving apparatus 100 can refer to various pieces of data transmitted through various transmission routes including:

(1) data multiplexed in the same IP data flow as the MPT (location_type=0x00);

(2) data multiplexed in an IPv4 data flow (location_type=0x01);

(3) data multiplexed in an IPv6 data flow (location_type=0x02);

(4) data multiplexed in a broadcasting MPEG2-TS (location_type=0x03);

(5) data multiplexed in an MPEG2-TS format in an IP data flow (location_type=0x04); and (6) data located by a specified URL (location_type=0x05).

Among the reference destinations described above, (1) is, for example, an IP data flow that is contained in a TLV stream of a digital broadcasting signal that the broadcast receiving apparatus 100 according to the present embodiment receives via the antenna 100a. However, in a case where the MPT is also included in an IP data flow on the side of a communication line and is transmitted, the reference destination of (1) may be changed to an IP data flow received via the communication line. Further, (2), (3), (5), and (6) described above are IP data flows that the broadcast receiving apparatus 100 according to the present embodiment receives via the communication line. In addition, (4) described above can be used when to refer to the data multiplexed in MPEG2-TS received by the receiving function of receiving digital broadcasting signals transmitted by the MPEG2-TS method on the basis of location information of the MPT included in a digital broadcasting signal transmitted by the MMT method, in the case of the broadcast receiving apparatus having both of a receiving function of receiving digital broadcasting signals transmitted by the MMT method and a receiving function of receiving digital broadcasting signals transmitted by the MPEG2-TS method, like a broadcast receiving apparatus 800 of a second embodiment (will be descried later).

Further, a presentation time and/or a decoding time can be specified in units of MPU or access unit in the media such as video components and audio components. Information on the presentation time and the decoding time is described in the MPT as the MPU timestamp descriptor or the MPU extension timestamp descriptor. FIG. 7D shows one example of a data structure of the MPU timestamp descriptor in which information regarding the presentation time is described. Presentation time information in each of MPUs is specified by an "MPU_presentation_time" parameter of the MPU timestamp descriptor. Further, the MPU that becomes a target of the specification can be identified by an "MPU_sequence_number" parameter. In the broadcast receiving apparatus 100 according to the present embodiment, a plurality of MPUs specified by the MPT can be presented (displayed or output) in conjunction with each other by using the presentation time information, with reference to a clock based on the NTP which is time information expressed by the UTC notation. Further, the information regarding the decoding time is also similarly described by the MPU extension timestamp descriptor, but its detailed explanation will be omitted. Presentation control of various data using the clock based on the NTP will be described later.

In the broadcasting system according to the present embodiment, a series of data of the "package" unit corresponds to "service" of the digital broadcasting. Further, the "service" is a series of "programs" that are transmitted in accordance with a schedule. Each of the "programs" is treated in the MMT method as an "event". A starting time and a duration time of each of events are specified by the MH-EIT. Further, an ID of the MMT package to which each of the events is specified by the event package descriptor included in the MH-EIT. FIG. 7E shows one example of a data structure of the MH-EIT. The starting time is specified by a "start_time" parameter in FIG. 7E, and the duration time is specified by a "duration" parameter. FIG. 7F shows one example of a data structure of the event package descriptor. Correspondence between each event and the MMT package can be specified by the "MMT_package_id_byte" parameter of the event package descriptor included in the MH-EIT. The MH-EIT can be used for various processes performed in units of "event" (e.g., a process of creating an electronic program guide, a process of controlling timer recording and viewing reservation, a process of protecting copyrights such as temporary data storage, etc.) in the broadcast receiving apparatus 100 of the present embodiment.

[Hardware Configuration of Broadcast Receiving Apparatus]

Figure 8A:
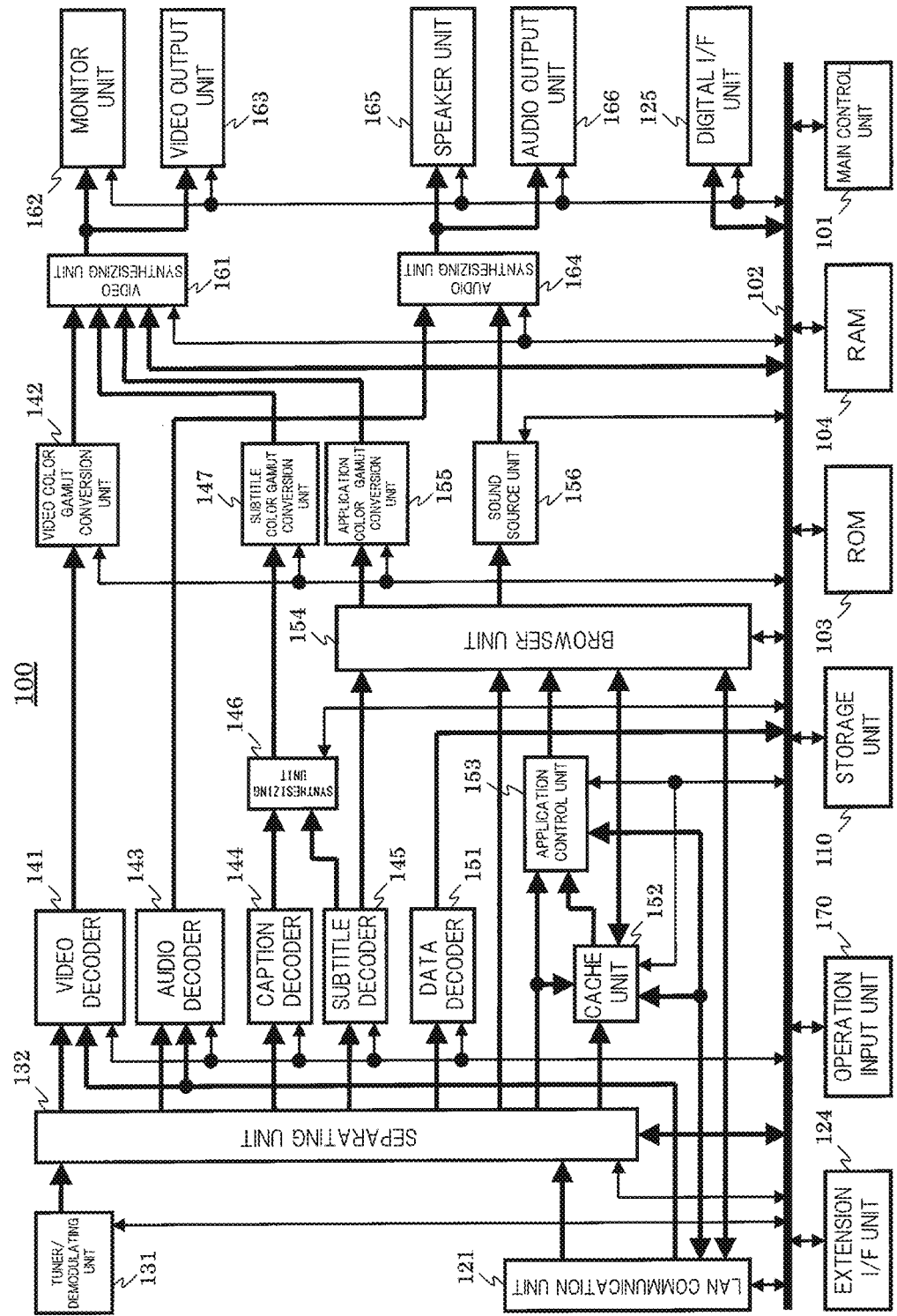
FIG. 8A is a block diagram of the broadcast receiving apparatus according to the first embodiment.

FIG. 8A is a block diagram showing an example of an internal configuration of the broadcast receiving apparatus 100. The broadcast receiving apparatus 100 includes a main control unit 101, a system bus 102, a ROM 103, a RAM 104, a storage (accumulation) unit 110, the LAN communication unit 121, an extension interface unit 124, a digital interface unit 125, the tuner/demodulating unit 131, a separating unit 132, a video decoder 141, a video color gamut conversion unit 142, an audio decoder 143, a caption decoder 144, a subtitle decoder 145, a subtitle synthesizing unit 146, a subtitle color gamut conversion unit 147, a data decoder 151, a cache unit 152, an application control unit 153, a browser unit 154, an application color gamut conversion unit 155, a sound source unit 156, a video synthesizing unit 161, a monitor unit 162, a video output unit 163, an audio synthesizing unit 164, a speaker unit 165, an audio output unit 166, and an operation input unit 170.

The main control unit 101 is a microprocessor unit that controls the whole of the broadcast receiving apparatus 100 in accordance with a predetermined operating program. The system bus 102 is a data communication path through which data is exchanged between the main control unit 101 and each of operating blocks in the broadcast receiving apparatus 100.

The ROM (Read Only Memory) 103 is a non-volatile memory storing a basic operating program such as operating system and other operating programs, and is provided as, for example, a rewritable ROM such as an EEPROM (Electrically Erasable Programmable ROM) and a flash ROM. The ROM 103 may store operation set values necessary for the operation of the broadcast receiving apparatus 100. The RAM (Random Access Memory) 104 serves as a work area used when the basic operating program and other operating programs are executed. The ROM 103 and the RAM 104 may be integrated with the main control unit 101. Further, a part of the memory region of the storage (accumulation) unit 110 may be used as the ROM 103 instead of providing the ROM 103 having the independent configuration shown in FIG. 8A.

The storage (accumulation) unit 110 stores the operating programs and operation set values of the broadcast receiving apparatus 100 and personal information of the user of the broadcast receiving apparatus 100. In addition, the storage (accumulation) unit 110 can store an operating program downloaded through the Internet 200 and various data created by the operating program. Further, the storage (accumulation) unit 110 can store such contents as moving images, still images, and sounds that are acquired from broadcast waves or downloaded through the Internet 200. A part of the memory region of the storage (accumulation) unit 110 may be used to substitute for a part or the whole of the function of the ROM 103. Further, the storage (accumulation) unit 110 needs to retain the stored information even when power is not supplied to the broadcast receiving apparatus 100 from an external power source. Therefore, the storage (accumulation) unit 110 is provided as, for example, a non-volatile semiconductor element memory such as a flash ROM or an SSD (Solid State Driver) or a magnetic disk drive such as an HDD (Hard Disc Drive).

Note that the operating programs stored in the ROM 103 and the storage (accumulation) unit 110 can be added, updated and functionally extended by a downloading process from server devices on the Internet 200.

The LAN (Local Area Network) communication unit 121 is connected to the Internet 200 via the router device 200r, and transmits and receives data to and from server devices and other communication equipment on the Internet 200. Further, the LAN communication unit 121 acquires an MMT data string (or part of it) of a program transmitted through the communication line. The LAN communication unit 121 may be connected to the router device 200r through wired communication or wireless communication such as Wi-Fi (registered trademark). The LAN communication unit 121 has a coding circuit, a decoding circuit, and the like. In addition, the broadcast receiving apparatus 100 may further include other communication units such as a BlueTooth (registered trademark) communication unit, an NFC communication unit, and an infrared communication unit.

The tuner/demodulating unit 131 receives broadcast waves transmitted from the radio tower 300t via the antenna 100a, and tunes to (selects) a channel giving a service that the user wishes to have, under the control by the main control unit 101. Further, the tuner/demodulating unit 131 demodulates a received broadcasting signal to acquire an MMT data string. Although the example of FIG. 8A shows the configuration in which the broadcast receiving apparatus 100 has one tuner/demodulating unit, the broadcast receiving apparatus 100 may be configured to have a plurality of tuner/demodulating units for the purpose of simultaneously displaying a plurality of screens or recording a program on a different channel.

The separating unit 132 is an MMT decoder, and distributes a video data string, an audio data string, a caption data string, a subtitle data string, and the like which are real-time presentation elements to the video decoder 141, the audio decoder 143, the caption decoder 144, the subtitle decoder 145, and the like, respectively, based on a control signal included in an MMT data string inputted to the separating unit 132. Data inputted to the separating unit 132 may be an MMT data string transmitted through the broadcast transmission path to the tuner/demodulating unit 131 and demodulated therein or an MMT data string transmitted through the communication line to the LAN communication unit 121. Further, the separating unit 132 reproduces a multimedia application and filed data which is an element making up the multimedia application, and stores them temporarily in the cache unit 152. In addition, the separating unit 132 extracts and outputs general-purpose data to the data decoder 151 in order to use it for the streaming of data used by a player that presents data other than video, audio, and subtitle or for the streaming of data for an application. Further, the separating unit 132 may perform control such as error correction, access restriction, and the like on the input MMT data string under the control by the main control unit 101.

The video decoder 141 decodes a video data string input from the separating unit 132 and outputs video information. The video color gamut conversion unit 142 performs a color space conversion process on the video information decoded in the video decoder 141 when necessary, in preparation for a video synthesizing process in the video synthesizing unit 161. The audio decoder 143 decodes an audio data string input from the separating unit 132 and outputs audio information. Further, for example, streaming data of an MPEG-DASH (MPEG-Dynamic Adaptive Streaming over HTTP) format or the like acquired from the Internet 200 through the LAN communication unit 121 may be inputted to the video decoder 141 and the audio decoder 143. A plurality of video decoders 141, video color gamut conversion units 142, audio decoders 143, and the like may be provided in order to simultaneously decode a plurality of kinds of video data strings and audio data strings.

The caption decoder 144 decodes a caption data string input from the separating unit 132 and outputs caption information. The subtitle decoder 145 decodes a subtitle data string input from the separating unit 132 and outputs subtitle information. The caption information output from the caption decoder 144 and the subtitle information output from the subtitle decoder 145 are subjected to a synthesizing process in the subtitle synthesizing unit 146 and then subjected to a color space conversion process in the subtitle color gamut conversion unit 147 when necessary, in preparation for the video synthesizing process in the video synthesizing unit 161. In the present embodiment, among services presented simultaneously with the video of a broadcasting program and provided mainly as text information, a service related to the video contents is referred to as subtitle, while a service other than that is referred to as caption. When these services are not distinguished from each other, they are collectively referred to as subtitle.

The browser unit 154 presents a multimedia application file and filed data making up the multimedia application file, which are acquired from the cache unit 152 or a server device on the Internet 200 through the LAN communication unit 121, in accordance with an instruction of the application control unit 153, which interprets control information included in an MMT data string and control information acquired from a server device on the Internet 200 through the LAN communication unit 121. Note that the multimedia application file may be, for example, an HTML (Hyper Text Markup Language) document or BML (Broadcast Markup Language) document. The application information output from the browser unit 154 is subjected to a color space conversion process in the application color gamut conversion unit 155 when necessary, in preparation for the video synthesizing process in the video synthesizing unit 161. Further, the browser unit 154 causes the sound source unit 156 to reproduce application audio information.

The video synthesizing unit 161 receives video information output from the video color gamut conversion unit 142, subtitle information output from the subtitle color gamut conversion unit 147, application information output from the application color gamut conversion unit 155, and the like, and performs a selection process and/or a superposition process as appropriate. The video synthesizing unit 161 has a video RAM (not shown), and the monitor unit 162 and the like are driven based on video information and the like inputted to the video RAM. Further, the video synthesizing unit 161 performs a scaling process and a superposing process of EPG (Electronic Program Guide) screen information created based on information such as MH-EIT included in MMT-SI when necessary under the control by the main control unit 101. The monitor unit 162 is, for example, a display device such as liquid crystal panel, and offers the video information subjected to the selection process and/or superposition process in the video synthesizing unit 161, to the user of the broadcast receiving apparatus 100. The video output unit 163 is a video output interface that outputs the video information subjected to the selection process and/or superposition process in the video synthesizing unit 161.

Figure 8B:
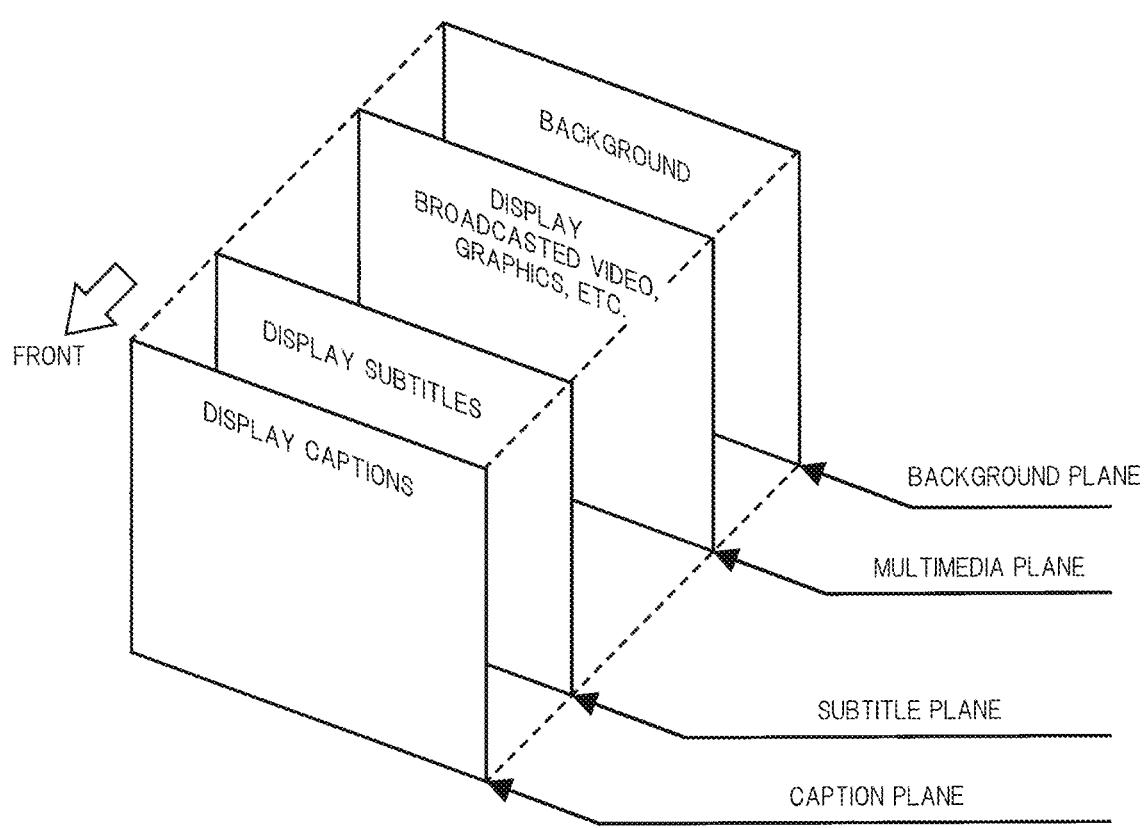
FIG. 8B is a configuration diagram of a logical plane structure of a presentation function of the broadcast receiving apparatus according to the first embodiment.

Note that the presentation function of the broadcast receiving apparatus 100 of the present embodiment has a logical plane structure for displaying a multimedia service in accordance with the intention of the service provider. FIG. 8B shows one example of a configuration of the logical plane structure that the presentation function of the broadcast receiving apparatus 100 of the present embodiment has. In the logical plane structure, a caption plane that displays captions is located on the forefront layer, a subtitle plane that displays subtitles is located on the second layer, a multimedia plane that displays broadcast video, multimedia application or synthesized video thereof is located on the third layer, and a background plane is located on the rearmost layer. The subtitle synthesizing unit 146 and the video synthesizing unit 161 draw the caption information on the caption plane, the subtitle information on the subtitle plane, and the video information, application information, and the like on the multimedia plane. Further, background color is drawn on the background plane based on an LCT included in MMT-SI. Note that it is also possible to provide a plurality of multimedia planes on the third layer in accordance with the number of video decoders 141. However, even when a plurality of multimedia planes is provided, application information and the like output from the application color gamut conversion unit 155 are displayed only on the multimedia plane located on the forefront layer.

The audio synthesizing unit 164 receives audio information output from the audio decoder 143 and application audio information reproduced in the sound source unit 156, and performs a selection process and/or a mixing process as appropriate. The speaker unit 165 offers audio information subjected to the selection process and/or mixing process in the audio synthesizing unit 164 to the user of the broadcast receiving apparatus 100. The audio output unit 166 is an audio output interface that outputs the audio information subjected to the selection process and/or mixing process in the audio synthesizing unit 164.

The extension interface unit 124 is a group of interfaces for extending the function of the broadcast receiving apparatus 100, and is configured of an analog video and audio interface, a USB (Universal Serial Bus) interface, a memory interface, and the like in the present embodiment. The analog video and audio interface receives analog video and audio signals from external video and audio output devices, and outputs analog video and audio signals to external video and audio input devices. The USB interface is connected to a PC and the like and transmits and receives data to and from the PC and the like. An HDD may be connected to the USB interface to record broadcasting programs and contents. A keyboard and other USB devices may also be connected to the USB interface. A memory card and other memory media are connected to the memory interface to transmit and receive data to and from them.

The digital interface unit 125 is an interface that outputs or receives coded digital video data and/or digital audio data. The digital interface unit 125 can output an MMT data string acquired by the demodulation in the tuner/demodulating unit 131, an MMT data string acquired through the LAN communication unit 121, or mixed data of the MMT data strings as it is. Further, the MMT data string input from the digital interface unit 125 may be controlled to be inputted to the separating unit 132. It is also possible to output the digital contents stored in the storage (accumulation) unit 110 via the digital interface unit 125 or store the digital contents to the storage (accumulation) unit 110 via the digital interface unit 125.

The digital interface unit 125 is provided as a DVI terminal, HDMI (registered trademark) terminal, or Displayer Port (registered trademark) terminal, and thus outputs and receives data in the format compliant with DVI specifications, HDMI specifications, or Displayer Port specifications. Alternatively, the digital interface unit 125 may output or receive data in a serial data format conforming to IEEE 1394 specifications and the like. Further, the digital interface unit 125 may be configured as an IP interface that performs the digital interface output via hardware such as Ethernet (registered trademark) and wireless LAN. In such a case, the digital interface unit 125 and the LAN communication unit 121 may share the hardware configuration.

The operation input unit 170 is an instruction input unit on which operation instructions to the broadcast receiving apparatus 100 are input. In the present embodiment, the operation input unit 170 is configured of a remote control receiving unit that receives commands transmitted from a remote controller and operation keys in which button switches are arranged (not shown), or may be configured of either the remote control receiving unit or the operation keys. Alternatively, the operation input unit 170 may be substituted by a touch panel overlaid on the monitor unit 162 or by a keyboard and others connected to the extension interface unit 124. The remote controller (not shown) may be substituted by the portable information terminal 700 having a remote control command transmission function.

Note that, when the broadcast receiving apparatus 100 is a television receiver or the like as mentioned above, the video output unit 163 and the audio output unit 166 are not essential constituent elements of the present invention. Further, the broadcast receiving apparatus 100 is not limited to a television receiver, but may be an optical disc drive recorder such as DVD (Digital Versatile Disc) recorder, a magnetic disk drive recorder such as an HDD recorder, or an STB (Set Top Box). The broadcast receiving apparatus 100 may also be a PC (Personal Computer), a tablet terminal, a navigation device, a game machine, and the like having a digital broadcast receiving function and a broadcasting/communication cooperation function. When the broadcast receiving apparatus 100 is the DVD recorder, the HDD recorder, STB, or the like, the broadcast receiving apparatus 100 does not have to be provided with the monitor unit 162 and the speaker unit 165. In such a case, the operation similar to that of the broadcast receiving apparatus 100 of the present embodiment is possible by connecting an external monitor and an external speaker to the video output unit 163, the audio output unit 166, or the digital interface unit 125.

[Software Configuration of Broadcast Receiving Apparatus]

Figure 8C:
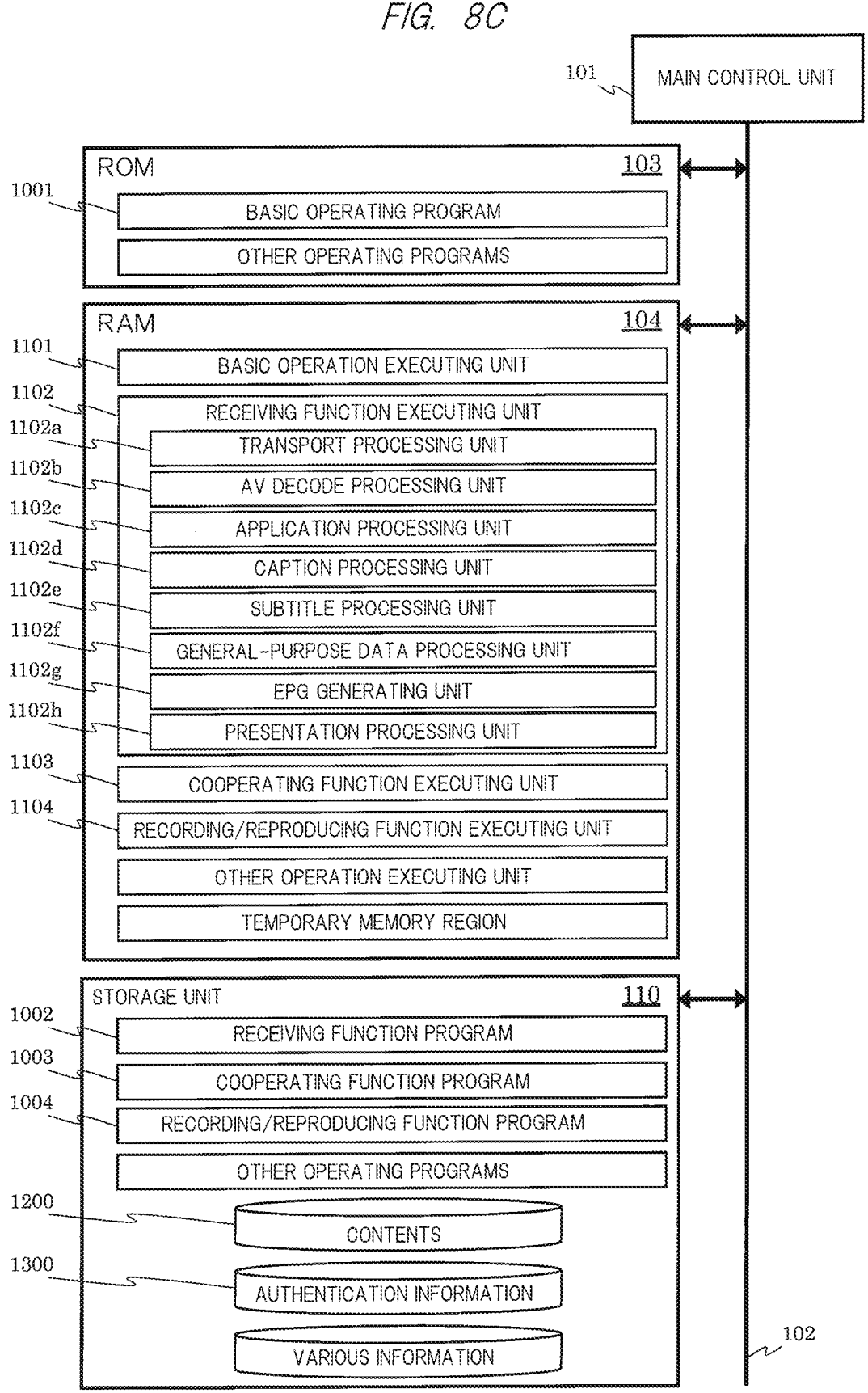
FIG. 8C is a software configuration diagram of the broadcast receiving apparatus according to the first embodiment.

FIG. 8C is a software configuration diagram of the broadcast receiving apparatus 100 of the present embodiment, and shows respective software configurations of the ROM 103, the RAM 104, and the storage (accumulation) unit 110. In the present embodiment, the ROM 103 stores a basic operating program 1001 and other operating programs, and the storage (accumulation) unit 110 stores a receiving function program 1002, a cooperating function program 1003, a recording/reproducing function program 1004, and other operating programs. Further, the storage (accumulation) unit 110 includes a contents memory region 1200 storing such contents as moving images, still images, and sounds, an authentication information memory region 1300 storing authentication information and the like needed when access is made to an external portable terminal or server device, and a various information memory region storing other various types of information.

The basic operating program 1001 stored in the ROM 103 is loaded onto the RAM 104, and the loaded basic operating program 1001 is executed by the main control unit 101 to configure a basic operation executing unit 1101. Similarly, the receiving function program 1002, the cooperating function program 1003, and the recording/reproducing function program 1004 stored in the storage (accumulation) unit 110 are loaded onto the RAM 104, and the receiving function program 1002, the cooperating function program 1003, and the recording/reproducing function program 1004 thus loaded are executed by the main control unit 101 to configure a receiving function executing unit 1102, a cooperating function executing unit 1103, and a recording/reproducing function executing unit 1104, respectively. Further, the RAM 104 has a temporary memory region that temporarily saves data created at execution of each operating program when necessary.

In the following, for simpler description, a process in which the main control unit 101 loads the basic operating program 1001 from the ROM 103 onto the RAM 104 and executes the basic operating program 1001 to control each operating block is described simply as a process in which the basic operation executing unit 1101 performs control of each operating block. The same applies also to the description of other operating programs.

The receiving function executing unit 1102 controls each operating block of the broadcast receiving apparatus 100 to reproduce video and audio components transmitted by the broadcasting system of the present embodiment. In particular, a transport processing unit 1102a mainly controls the MMT decoder function of the separating unit 132, and distributes a video data string, audio data string, and the like separated from an MMT data string to corresponding decode processing units, respectively. An AV decode processing unit 1102b mainly controls the video decoder 141, the audio decoder 143, and the like. An application processing unit 1102c mainly controls the cache unit 152, the application control unit 153, the browser unit 154, and the sound source unit 156. A caption processing unit 1102d mainly controls the caption decoder 144. A subtitle processing unit 1102e mainly controls the subtitle decoder 145. A general-purpose data processing unit 1102f mainly controls the data decoder 151. An EPG generating unit 1102g interprets the descriptive contents of an MH-EIT and others included in MMT-SI to generate an EPG screen. A presentation processing unit 1102h mainly controls the video color gamut conversion unit 142, the subtitle synthesizing unit 146, the subtitle color gamut conversion unit 147, the application color gamut conversion unit 155, the video synthesizing unit 161, and the audio synthesizing unit 164 based on the logical plane structure.

Further, the cooperating function executing unit 1103 manages device authentication and connection, data transmission and reception, and the like when the broadcast receiving apparatus 100 performs operations cooperated with an external apparatus such as the portable information terminal 700. The recording/reproducing function executing unit 1104 performs controls when broadcasting programs acquired from digital broadcast waves of the present broadcasting system, contents acquired from each of server devices on the network, and the like are recorded in the contents memory region 1200 of the storage (accumulation) unit 110 or an external storage and the like that are connected to the extension interface unit 124 or when the broadcasting program and/or contents is reproduced.

The above-described operating programs may be stored in advance in the ROM 103 and/or the storage (accumulation) unit 110 at the time of product shipment, or may be acquired from the other application server 500 and others on the Internet 200 through the LAN communication unit 121 after the product shipment. Alternatively, the operating programs stored in a memory card, optical disc, and the like may be acquired through the extension interface unit 124 and others.

[Configuration of Broadcast Station Server]

Figure 9:
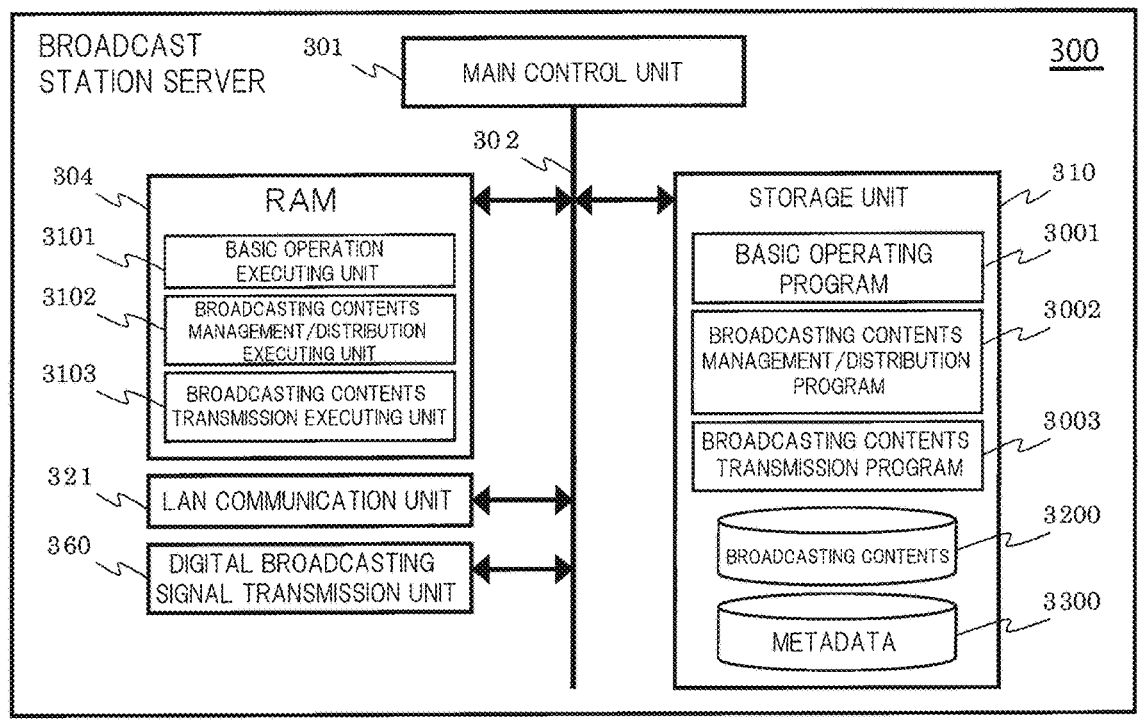
FIG. 9 is a block diagram of a broadcast station server according to the first embodiment.

FIG. 9 is a block diagram showing an example of an internal configuration of the broadcast station server 300. The broadcast station server 300 includes a main control unit 301, a system bus 302, a RAM 304, a storage unit 310, a LAN communication unit 321, and a digital broadcasting signal transmission unit 360.

The main control unit 301 is a microprocessor unit that controls the whole of the broadcast station server 300 in accordance with a predetermined operating program. The system bus 302 is a data communication path through which data is exchanged between the main control unit 301 and each of operating blocks in the broadcast station server 300. The ROM 304 serves as a work area used when each operating program is executed.

The storage unit 310 stores a basic operating program 3001, a broadcasting contents management/distribution program 3002, and a broadcasting contents transmission program 3003, and includes a broadcasting contents memory region 3200 and a metadata memory region 3300. The broadcasting contents memory region 3200 stores the contents of broadcasting programs and others broadcasted by the broadcast station. The metadata memory region 3300 stores metadata such as the titles, IDs, summaries, casts, and broadcasting dates of the broadcasting programs and copy control information related to program contents.

Further, the basic operating program 3001, the broadcasting contents management/distribution program 3002, and the broadcasting contents transmission program 3003 stored in the storage unit 310 are loaded onto the RAM 304, and the respective loaded programs are executed by the main control unit 301 to configure a basic operation executing unit 3101, a broadcasting contents management/distribution executing unit 3102, and a broadcasting contents transmission executing unit 3103.

In the following, for simpler description, a process in which the main control unit 301 loads the basic operating program 3001 from the storage unit 310 onto the RAM 304 and executes the basic operating program 3001 to control each operating block is described simply as a process in which the basic operation executing unit 3101 performs control of each operating block. The same applies also to the description of other operating programs.

The broadcasting contents management/distribution executing unit 3102 performs management of the contents of broadcasting programs stored in the broadcasting contents memory region 3200 and the metadata stored in the metadata memory region 3300, and performs control when the contents of broadcasting programs and metadata are delivered to a service provider based on a contract. Further, when delivering the contents of broadcasting programs and metadata to the service provider, the broadcasting contents management/distribution executing unit 3102 may perform a process of authenticating the service provider server 400 based on the contract when necessary.

The broadcasting contents transmission executing unit 3103 manages a time schedule and others when transmitting an MMT data string, which includes the contents of broadcasting programs accumulated in the broadcasting contents memory region 3200, and the titles and IDs of broadcasting programs and copy control information of program contents accumulated in the metadata memory region 3300, from the radio tower 300t via the digital broadcasting signal transmission unit 360.

The LAN communication unit 321 is connected to the Internet 200, and communicates with the service provider server 400 and others on the Internet 200. The LAN communication unit 321 has a coding circuit, a decoding circuit, and the like. The digital broadcasting signal transmission unit 360 modulates an MMT data string composed of a video data string, audio data string, program data string, and the like of the contents of broadcasting programs accumulated in the broadcasting contents memory region 3200, and transmits the modulated data string as the digital broadcast waves through the radio tower 300t.

[Configuration of Service Provider Server]

Figure 10:
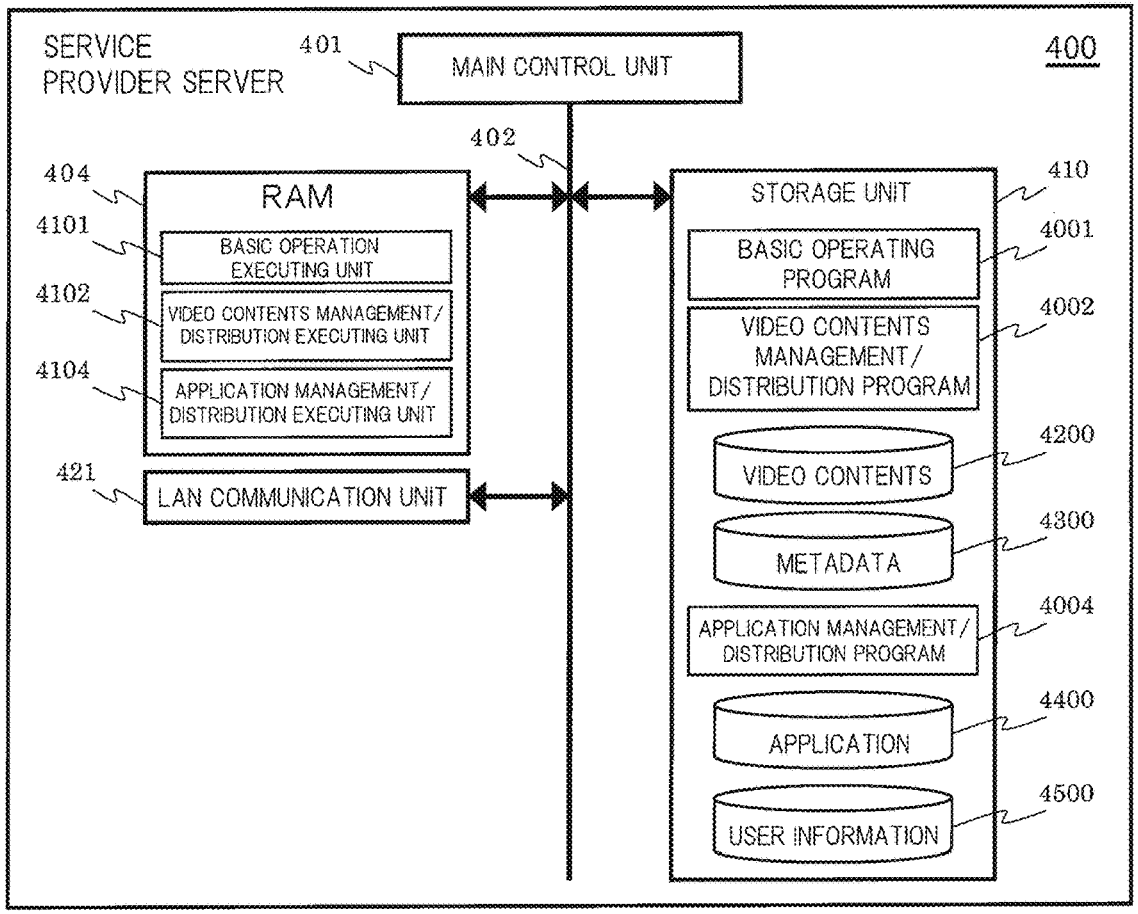
FIG. 10 is a block diagram of a service provider server according to the first embodiment.

FIG. 10 is a block diagram showing an example of an internal configuration of the service provider server 400. The service provider server 400 includes a main control unit 401, a system bus 402, a RAM 404, a storage unit 410, and a LAN communication unit 421.

The main control unit 401 is a microprocessor unit that controls the whole of the service provider server 400 in accordance with a predetermined operating program. The system bus 402 is a data communication path through which data is exchanged between the main control unit 401 and each of operating blocks in the service provider server 400. The ROM 404 serves as a work area that is used when each operating program is executed.

The storage unit 410 stores a basic operating program 4001, a video contents management/distribution program 4002, and an application management/distribution program 4004, and includes a video contents memory region 4200, a metadata memory region 4300, an application memory region 4400, and a user information memory region 4500. The video contents memory region 4200 stores the contents of broadcasting programs provided from the broadcast station server 300 as video contents, and stores video contents and the like created by the service provider. The metadata memory region 4300 stores metadata provided from the broadcast station server 300 and metadata related to video contents created by the service provider. The application memory region 4400 stores various applications and others for distributing the services cooperated with broadcasting programs in response to demands from television receivers. The user information memory region 4500 stores information (personal information, authentication information, etc.) related to a user who is permitted to access the service provider server 400.

Further, the basic operating program 4001, the video contents management/distribution program 4002, and the application management/distribution program 4004 stored in the storage unit 410 are loaded onto the RAM 404, and the respective loaded basic operating program, video contents management/distribution program, and application management/distribution program are executed by the main control unit 401 to configure a basic operation executing unit 4101, a video contents management/distribution executing unit 4102, and an application management/distribution executing unit 4104.

In the following, for simpler description, a process in which the main control unit 401 loads the basic operating program 4001 stored in the storage unit 410 onto the RAM 404 and executes the basic operating program 4001 to control each operating block is described simply as a process in which the basic operation executing unit 4101 performs control of each operating block. The same applies also to description of other operating programs.

The video contents management/distribution executing unit 4102 acquires the contents and others of broadcasting programs and metadata from the broadcast station server 300, manages video contents and others and metadata stored in the video contents memory region 4200 and the metadata memory region 4300, and controls distribution of the video contents and others and metadata to television receivers. Further, when distributing the video contents and others and metadata to the television receivers, the video contents management/distribution executing unit 4102 may perform a process of authenticating the television receivers when necessary. Further, the application management/distribution executing unit 4104 manages applications stored in the application memory region 4400 and controls distribution of the applications in response to demands from the television receivers. Further, when distributing the applications to the television receivers, the application management/distribution executing unit 4104 may perform a process of authenticating the television receivers when necessary.

The LAN communication unit 421 is connected to the Internet 200, and communicates with the broadcast station server 300 on the Internet 200 and the broadcast receiving apparatus 100 via the router device 200r. The LAN communication unit 421 includes a coding circuit, a decoding circuit, and the like.

[Hardware Configuration of Portable Information Terminal]

Figure 11A:
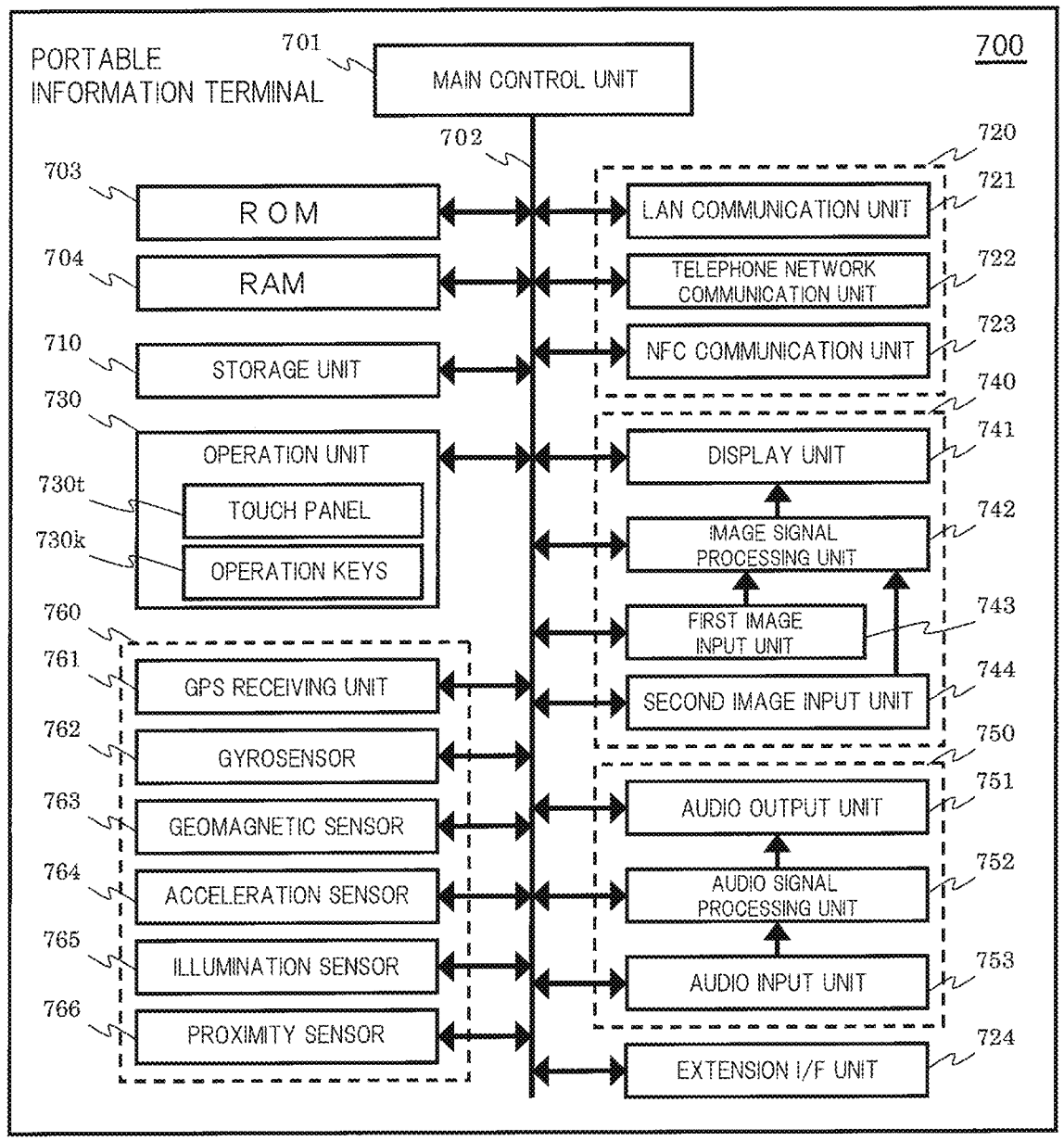
FIG. 11A is a block diagram of a portable information terminal according to the first embodiment.

FIG. 11A is a block diagram showing an example of an internal configuration of the portable information terminal 700. The portable information terminal 700 includes a main control unit 701, a system bus 702, a ROM 703, a RAM 704, a storage unit 710, a communication processing unit 720, an extension interface unit 724, an operation unit 730, an image processing unit 740, an audio processing unit 750, and a sensor unit 760.

The main control unit 701 is a microprocessor unit that controls the whole of the portable information terminal 700 in accordance with a predetermined operating program.

The system bus 702 is a data communication path through which data is exchanged between the main control unit 701 and each of operating blocks in the portable information terminal 700.

The ROM 703 is a memory storing a basic operating program such as operating system and other operating programs, and is provided as, for example, a rewritable ROM such as EEPROM and flash ROM. The RAM 704 serves as a work area used when the basic operating program and other operating programs are executed. The ROM 703 and the RAM 704 may be integrated with the main control unit 701. Further, a part of the memory region of the storage unit 710 may be used as the ROM 703 instead of providing the ROM 703 having the independent configuration shown in FIG. 11A.

The storage unit 710 stores the operating programs and operation set values of the portable information terminal 700 and personal information of the user of the portable information terminal 700. In addition, the storage unit 710 can store an operating program downloaded through the Internet 200 and various data created by the operating program. Further, the storage unit 710 can store such contents as moving images, still images, and sounds that are downloaded through the Internet 200. A part of the memory region of the storage unit 710 may be used to substitute for a part or the whole of the function of the ROM 703. Further, the storage unit 710 needs to retain the stored information even when power is not supplied to portable information terminal 700 from an external power source. Therefore, the storage unit 710 is provided as, for example, a non-volatile semiconductor element memory such as flash ROM or SSD or a magnetic disk drive such as an HDD.

Note that the operating programs stored in the ROM 703 and the storage unit 710 can be added, updated and functionally extended by the downloading process from server devices on the Internet 200.

The communication processing unit 720 includes a LAN communication unit 721, a mobile phone network communication unit 722, and an NFC communication unit 723. The LAN communication unit 721 is connected to the Internet 200 via the router device 200r and the access point 200a, and transmits and receives data to and from server devices and other communication equipment on the Internet 200. The LAN communication unit 721 is connected to the router device 200r and the access point 200a through wireless communication such as Wi-Fi (registered trademark). The mobile phone network communication unit 722 performs telephone communication (telephone call) and data transmission and reception through wireless communication with the base station 600b on the mobile phone communication network. The NFC communication unit 723 communicates wirelessly with the corresponding reader/writer when located in proximity to the reader/writer. The LAN communication unit 721, the mobile phone network communication unit 722, and the NFC communication unit 723 each have a coding circuit, a decoding circuit, an antenna, and the like. The communication processing unit 720 may further includes other communication units such as a BlueTooth (registered trademark) communication unit and an infrared communication unit.

The extension interface unit 724 is a group of interfaces for extending the function of the portable information terminal 700, and is configured of a video and audio interface, a USB interface, a memory interface, and the like in the present embodiment. The video and audio interface receives video and audio signals from external video and audio output devices, and outputs video and audio signals to external video and audio input devices. The USB interface is connected to a PC and others and transmits and receives data to and from the PC and others. A keyboard and other USB devices may also be connected to the USB interface. A memory card and other memory media are connected to the memory interface to transmit and receive data to and from them.

The operation unit 730 is an instruction input unit that inputs operation instructions to the portable information terminal 700. In the present embodiment, the operation unit 730 is composed of a touch panel 730t overlaid on a display unit 741 and operation keys 730k in which button switches are arranged. The operation unit 730 may be composed of either the touch panel 730t or the operation keys 730k. The portable information terminal 700 may be operated using a keyboard or the like connected to the extension interface unit 724, or may be operated using a separate terminal device connected through wired communication or wireless communication. Namely, the portable information terminal 700 may be operated through instructions from the broadcast receiving apparatus 100. Further, the display unit 741 may be provided with the above-described touch panel function.

The image processing unit 740 includes the display unit 741, an image signal processing unit 742, a first image input unit 743, and a second image input unit 744. The display unit 741 is, for example, a display device such as liquid crystal panel, and offers image data processed in the image signal processing unit 742 to the user of the portable information terminal 700. The image signal processing unit 742 has a video RAM (not shown), and the display unit 741 is driven based on image data inputted to the video RAM. Further, the image signal processing unit 742 has a function of performing processes of converting formats, superposing a menu and other OSD (On Screen Display) signals, and others when necessary. Each of the first image input unit 743 and the second image input unit 744 is a camera unit that inputs image data of surroundings or a target object by converting light input through a lens into electrical signals by using an electronic device such as a CCD (Charge Coupled Device) and CMOS (Complementary Metal Oxide Semiconductor) sensor.

The audio processing unit 750 includes an audio output unit 751, an audio signal processing unit 752, and an audio input unit 753. The audio output unit 751 is a speaker, and offers an audio signal processed in the audio signal processing unit 752 to the user of the portable information terminal 700. The audio input unit 753 is a microphone, and converts the voice of the user and others into audio data to input it to the portable information terminal 700.

The sensor unit 760 is a group of sensors that detect the state of the portable information terminal 700, and includes a GPS receiving unit 761, a gyro sensor 762, a geomagnetic sensor 763, an acceleration sensor 764, an illuminance sensor 765, and a proximity sensor 766 in the present embodiment. These sensors make it possible to detect the location, tilt, angle, and motion of the portable information terminal 700, and the brightness and the proximity of an object around the portable information terminal 700. The portable information terminal 700 may further include other sensors such as a pressure sensor in addition to these sensors.

The portable information terminal 700 may be provided as a cellular phone, a smartphone, or a tablet terminal, or may be provided as a PDA (Personal Digital Assistants), a notebook PC, or the like. Alternatively, the portable information terminal 700 may be provided as a digital still camera, a video camera capable of taking moving pictures, a portable game machine, a navigation device, or other portable digital devices.

The configuration example of the portable information terminal 700 shown in FIG. 11A includes a number of constituent elements that are not essential to the present embodiment such as the sensor unit 760, but even the configuration that does not include such constituent elements does not impair the effect of the present embodiment. The portable information terminal 700 may further include additional constituent elements (not shown) such as a digital broadcast receiving function and an electronic money settlement function.

[Software Configuration of Portable Information Terminal]

Figure 11B:
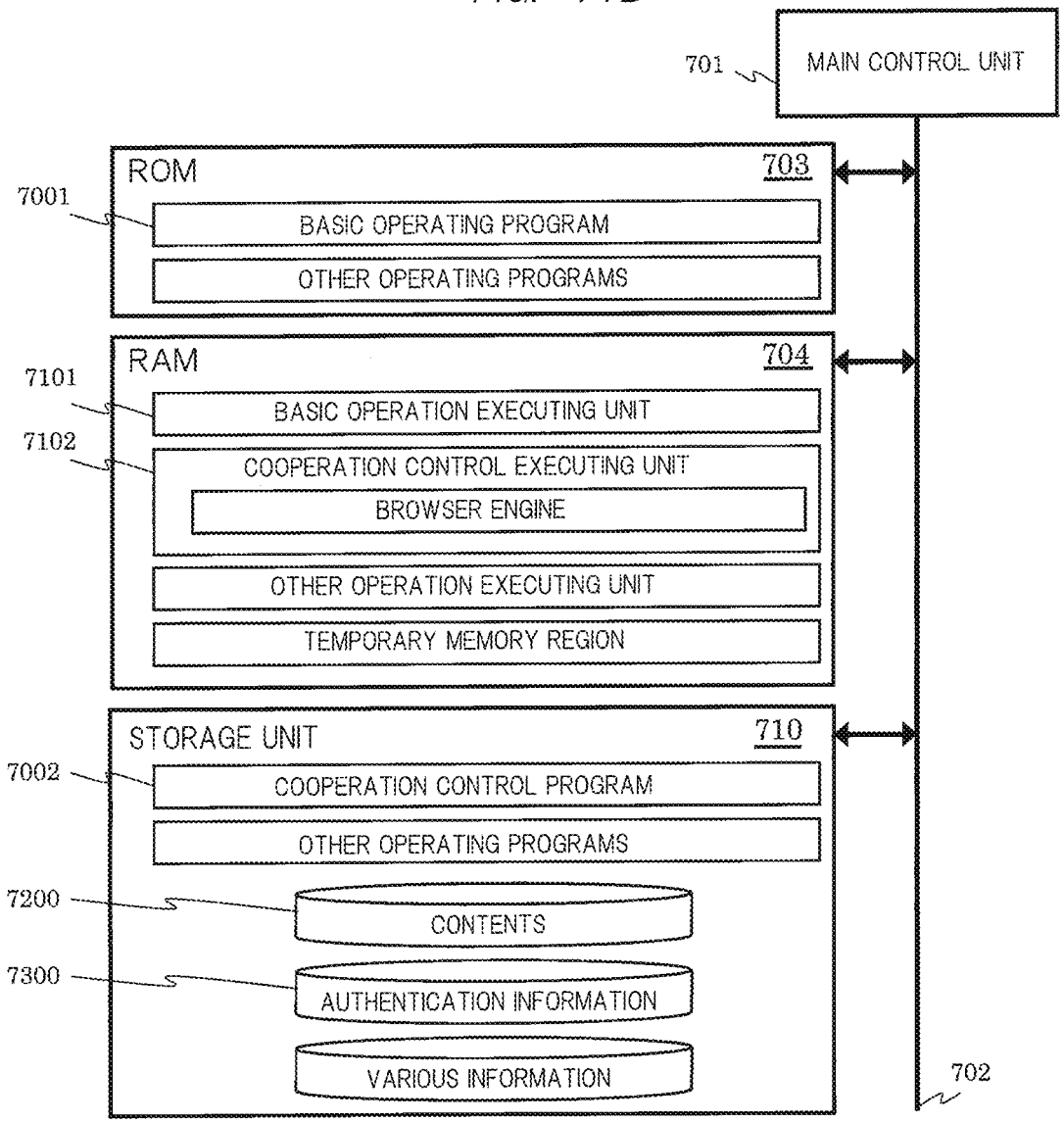
FIG. 11B is a software configuration diagram of the portable information terminal according to the first embodiment.

FIG. 11B is a software configuration diagram of the portable information terminal 700 of the present embodiment, and shows respective software configurations of the ROM 703, the RAM 704, and the storage unit 710. In the present embodiment, the ROM 703 stores a basic operating program 7001 and other operating programs, and the storage unit 710 stores a cooperation control program 7002 and other operating programs. Further, the storage unit 710 includes a contents memory region 7200 storing such contents as moving images, still images, and sounds, an authentication information memory region 7300 storing authentication information and others needed when access is made to the television receiver or each server device, and a various information memory region storing other various types of information.

The basic operating program 7001 stored in the ROM 703 is loaded onto the RAM 704, and the loaded basic operating program is executed by the main control unit 701 to configure a basic operation executing unit 7101. Similarly, the cooperation control program 7002 stored in the storage unit 710 is loaded onto the RAM 704, and the loaded cooperation control program 7002 is executed by the main control unit 701 to configure a cooperation control executing unit 7102. Further, the RAM 704 has a temporary memory region that temporarily saves data created at execution of each operating program when necessary.

In the following, for simpler description, a process in which the main control unit 701 loads the basic operating program 7001 from the ROM 703 onto the RAM 704 and executes the basic operating program 7001 to control each operating block is described simply as a process in which the basic operation executing unit 7101 performs control of each operating block. The same applies also to the description of other operating programs.

The cooperation control executing unit 7102 manages device authentication, connection, data transmission and reception, and the like when the portable information terminal 700 performs operations cooperated with the television receiver. Further, the cooperation control executing unit 7102 has a browser engine function for executing an application cooperated with the television receiver.

The above-described operating programs may be stored in advance in the ROM 703 and/or the storage unit 710 at the time of product shipment, or may be acquired from the other application server 500 and others on the Internet 200 through the LAN communication unit 721 or the mobile phone network communication unit 722 after the product shipment. Alternatively, the operating programs stored in a memory card, optical disc, and the like may be acquired through the extension interface unit 724 and others.

[Time Management of Broadcast Receiving Apparatus]

The broadcast receiving apparatus 100 according to the present embodiment has two types of time management functions. A first time management function is a time management function based on the NTP, and a second time management function is a time management function based on the MH-TOT. In the following, the two types of time management functions will be described.

<Time Management Function Based on NTP>

First, the time management function based on the NTP will be described.

Figure 12A:
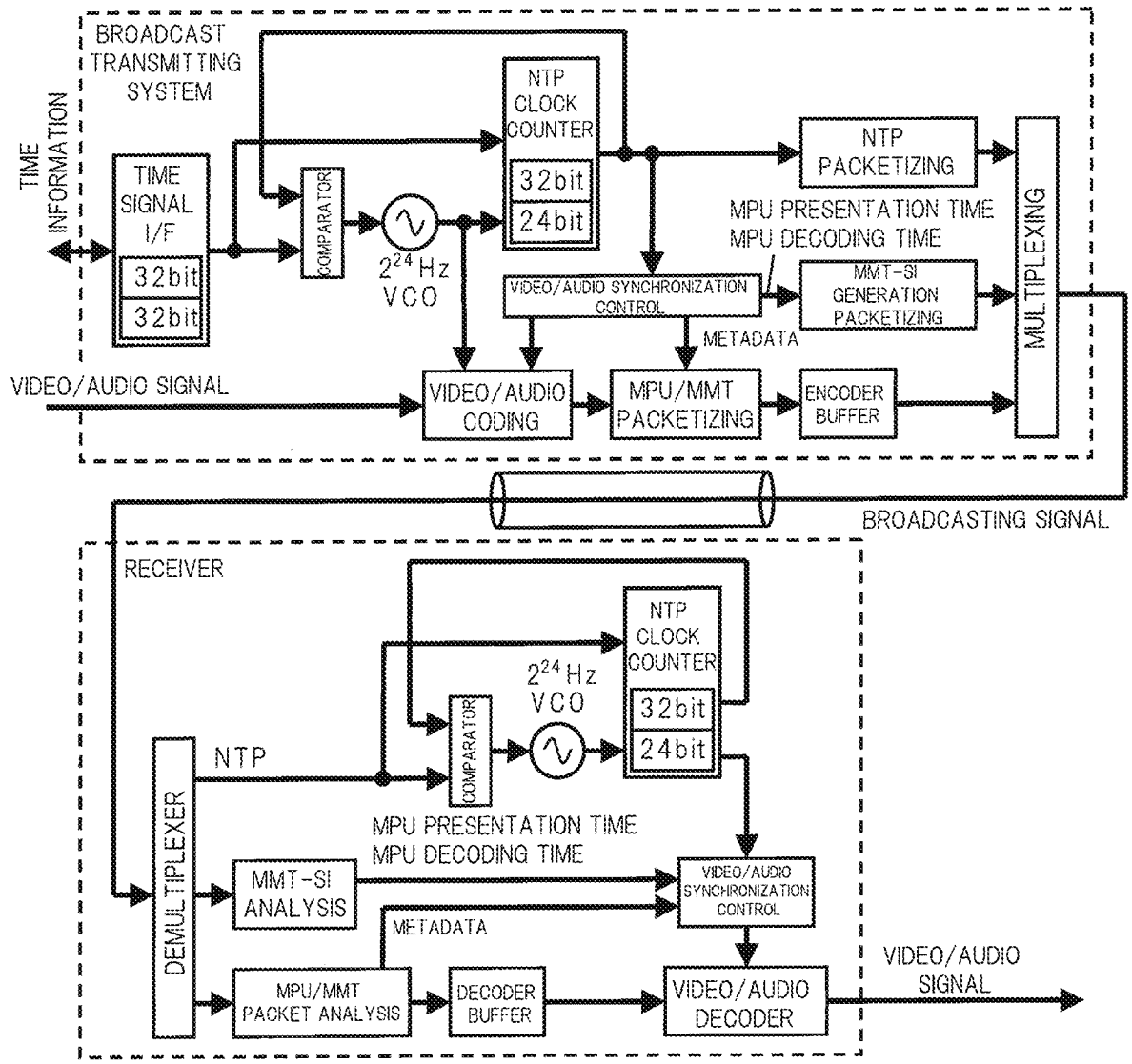
FIG. 12A is a system configuration diagram of clock synchronization/presentation synchronization in the broadcast receiving apparatus according to the first embodiment.

FIG. 12A shows one example of a system configuration for clock synchronization/presentation synchronization in the broadcasting system compatible with the broadcast receiving apparatus 100 of the present embodiment. In the broadcasting system of the present embodiment, UTC expressed in a 64-bit-length NTP timestamp format is transmitted from the broadcast transmitting system to the receiver (broadcast receiving apparatus 100 of the present embodiment). In the NTP timestamp format, "second or more" of UTC is expressed by 32 bits, and "less than second" is also expressed by 32 bits. In practice, however, it is difficult to reproduce one second in 32-bit precision. For this reason, for example, a clock with a frequency of "24th power of 2" Hz (about 16.8 MHz) may be used as a system clock for video system synchronization and a system clock for operating a timepiece conforming to the NTP as shown in FIG. 7C. Considering the fact that the frequency of a system clock adopted in a conventional broadcasting system is 27 MHz and the hardware configuration of the receiver can be simplified, it is desirable that a clock whose frequency is exponentiation of 2 ranging from "24th power of 2" to "28th power of 2" is adopted as the system clock.

When the frequency of the system clock is set to exponentiation of 2 ranging from "24th power of 2" to "28th power of 2" in the broadcast transmitting system and the receiver as described above, 4 to 8 low-order bits in the NTP timestamp format transmitted from the broadcast transmitting system to the receiver, the low-order bits being not referred to by a PLL (Phase Locked Loop) system for reproducing the system clock or the timepiece conforming to the NTP, may be fixed to "0" or "1". Namely, when the frequency of the system cock is "$n^{th}$ power of 2" Hz (n=24 in FIG. 12A, the same applies hereinafter), "32-n" low-order bits in the NTP timestamp format may be fixed to "0" or "1". Alternatively, the receiver may perform the process without regard for the "32-n" low-order bits in the NTP timestamp format.

When receiving time information in the NTP format, the broadcast transmitting system builds the PLL system with a 32+n bit counter including VCO (Voltage Controlled Oscillator) with a frequency of "$n^{th}$ power of 2" Hz, thereby providing a transmission system clock that synchronizes with the time information given from outside. Further, the broadcast transmitting system causes the overall signal processing units to operate in synchronization with the system clock of "$n^{th}$ power of 2" Hz. In addition, the broadcast transmitting system periodically transmits the output of the transmission system clock as time information in the NTP-length format to the receiver through the broadcast transmission path. Note that "32-n" low-order bits, which represent "less than second", of 32 bits may also be fixed to "0" or "1" in the time information in the NTP-length format that is to be transmitted to the receiver side. Namely, this is because a system clock counter of the broadcast transmitting system side is constituted by 32+n bits.

The receiver receives the time information in the NTP-length format through the broadcast transmission path and reproduces a reception system clock by the PLL system including the VCO with the frequency of "$n^{th}$ power of 2" Hz in the same manner as the broadcast transmitting system. As a result, the reception system clock works in synchronization with the transmission system clock of the broadcast transmitting system. Further, by operating the signal processing system of the receiver in synchronization with the system clock of "$n^{th}$ power of 2" Hz, clock synchronization between the broadcast transmitting system and the receiver can be achieved, and thus the stable signal reproduction can be achieved.

Further, a decoding time and a presentation time in units of presentation of video and audio signals are set based on the time information in the NTP format in the broadcast transmitting system. The decoding time is specified by the MPU extension timestamp descriptor (not shown in the drawings) stored in the MPT. Further, the presentation time is specified by the MPU timestamp descriptor (see FIG. 7D) stored in the MPT. An "MPU_sequence_number (MPU sequence number)" parameter in the MPU timestamp descriptor indicates the sequence number of the MPU that describes a timestamp, an "MPU_presentation_time (MPU presentation time)" parameter indicates the presentation time of the MPU in a 64-bit NTP timestamp format. Namely, the receiver can control timing of presentation (display, output and the like) for each of the MPUs such as video/audio signals, subtitles, captions or the like by referring the MPU timestamp descriptor stored in the MPT.

In the case of paying attention to the above-described control of decoding timing and presentation timing of video and audio signals in units of presentation, synchronization of video and audio signals can be ensured by a clock with a frequency of about "16th power of 2" Hz (about 65.5 KHz). In this case, it is not necessary to refer to 16 low-order bits in an NTP timestamp format described in an MPU timestamp descriptor or the like. Namely, when a clock of "$m^{th}$ power of 2" Hz, which is generated by dividing the frequency of system clock, is used for the control of decoding timing and presentation timing, it is not necessary to refer to "32-m" low-order bits in an NTP timestamp format described in an MPU timestamp descriptor or the like. Thus, the "32-m" low-order bits in the NTP timestamp format described in the MPU timestamp descriptor or the like may be fixed to "0" or "1".

<Time Management Function Based on MH-TOT>

FIG. 12B shows one example of a configuration of the time information that is to be transmitted in the NTP format in the time management function based on the NTP described above. A "reference_timestamp" parameter, "transmit_timestamp" parameter, and the like in the NTP format represent time data in the NTP-length format with a 64-bit length, and an "mpu_presentation_time" parameter in the MPU timestamp descriptor also represents time data in the NTP timestamp format with a 64-bit length. In the time data in the NTP-length format and the time data in the NTP timestamp format, "second or more" of UTC is expressed by 32 bits, and "less than second" is also expressed by 32 bits. Namely, the time information in the NTP format can transmit the time information up to "less than second". Moreover, since the time information in the NTP format is expressed in the UTC notation, it is different from time management in conventional digital broadcasting. As shown in FIG. 3, by managing both of a data flow transmitted through the broadcast transmission path and a data flow distributed through the communication line by means of the time information in the NTP format, it is possible to match both of the data easily.

In contrast, the time information transmitted by the MH-TOT is as follows.

FIG. 12C shows one example of the data structure of the MH-TOT. The broadcast receiving apparatus 100 according to the present embodiment can acquire the current date and current time from a "JST_time" parameter included in the MH-TOT. As shown in FIG. 12D, the "JST_time" parameter includes the information of 16 lower-order bits of coded data of the current date based on the Modified Julian Date (MJD) and the information of 24 bits representing the Japan Standard Time (JST) with 6 blocks of 4-bit binary-coded decimal (BCD). The current date can be calculated by performing a given calculation on the 16-bit coded data of the MJD. Further, the 6 blocks of 4-bit binary-coded decimal are made up of first 2 blocks of 4-bit binary-coded decimal that represent "hour" with a two-digit decimal number, next 2 blocks of 4-bit binary-coded decimal that represent "minute" with a two-digit decimal number, and last 2 blocks of 4-bit binary-coded decimal that represent "second" with a two-digit decimal number.

Namely, a difference between time management based on the NTP format and time management based on the MH-TOT is that the former time management based on the NTP format can transmit time information up to "less than second" as described above, while in the latter time management based on the MH-TOT only time information up to "in seconds" in JST notation can be transmitted.

In the broadcast receiving apparatus 100 of the present embodiment, the time management function based on the NTP that is the time information expressed in the UTC notation is used for the synchronization in decoding process and display process of broadcasting signal contents including video, audio, subtitles, and captions, and other presentation data, and thus it is possible to achieve a highly accurate synchronization process. Further, by referring to time information expressed in the UTC notation instead of time information based on clocks of the broadcast station, it is also possible to perform the synchronization in decoding process and display process between contents received by broadcasting signals including video, audio, subtitles, captions, and other data and data received through the communication line including video, audio, subtitles, and captions, and other data.

Moreover, in the broadcast receiving apparatus 100 according to the present embodiment, the time management function based on the "JST_time" including the 24-bit information expressed by 6 blocks of 4-bit binary-coded decimal in the MH-TOT may be used for performing a process of presenting a current time to the user or each of the processes of handling the MH-EIT shown in FIG. 7E. In general, in the process of presenting the current time to the user, the broadcast receiving apparatus is rarely required to have the accuracy to the extent of less than "second". Further, each piece of time information described in the MH-EIT is stored as 24-bit information composed of 6 blocks of 4-bit binary-coded decimal, expressing "hour", "minute", and "second" with two-digit decimal numbers, like the EIT for conventional digital broadcasting that is transmitted by the MPEG2-TS method. For this reason, the time management function based on the MH-TOT of the broadcast receiving apparatus 100 according to the present embodiment easily matches with each of processes of handling the MH-EIT. Specifically, each of the processes of handling the MH-EIT includes a process of creating an electronic program guide, a process of controlling timer recording and viewing reservation, a process of managing (or protecting) copyrights such as temporary data storage, and the like, for example. This is because each of these processes is rarely required to have the accuracy to the extent of less than "second", and the accuracy covering up to time unit "second" is enough.

Further, the process of creating an electronic program guide, the process of controlling timer recording and viewing reservation, the process of protecting copyrights such as temporary data storage, and the like are functions incorporated even in a receiver of the conventional digital broadcasting system using the MPEG2-TS method. Accordingly, if the broadcasting system of the present embodiment is configured in such a way as to execute the time management process compatible with the time management function of the conventional digital broadcasting system using the MPEG2-TS method in performing the process of creating an electronic program guide, the process of controlling timer recording and viewing reservation, the process of protecting copyrights such as temporary data storage, and others, it becomes unnecessary to separately design process algorithms for these processes (process of creating an electronic program guide, process of controlling timer recording and viewing reservation, process of protecting copyrights such as temporary data storage, etc.) when the broadcast receiving apparatus having both of a receiving function of digital broadcasting by the conventional MPEG2-TS method and a receiving function of digital broadcasting by the MMT method is configured, and the cost is thus reduced.

Further, even in a receiver that does not have the receiving function of digital broadcasting by the conventional MPEG2-TS method but has only the receiving function of digital broadcasting by the MMT method, algorithms for the function incorporated in the receiver of digital broadcasting system using the conventional MPEG2-TS method can be applied without creating new algorithms for the processes of creating an electronic program guide, controlling timer recording and viewing reservation, protecting copyrights such as temporary data storage, and the like, and thus the development with less cost is possible.

Consequently, with the configuration in which the time management function based on the "JST_time" parameter in the MH-TOT is used for performing these processes (process of creating an electronic program guide, process of controlling timer recording and viewing reservation, process of protecting copyrights such as temporary data storage, etc.), even the broadcast receiving apparatus for the digital broadcasting by the MMT method is made highly compatible with the broadcasting system using the conventional broadcasting method, and therefore can be provided at low cost.

As describe above, the broadcast receiving apparatus 100 of the present embodiment has the time management function using two types of time information different in accuracy from each other. Namely, first time information is expressed in the notation consistent with the conventional digital broadcasting system, while second time information has higher resolution power than the first time information. Using the second time information for the process of synchronizing contents data of broadcasting signals achieves the information presentation process more accurate than that in the conventional broadcasting system, and using the first time information for the processes of creating an electronic program guide, controlling timer recording and viewing reservation, protecting copyrights such as temporary data storage, and others allows the broadcast receiving apparatus to be provided at low cost.

Therefore, the broadcast receiving apparatus 100 of the present embodiment has the two types of time management function described above, and it is thus possible to achieve both of the highly accurate information presentation and the cost reduction.

First Modification Example of Time Management

Next, a first modification example of the time management in the broadcasting system of the present embodiment will be described below.

In the configuration of the first modification example, in order to improve the accuracy of time management by the NTP-based time management function that has already been described with reference to FIG. 12A, information related to an estimated delay time in time information transmission from a time management server (not shown in the drawings) or the broadcast station server 300 to the broadcast receiving apparatus 100 is included in a broadcasting signal to be transmitted, and the information related to the estimated delay time is used to correct a system clock for the NTP-based time management function in the broadcast receiving apparatus 100.

At this time, the information related to the estimated delay time may be included in a TMCC (Transmission and Multiplexing Configuration Control) region outside the TLV multiplexing stream instead of the TLV multiplexing stream of the protocol stack in the broadcast transmission path shown in FIG. 3 (A). By transmitting the information in the TMCC region, the information related to the estimated delay time can be extracted without performing a process of separating the TLV multiplexing stream (demultiplexing process) in the broadcast receiving apparatus 100. Namely, the information acquisition that is less likely to be affected by the delay in the separating process in the broadcast receiving apparatus 100 is possible, and thus a highly accurate correcting process of the system clock can be performed. An example of the data structure of time information transmitted in the TMCC signal will be described with reference to FIG. 12E. For example, the time information is preferably stored in a TMCC extension information region to be transmitted. In the time information in the TMCC extension information region shown in FIG. 12E, a "delta" parameter expresses the estimated value of transmission delay from a time management server that distributes the UTC or a server device that generates a TMCC signal to a general broadcast receiving apparatus, in the form of a 32-bit signed fixed-point value. Note that the 16 high-order bits thereof represent an integer part and 16 low-order bits thereof represent a decimal fraction. A "transmit_timestamp" parameter is a transmission timestamp, and expresses a time at which the TMCC signal is transmitted from the server device, in the NTP timestamp-length format. The 32 high-order bits thereof represent an integer part, and the 32 low-order bits thereof represent a decimal fraction.

In the first modification example, the broadcast receiving apparatus 100 of the present embodiment can correct more accurately the system clock for the NTP-based time management function, which is used for the process of synchronizing contents data of broadcasting signals, by using the information related to the estimated delay time (e.g., the "delta" parameter and/or the "transmit_timestamp" parameter) described in the time information stored and transmitted in the TMCC extension information region.

Second Modification Example of Time Management

Next, a second modification example of the time management in the broadcasting system of the present embodiment will be described below.

As describe above, the broadcast receiving apparatus 100 of the present embodiment has the time management function of managing the time by acquiring the current date and the Japan Standard Time from the information transmitted in the MH-TOT. The current date and the Japan Standard Time acquired from the information transmitted in the MH-TOT are superposed on video information, application information, and others in the video synthesizing unit 161 of the broadcast receiving apparatus 100, and are offered to the user by outputting them to the monitor unit 162 and video output unit 163. As described above, the MH-TOT has the data structure shown in FIG. 12C, and the broadcast receiving apparatus 100 can acquire the current date and the current time from the "JST_time" parameter in the MH-TOT.

However, since the "JST_time" parameter uses only the 16 low-order bits of the MJD coded data, calculation for determining a date of "Apr. 22, 2038" ends up in arithmetic overflow, and the above-described predetermined calculation cannot express the date following "Apr. 23, 2038". To deal with this problem, in the second modification example of the present embodiment, the calculation method is switched depending on whether the value of the MJD is equal to or larger than a given value or the value is smaller than the given value so that the date following "Apr. 23, 2038" can be expressed.

FIG. 12F shows one example of a first calculation method that is used when the value of the MJD is equal to or larger than the given value and a second calculation method that is used when the value of the MJD is smaller than the given value. For example, when the given value is set to "32768 (0x8000)", the current date is calculated by using the first calculation method in the case where the value of the MJD is equal to or larger than "32768", and is calculated by using the second calculation method in the case where the value of the MJD is smaller than "32768". Note that the case in which the value of the MJD is smaller than "32768" is equivalent to the case in which the most significant bit of the 16-bit data of the MJD is "0". In this manner, the broadcast receiving apparatus 100 of the present embodiment can express the date following "Apr. 23, 2038". However, the given value can be determined arbitrarily, and it may be set to, for example, "16384 (0x4000)" or "49152 (0x0000)". The condition for switching the calculation method may be set to the case where the 2 high-order bits of the 16-bit data of the MJD are "00" or the case where the 2 high-order bits of the 16-bit data of the MJD are not "11". Note that, when the given value is set to "32768" and the above-described method is used, a date preceding "Sep. 4, 1948" cannot be expressed, but it does not pose a specific problem regarding the practical use of the television receiver.

Alternatively, the first calculation method and the second calculation method may be switched depending on a flag that replaces a part or the whole of a "reserved" parameter in the data structure of the MH-TOT of FIG. 12C or depending on a newly added flag, instead of switching the first calculation method and the second calculation method depending on the result of comparison between the MJD and the given value. For example, in the case where the most significant bit of the 16-bit coded data of the MJD is "0", the flag is set to "1" when the MJD value represents the date following "Apr. 23, 2038", and the flag is set to "0" when the MJD value does not represent the date following "Apr. 23, 2038". Then, when the flag is "1", the second calculation method shown in FIG. 12F is used, while when the flag is "0", the first calculation method is used. Alternatively, a descriptor having the same meaning as the above-mentioned flag may be newly prepared and added to the MH-TOT.

As described above, in the broadcasting system of the present embodiment, absolute time data in the NTP format is transmitted, and the broadcast receiving apparatus 100 of the present embodiment has the NTP-based time management function. In addition, the broadcast receiving apparatus 100 of the present embodiment controls the decoding timing and presentation timing of video and audio signals in units of presentation by referring to NTP timestamps and others described in MPU timestamp descriptors set in units of MPU. As described above, the time information in the NTP format has the configuration shown in FIG. 12B. Further, the MPU timestamp descriptor has the configuration shown in FIG. 7D.

Accordingly, the broadcast receiving apparatus 100 of the present embodiment may select either the first calculation method or the second calculation method in accordance with the value of time data and others obtained by referring to the "reference_timestamp" parameter, the "transmit_timestamp" parameter, or the "mpu_presentation_time" parameter. Specifically, for example, when the most significant bit of the 64-bit time data in the NTP-length format is "0", the second calculation method is used, and when the most significant bit is not "0", the first calculation method is used.

By any of the above methods, the broadcast receiving apparatus 100 of the present embodiment can express the date following "Apr. 23, 2038".

[Channel Selection Process (Initial Scan) in Broadcast Receiving Apparatus]

The AMT of the broadcasting system of the present embodiment provides a list of IP packet multicast groups that is used to receive IP packets transmitted by the TLV multiplexing method without distinguishing them from IP packets transmitted through the communication line as much as possible. A plurality of IP multicast groups can be listed for one service identification. In addition, in order to describe a series of IP addresses efficiently, an address mask can be used.

In the broadcast receiving apparatus 100 according to the present embodiment, a list of services acquired from the TLV-NIT can be stored in a non-volatile memory such as the ROM 103 and the storage unit 110 at the time of channel scan in the initial setting or rescan for the setting change, and a list of IP multicast groups corresponding to the services can be associated with the services as IP-related information and stored in the non-volatile memory. The list of services and IP-related information are stored in the non-volatile memory to be referred to constantly, so that a need of acquiring the TLV-NIT or AMT at the time of channel switching and others is eliminated, and thus the broadcasting contents can be efficiently acquired.

Figure 13A:
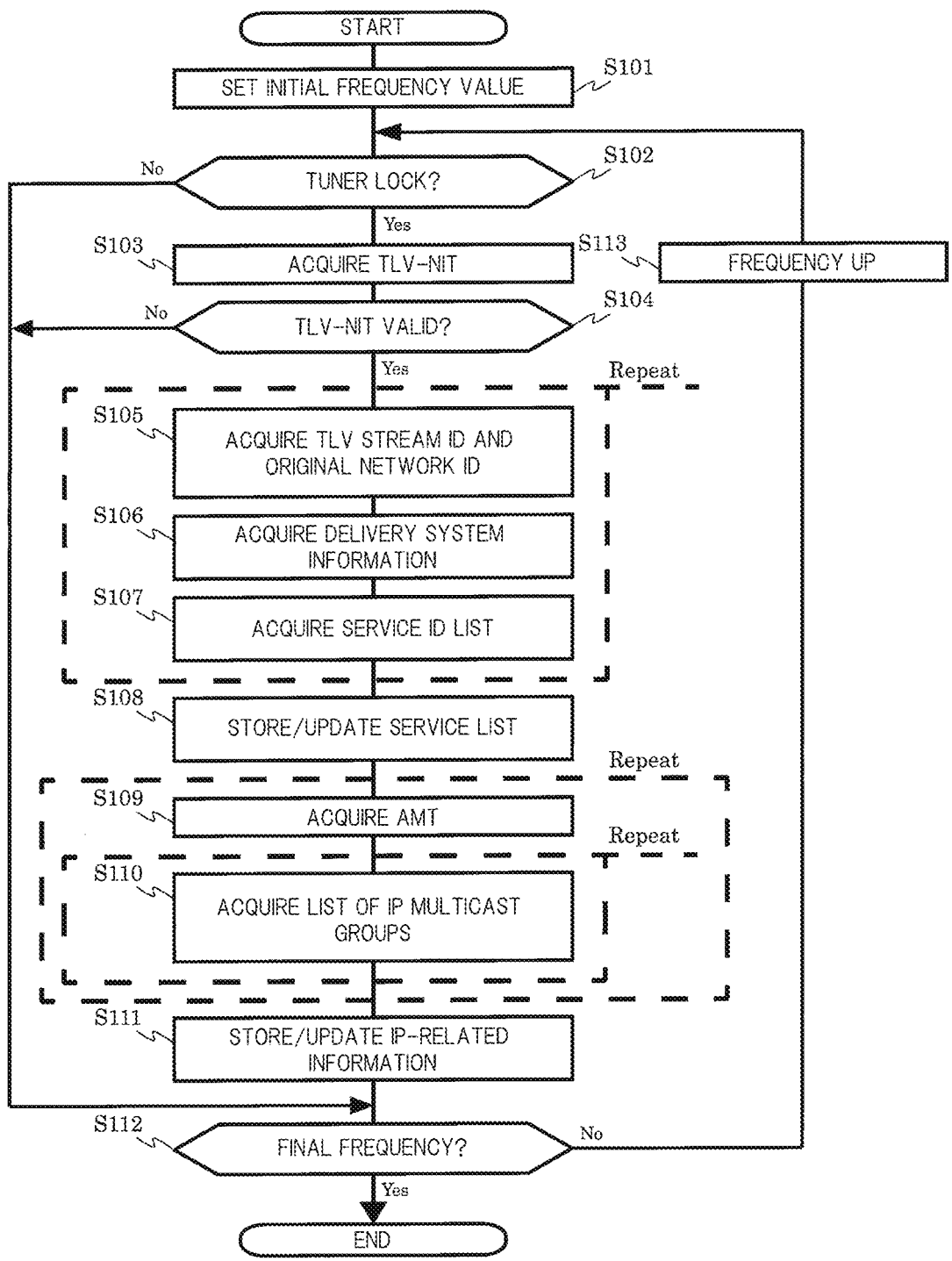
FIG. 13A is an operation sequence diagram at the time of channel scanning of the broadcast receiving apparatus according to the first embodiment.

FIG. 13A is a diagram showing an example of an operation sequence at the time of channel scan (rescan) in the broadcast receiving apparatus 100 of the present embodiment.

When the channel scan starts, the receiving function executing unit 1102 sets an initial frequency value for the tuner/demodulating unit 131 and instructs the tuner/demodulating unit 131 to tune to the frequency value (S101). When the tuner/demodulating unit 131 succeeds in locking to the set frequency value (S102: Yes), the receiving function executing unit 1102 acquires the TLV-NIT from a received signal (S103).

When the TLV-NIT acquired in the process of S103 is valid data (S104: Yes), the receiving function executing unit 1102 acquires information of a TLV stream ID, an original network ID, and the like from the acquired TLV-NIT (S105). FIG. 13B shows an example of the data structure of the TLV-NIT. The information of the TLV stream ID and the information of the original network ID can be acquired from a "tlv_stream_id" parameter and an "original_network_id" parameter, respectively. Furthermore, delivery system information related to physical conditions for the broadcast transmission path corresponding to the TLV stream ID and the original network ID is acquired from a delivery system descriptor (S106), and a service ID list is acquired from a service list descriptor (S107).

FIG. 13C shows one example of the data structure of a satellite delivery system descriptor. FIG. 13D shows one example of the data structure of a service list descriptor. Note that, when the TLV-NIT has a plurality of different pieces of data such as the TLV stream ID, the original network ID, the delivery system information, and the service ID list, the processes of S105 to S107 are repeated. Subsequently, the receiving function executing unit 1102 creates a service list based on data acquired in the processes of S105 to S107 such as the TLV stream ID, the original network ID, the delivery system information, and the service ID list, and stores the created service list in the ROM 103 or the storage unit 110 (updates the service list at the time of rescan) (S108).

Next, the receiving function executing unit 1102 then acquires an AMT from the received signal (S109), and further acquires a list of IP multicast groups related to each service ID stored in the service list (S110). FIG. 13E shows an example of the data structure of the AMT. Note that, when the AMT has lists of IP multicast groups related to a plurality of service IDs, the process of S110 is repeated. When there is a plurality of AMTs having lists of IP multicast groups related to different service IDs, the processes of S109 and S110 are repeated. Next, the receiving function executing unit 1102 then associates the list of IP multicast groups acquired in the process of S110 with the service ID as IP-related information, and stores the IP-related information in the ROM 103 or the storage unit 110 (updates the IP-related information at the time of rescan) (S111).

When the tuner/demodulating unit 131 fails in locking to the set frequency value in the process of S102 (S102: No) and when the TLV-NIT acquired in the process of S103 is not valid data (S104: No), the processes of S105 to S111 are not performed.

After finishing the process of S111, when finding that the frequency value set for the tuner/demodulating unit 131 is a final frequency value in a channel scan range (S112: Yes), the receiving function executing unit 1102 ends the operation sequence. On the other hand, when finding that the set frequency value is not the final frequency value in the channel scan range (S112: No), the receiving function executing unit 1102 increases the frequency value set for the tuner/demodulating unit 131 (S113) and repeats the processes of S102 to S111. Note that, if the service IDs for all services making up the broadcasting network can be acquired from one TLV-NIT and an AMT having lists of IP multicast groups related to the service IDs can be acquired, the processes of S112 and S113 are unnecessary.

Through the series of processes described above, when performing the channel scan for initial setting or the rescan for setting change, the broadcast receiving apparatus 100 of the present embodiment can create/update a list of services making up the broadcasting network (service list), and at the same time, create/update a list of IP multicast groups corresponding to each service (IP-related information) and store the created service list and IP-related information in a non-volatile memory such as the ROM 103 and the storage unit 110.

Note that the rescan for setting change may be automatically performed when a change in the information in the table is detected by referring to respective "version_number" parameters of the TLV-NIT and AMT. When a change in the "version_number" parameter of either the TLV-NIT or AMT is detected, only the information related to the table in which the change in parameter is detected may be automatically updated. However, when the above-described automatic updating is performed, execution of the automatic rescan should preferably be reported to the user. Alternatively, the change in the information in the table may be reported to the user so that the user makes a decision on whether or not to perform the rescan.

[Channel Selection Process (Channel Switching) in Broadcast Receiving Apparatus]

Figure 14A:
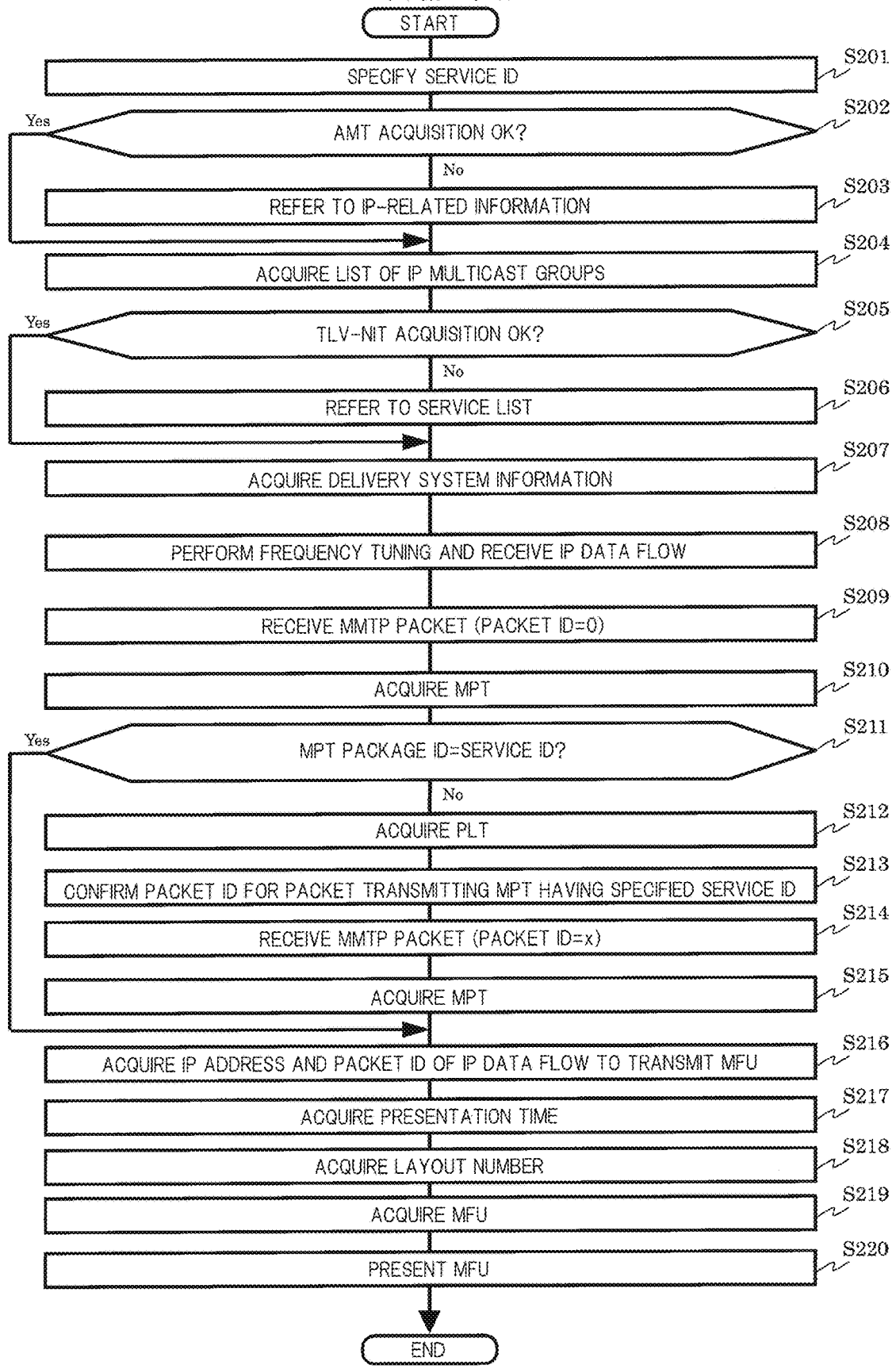
FIG. 14A is an operation sequence diagram at the time of channel selection of the broadcast receiving apparatus according to the first embodiment.

FIG. 14A is a diagram showing one example of an operation sequence at the time of channel selection (channel switching) in the broadcast receiving apparatus 100 of the present embodiment.

When the user gives a command to switch a channel by operating a remote controller and others (not shown), the receiving function executing unit 1102 interprets the command transmitted from the remote controller and specifies a service ID of an intended service (S201). Next, the receiving function executing unit 1102 then starts to acquire an AMT from the signal received from the tuner/demodulating unit 131. When succeeding in acquiring the AMT within a given time (S202: Yes), the receiving function executing unit 1102 acquires information related to a list of IP multicast groups corresponding to the service ID, from the acquired AMT (S204). When failing to acquire the AMT within the given time (S202: No), the receiving function executing unit 1102 refers to the IP-related information stored in the ROM 103 or the storage unit 110 (S203), thereby acquiring information related to the list of IP multicast groups corresponding to the service ID (S204). Note that the receiving function executing unit 1102 may always refer to the IP-related information stored in the ROM 103 or the storage unit 110 without performing the determination process of S202.

Subsequently, the receiving function executing unit 1102 starts to acquire the TLV-NIT from the signal received from the tuner/demodulating unit 131. When succeeding in acquiring the TLV-NIT within a given time (S205: Yes), the receiving function executing unit 1102 acquires delivery system information for acquiring an IP data flow corresponding to the service ID, from the acquired TLV-NIT (S207). When failing to acquire the TLV-NIT within the given time (S205: No), the receiving function executing unit 1102 refers to the service list stored in the ROM 103 or the storage unit 110 (S206), thereby acquiring the delivery system information for acquiring the IP data flow corresponding to the service ID (S207). Note that the receiving function executing unit 1102 may always refer to the service list stored in the ROM 103 or the storage unit 110 without performing the determination process of S205.

When the delivery system information has been acquired in the process of S207, the receiving function executing unit 1102 then controls the tuner/demodulating unit 131 with the frequency value specified by the acquired delivery system information, receives the IP data flow corresponding to the service ID (S208), extracts an MMT data string from the received IP data flow, and outputs the MMT data string to the separating unit 132.

In the separating unit 132, the transport processing unit 1102*a* acquires an MMTP packet with a packet ID "0", from the input MMT data string (S209), and further acquires an MPT from the acquired MMTP packet (S210). Next, the transport processing unit 1102*a* then refers to an "MMT_package_id_byte" parameter included in the acquired MPT, and checks whether the 16 low-order bits of the "MMT_package_id_byte" parameter have the same value as the service ID. When the 16 low-order bits of the "MMT_package_id_byte" parameter have the same value as the service ID in the example of the data structure of the MPT shown in FIG. 7B (S211: Yes), the transport processing unit 1102*a* determines that the MMTP packet with the packet ID "0" is an MMTP packet having the data of the program corresponding to the service ID, and shifts to an acquiring process of an MFU based on information included in the acquired MPT (S216).

On the other hand, when the 16 low-order bits of the "MMT_package_id_byte" parameter do not have the same value as the service ID (S211: No), it is determined that the MMTP packet with the packet ID "0" is not the MMTP packet having data of the program corresponding to the service ID. In this case, the transport processing unit 1102*a* newly acquires a PLT (S212), and checks the acquired PLT to confirm a packet ID (x in this case) of an MMTP packet that transmits an MPT having the "MMT_package_id_byte" parameter corresponding to the service ID (S213). Further, the transport processing unit 1102*a* then acquires an MMTP packet with a packet ID "x" from the above-mentioned input MMT data string (S214), and acquires an MPT from the acquired MMTP packet (S215). Moreover, the transport processing unit 1102*a* then starts the acquiring process of the MFU based on information included in the acquired MPT (S216).

Note that the transport processing unit 1102*a* may always perform the processes of S212 to S215 without performing the processes of S209 to S211. In this case, the process time can be reduced when the data of the program corresponding to the service ID is stored in an MMTP packet other than the MMTP packet with the packet ID "0".

Figure 14B:
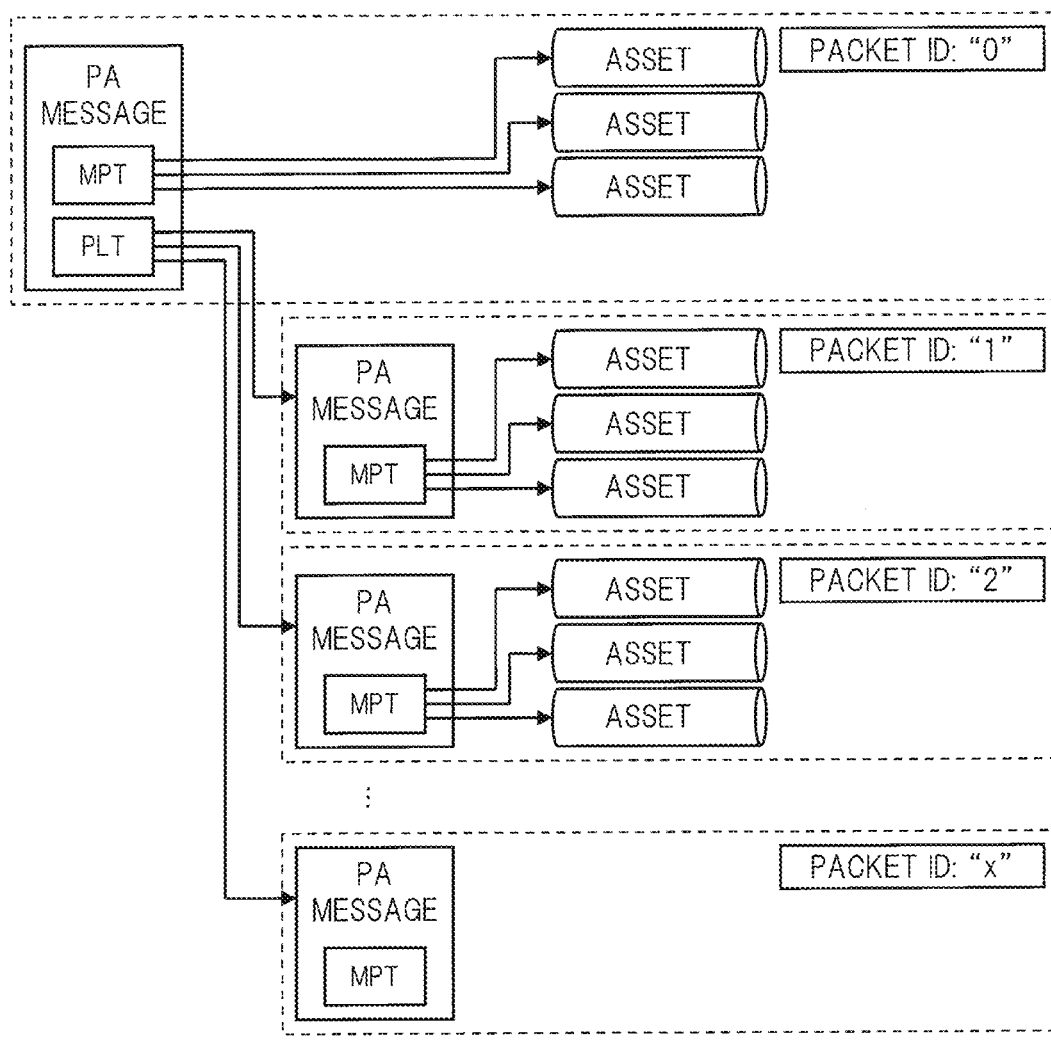
FIG. 14B is a configuration diagram for explaining reference of the MPT in each of packages by a PLT of the broadcasting system.

Here, the process described above of specifying the packet ID of the MMTP packet having data on the program corresponding to the service ID to acquire the MPT by confirming the PLT will be described. The MMTP packet with the packet ID "0" indicates that the PA message is to be transmitted. In the case of multiplexing a plurality of packages, as shown in FIG. 14B, a PLT (package list table) is contained in this PA message. The PLT has a list of packet IDs of MMTP packets to each of which the PA message containing an MPT of other package is to be transmitted. By confirming the PLT, it is possible to specify, from the package ID, the MMTP packet to which the PA message containing the MPT that becomes an entry point of each service is to be transmitted. FIG. 14C shows one example of a data structure of the PLT. Location information to which the PA message of the package indicated by the "MMT_package_id_byte" parameter is to be transmitted is specified by the "MMT_general_location_info( )".

The description returns to the operation sequence shown in FIG. 14A. In the acquiring process of the MFU, the transport processing unit 1102*a* first refers to the MPT acquired in the processes at S210 or S215 to acquire an IP address and a packet ID of an IP data flow through which a desired MFU is to be transmitted (S216). Further, the presentation time and the layout number of the MPU are respectively acquired from the MPU timestamp descriptor included in the MPT and the MPU presentation region specifying descriptor included in the MPT (S217, S218), and the MFU is further acquired on the basis of the acquired IP address and packet ID of the IP data flow (S219). Next, coded video data, coded audio data, and the like are extracted from the acquired MFU, and a video/audio decoding process based on control of the AV decode processing unit 1102*b* is executed. A presenting process based on the information regarding the presentation time and the information regarding the layout control thus acquired is executed by control of the presentation processing unit 1102*h* (S220).

In a case where the PLT cannot be acquired in the process at S212, the "MMT_package_id_byte" parameter that coincides with the service ID cannot be confirmed in the process at S213, or the MMTP packet whose packet ID is "x" cannot be acquired in the process at S215, a program image output process based on the data on the MMTP packet whose packet ID acquired in the process at S210 is "0" (that is, the processes at S216 to S220) may be executed. Further, in this case, a message indicating that a program corresponding to the service ID selected by the user cannot be displayed may be displayed.

Through the series of processes described above, the broadcast receiving apparatus 100 of the present embodiment can execute a channel selection (channel switching) operation. In particular, as described above with reference to FIGS. 13A and 14A, a service list and IP-related information are created and are stored in a non-volatile memory such as the ROM 103 and the storage unit 110 so as to be referred to constantly at the time of channel scan for initial setting or rescan for setting change, and the service list and IP-related information stored in a non-volatile memory such as the ROM 103 and the storage unit 110 are referred to at the time of channel selection (channel switching), so that the efficiency of the channel selection (channel switching) operation can be improved. Namely, the time taken from the start to end of the channel selection (channel switching) can be reduced, compared to a case where the AMT and the TLV-NIT are acquired again at the time of channel selection (channel switching).

[Remote Controller Key Setting Process of Broadcast Receiving Apparatus]

Figures 15A, 15B:
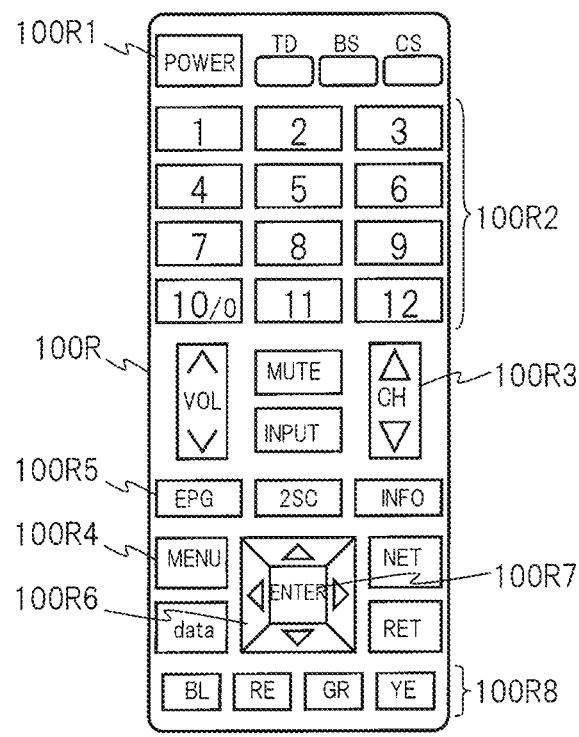
FIG. 15A is an appearance diagram of a remote controller by which the broadcast receiving apparatus according to the first embodiment can be controlled.
FIG. 15B is a diagram showing a data structure of a remote control key descriptor of the broadcasting system.

FIG. 15A shows one example of appearance of a remote controller 100R that is used for input of an operation instruction to the broadcast receiving apparatus 100 according to the present embodiment. The remote controller 100R at least includes a power source key 100R1, a numeric keypad 100R2, a channel up/down key 100R3, a menu key 100R4, an EPG key 100R5, a cursor key 100R6, a determination key 100R7, and a color key 100R8. The remote controller 100R may further include a volume up/down key, a network switching key, an input switching key, a recording key, a reproducing key, and the like.

For example, in the process at S201 of the operation sequence at the time of the channel selection shown in FIG. 14A, the following three methods may be used in a case where switching of channels is instructed to the broadcast receiving apparatus 100 according to the present embodiment by using the remote controller 100R. A first method is a method of directly inputting and specifying a service ID of a desired channel (or service) by pressing any key of the numeric keypad 100R2 several times. A second method is a method of changing channels in a forward direction (or a reverse direction) until a desired channel (or service) is displayed by repeatedly pressing the channel up/down key 100R3 as needed. A third method is a method of carrying out so-called one-touch channel selection to call a predetermined channel (or service) associated with each of keys of the numeric keypad 100R2 by pressing the corresponding key of the numeric keypad 100R2 only once. Although the one-touch channel selection that is the third method is a user-friendly channel selection method, it is necessary that setting of association of predetermined channels (or services) to the respective keys of the numeric keypad 100R2 is carried out for the broadcast receiving apparatus 100 in advance.

The broadcast receiving apparatus 100 corresponding to the broadcasting system according to the present embodiment can automatically execute the setting of association on the basis of control information contained in the digital broadcast waves received by the tuner/demodulating unit 131. Namely, the broadcasting system according to the present embodiment prepares a remote control key descriptor as a descriptor for TLV-SI. The setting of association may be executed by referring the remote control key descriptor.

FIG. 15B shows one example of a data structure of the remote control key descriptor. A "service_id" parameter in FIG. 15B is a service ID for identifying a channel (or service). A "remote_control_key_id" parameter is a recommended value of a remote controller button number to which the channel (or service) identified by the service ID is assigned. The channel (or service) identified by the "service_id" parameter may be associated with a key specified by the "remote_control_key_id" parameter of the numeric keypad 100R2 in accordance with a value of each of the parameters.

In a case where the number of channels (or services) in the same network is large, the channels (or services) may be assigned to other keys than the numeric keypad 100R2. For example, predetermined channels (or services) may respectively be assigned to keys of the color key 100R8. In this case, a numerical value corresponding to the "remote_control_key_id" parameter may also be assigned to each key of the color key 100R8 in advance.

The remote control key descriptor may be described as a descriptor of the TLV-NIT. Thus, for example, in a case where the TLV-NIT acquired in the process at S103 in the operation sequence at the time of the channel scan shown in FIG. 13A is effective data, the setting of association may be executed together with the processes at S105 to S107 by storing descriptive contents of the remote control key descriptor in the ROM 103 of the broadcast receiving apparatus 100 or a non-volatile memory such as the storage unit 110.

The setting of association may be executed by appropriately assigning services of arbitrary channels to the respective keys of the numeric keypad 100R2 in accordance with user's own taste in addition to the method of executing it in accordance with the descriptive contents of the remote control key descriptor as described above. Further, both of the setting of association based on the descriptive contents of the remote control key descriptor and the setting of association assigned in accordance with the user's own taste may be stored in the non-volatile memory of the broadcast receiving apparatus 100 at the same time, and only one setting may be used by selection of a menu operation or the like. Further, in this case, the setting of association assigned in accordance with the user's own taste may be used on a priority basis. Further, the setting of association based on the descriptive contents of the remote control key descriptor may be used preferentially in accordance with a value of a priority flag described in the remote control key descriptor compared with the setting of association assigned in accordance with the user's own taste. The priority flag may be set by using a part or all of the "reserved" parameter of the remote control key descriptor shown in FIG. 15B, or may be set by adding a new parameter thereto. In this case, the value of the priority flag may be allowed to be controlled for each service ID.

Further, in a case where the setting of association assigned in accordance with the user's own taste is stored in the non-volatile memory, the setting of association based on the descriptive contents of the remote control key descriptor may not be allowed to be stored in the non-volatile memory. Further, only the setting of association assigned in accordance with the user's own taste is stored in the non-volatile memory of the broadcast receiving apparatus 100. In a case where the remote control key descriptor is described in the TLV-NIT that is being received, the setting of association based on the descriptive contents of the remote control key descriptor is used. In a case where the remote control key descriptor is not described in the TLV-NIT that is being received, the setting of association assigned in accordance with the user's own taste may be used.

A process of changing the association of a predetermined channel (or service) with each key of the numeric keypad 100R2 in accordance with the descriptive contents of the remote control key descriptor may be executed for all services described in service list descriptor on the network specified by the TLV-NIT at the same time, or may be executed for only a part of the services. In a case where the process is executed for only a part of services, the old setting of the association for each of the other services may be held as they are. Further, in a case where the "service_id" parameter is a predetermined value (for example, 999 or the like), only the setting specified by the "remote_control_key_id" parameter of the set contents stored in the non-volatile memory of the broadcast receiving apparatus 100 may be deleted.

Namely, the broadcast receiving apparatus 100 according to the present embodiment can execute the setting of association of a predetermined channel (or service) with each key of the numeric keypad 100R2.

[Program Selecting Process for Multi Programming Channel]

In the broadcasting system according to the present embodiment, multi programming is available in which a plurality of programs is broadcast on one channel (or service) in parallel. In a case where simultaneous broadcasting of a plurality of programs is executed by the multi programming, it is thought that the one-touch channel selection described above can be carried out for a main channel of the multi programming, but cannot be carried out for a sub channel of the multi programming. Namely, in a case where a channel is selected from the sub channel of the multi programming, it is necessary to use a method of directly inputting and specifying a service ID, or a method of selecting a desired sub channel by pressing the channel up/down key 100R3 after a channel is temporarily selected from the main channel of the multi programming by the one-touch channel selection. There is a problem that an operation becomes complicated.

In order to solve the problem, in the broadcast receiving apparatus 100 according to the present invention, a function of the one-touch channel selection is extended. By repeatedly pressing any key in the numeric keypad 100R2 to which a predetermined service ID is assigned several times within a given time, the channel can be directly selected from the sub channel of the multi programming.

This will be described with reference to FIG. 16A. For example, service of 011 channel is assigned in advance to "1" key in the numeric keypad 100R2 of the remote controller 100R. In this case, in a case where there is a channel selection operation in a state that the multi programming is not executed (see (A) in FIG. 16A), the 011 channel is selected regardless of the number of times to press the "1" key. On the other hand, in a case where there is a channel selection operation in a state that the multi programming is executed (see (B) in FIG. 16A), the 011 channel is selected by pressing the "1" key once. When the "1" key is pressed again within the given time since first pressing of the "1" key, 012 channel is selected. Similarly, in a case where the "1" key is pressed three times within the given time, 013 channel is selected. In a case where the "1" key is pressed again over the given time since the first pressing of the "1" key, a state of selecting the 011 channel may be maintained.

By allowing the operation as described above, in the broadcast receiving apparatus 100 according to the present invention, it is possible to directly select a sub channel by more simple operation at the time of the multi programming.

Similarly, angle selection of a multiview compliant program or selection of a predetermined video asset from a plurality of video assets may be executed by repeatedly pressing any key of the numeric keypad 100R2 several times. As shown in FIG. 16B, in a case where a service ID of the multiview compliant program is assigned to the "1" key of the numeric keypad 100R2 in the remote controller 100R, the multiview compliant program is selected by pressing the "1" key once, and a main view is displayed. Further, when the "1" key is pressed again within the given time since the first pressing of the "1" key, sub view 1 of the multiview compliant program is displayed. Similarly, in a case where the "1" key is pressed three times within the given time, sub view 2 of the multiview compliant program is displayed. In a case where the "1" key is pressed again over the given time since the first pressing of the "1" key, the main view of the multiview compliant program may be displayed as it is. The selection of the predetermined video asset from the plurality of video assets may be allowed by the similar operation described above.

In the broadcast receiving apparatus 100 according to the present invention, by allowing the operation as described above, it is possible to select angle selection of the multiview compliant program and a predetermined video asset from a plurality of video assets by more simple operation.

In a case where one or more program at the time of the multi programming is a multiview compliant program or a program having a plurality of assets, only one of the operations may be effective and the other may be ineffective. For example, in a case where one or more program at the time of the multi programming is the multiview compliant program or the program having the plurality of assets, the operation to press the same key several times within the given time is assigned to a process of directly selecting a sub channel at the time of the multi programming. Whether any operation is effective or ineffective may be defined in advance, or may be selected by the user.

[Screen Layout Control of Broadcast Receiving Apparatus]

The broadcast receiving apparatus 100 of the present embodiment can control the screen layout based on the description of an LCT. FIG. 17A shows one example of a data structure of the LCT. FIG. 17B shows one example of a data structure of the MPU presentation region specifying descriptor.

In the data structure of the LCT, a "left_top_pos_x" parameter and a "right_down_pos_x" parameter indicate a horizontal position on the top left of a region and a horizontal position on the bottom right of the region in terms of the ratio of the number of pixels to the total number of pixels arranged in the horizontal direction, respectively, when the left side of the full-screen display is defined as "0" and the right side of the same is defined as "100". A "left_top_pos_y" parameter and a "right_down_pos_y" parameter indicate a vertical position on the top left of the region and a vertical position on the bottom right of the region in terms of the ratio of the number of pixels to the total number of pixels arranged in the vertical direction, respectively, when the top side of the full-screen display is defined as "0" and the bottom side of the same is defined as "100". Further, a "layer_order" parameter indicates a relative position in the depth direction of the region.

Examples of layout assignment to layout numbers based on the parameter settings will be described below together with set values for the parameters.

FIG. 17C shows default layout setting of the broadcast receiving apparatus 100 of the present embodiment, and shows an example in which one region is set for the full-screen. FIG. 17D shows an example in which the full-screen is divided into three regions, and the respective regions are defined as "region 0", "region 1" and "region 2". For example, when the full-screen is made up of 7680 horizontal pixels×4320 vertical pixels, the "region 0" is set within a range of (0, 0)-(6143, 3455) because the "left_top_pos_x" parameter is "0", the "left_top_pos_y" parameter is "0", the "right_down_pos_x" parameter is "80", and the "right_down_pos_y" parameter is "80". In the same manner, the "region 1" is set within a range of (6144, 0) to (7679, 4319), and the "region 2" is set within a range of (0, 3456) to (6143, 4319).

FIG. 17E shows an example in which three regions are set like the example of FIG. 17D. In the example of FIG. 17E, however, the "region 0" is set within a range of (0, 0) to (7679, 4319), and the "region 1" and "region 2" are set within the same ranges of the "region 1" and "region 2" described above and are located in front of the "region 0" in accordance with the setting of the "layer_order" parameter. FIG. 17F shows an example in which the "region 0" is set in a device 0 (default device: broadcast receiving apparatus 100 in the present embodiment) and the "region 1" is set in a device 1 (portable information terminal 700 in the present embodiment).

As described above, in the broadcasting system of the present embodiment, screen layout control for displaying multimedia services on the receiver in a manner intended by the service provider can be performed by using the LOT.

Note that a predetermined background color specified by a background color specifying descriptor described in the LCT may be displayed in a region in which a program video and a data screen are not displayed by the screen layout control described above. Further, in a case where the background color specifying descriptor is not contained in the LCT, in a case where the broadcast receiving apparatus 100 cannot acquire the background color specifying descriptor correctly, or in a case where the predetermined background color specified by the background color specifying descriptor cannot be displayed by hardware limit, a predetermined pattern defined by the broadcast receiving apparatus 100 in advance may be displayed in the region. Further, the region may be used as a notification display region from the broadcast receiving apparatus 100 to the user. Note that the notification may be arbitrary information.

Note that decimal fractions that are generated when the screen is divided in accordance with the setting values of the "left_top_pos_x" parameter and others are rounded up or down, or rounded off (or in the case of binary numbers, "0" is rounded down while "1" is rounded up). For example, when the full-screen is made up of 7680 horizontal pixels× 4320 vertical pixels and the "left_top_pos_x" parameter of the "region 0" is "0", the "left_top_pos_y" parameter is "0", the "right_down_pos_x" parameter is "51", and the "right_down_pos_y" parameter is "51", the "region 0" may be set within a range of (0, 0)-(3916, 2203) by rounding up decimal fractions or may be set within a range of (0, 0)-(3915, 2202) by rounding down decimal fractions. Alternatively, decimal fractions may be rounded up or down in units of 8-pixel blocks or 16-pixel blocks in consideration of macro-blocks at the time of an image compression process. Through the process described above, region setting based on the LCT and conversion of the resolution of multimedia contents in the above region can be performed efficiently.

Alternatively, the setting value of the parameter such as the "left_top_pos_x" may be limited to only "multiples of 5" or "multiples of 10" in a range from "0" to "100". In this case, it is possible to execute the region setting appropriately.

Note that the contents displayed in each of the regions are specified by the MPU presentation region specifying descriptor shown in FIG. 17B. The contents of an MPU whose sequence number is specified by an "MPU_sequence_number" parameter in FIG. 17B are associated with the description of the LCT by a "layout_number" parameter and a "region_number" parameter.

Further, a plurality of the "layout_number" parameter and the "region_number" parameter may be described in a first "for" loop of the description of the MPU presentation region specifying descriptor with respect to one "MPU_sequence_number" parameter. The user may be caused to select whether layout control is executed in accordance with any description. For example, in a case where a "layout_number1" parameter, a "region_number1" parameter, a "layout_number2" parameter, and a "region_number2" parameter are described in the first "for" loop with respect to a predetermined "MPU_sequence_number" parameter, the user is caused to select whether the layout control of the MPU specified by the "MPU_sequence_number" parameter is executed on the basis of the "layout_number1" parameter and the "region_number1" parameter or on the basis of the "layout_number2" parameter and the "region_number2" parameter. In this manner, the user can carry out the layout control regarding the video program in accordance with user's own taste.

[Exceptional Process of Screen Layout Control of Broadcast Receiving Apparatus]

Figure 18A:
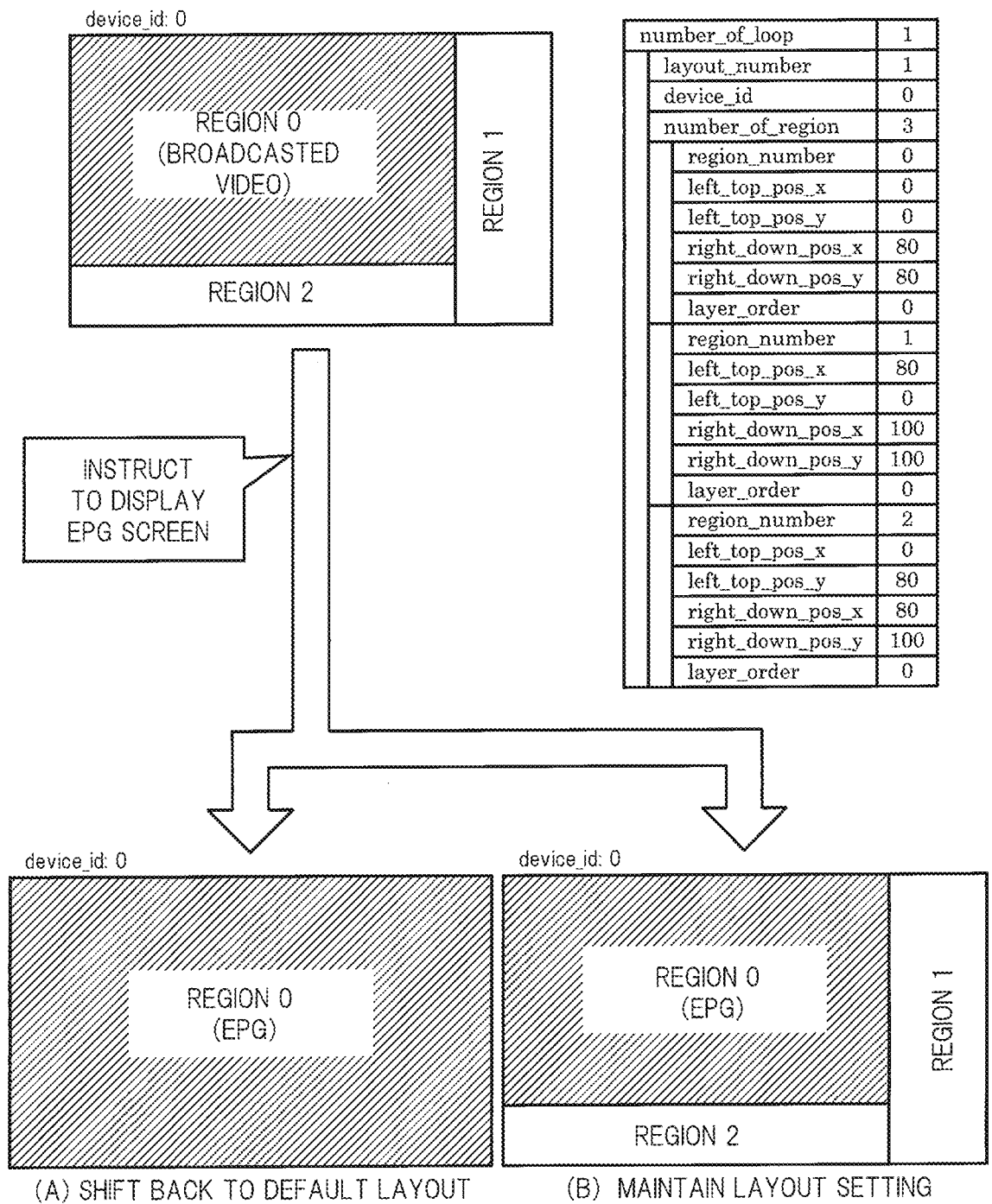
FIG. 18A is an explanatory diagram of an exceptional process of screen layout control based on the LCT.

Even when the control of the screen layout region is performed based on the LCT in the broadcast receiving apparatus 100 of the present embodiment, if the user gives an instruction to display an EPG screen, the broadcast receiving apparatus 100 of the present embodiment can perform the screen layout control in which the descriptive contents of the LCT is left out of account, as an exceptional process. FIG. 18A shows one example of an operation of the exceptional process of the screen layout control based on the LOT.

When the screen layout control similar to that shown in FIG. 17D is performed based on the descriptive contents of the LCT, a video of broadcasting program is displayed in the "region 0", and broadcasting contents such as program-cooperation data cooperated with the broadcasting program are displayed in the "region 1" and the "region 2", if the user gives an instruction to display an EPG screen with the remote controller (not shown), the broadcast receiving apparatus 100 of the present embodiment shifts the screen layout setting back to the default setting (i.e., a state in which the screen layout control similar to that shown in FIG. 17C is performed) as shown in (A) of FIG. 18A regardless of the descriptive contents of the LCT, and controls the screen layout to display the EPG screen on the entire screen. Further, when the user gives an instruction to end the display of the EPG screen, the broadcast receiving apparatus 100 executes again the screen layout control in accordance with the descriptive contents of the LOT.

By performing the control described above, the EPG screen can be displayed in a large size and easiness to see the EPG screen can be improved, compared to the case where the EPG screen is displayed while maintaining the control of screen layout region as shown in (B) of FIG. 18A.

Figure 18B:
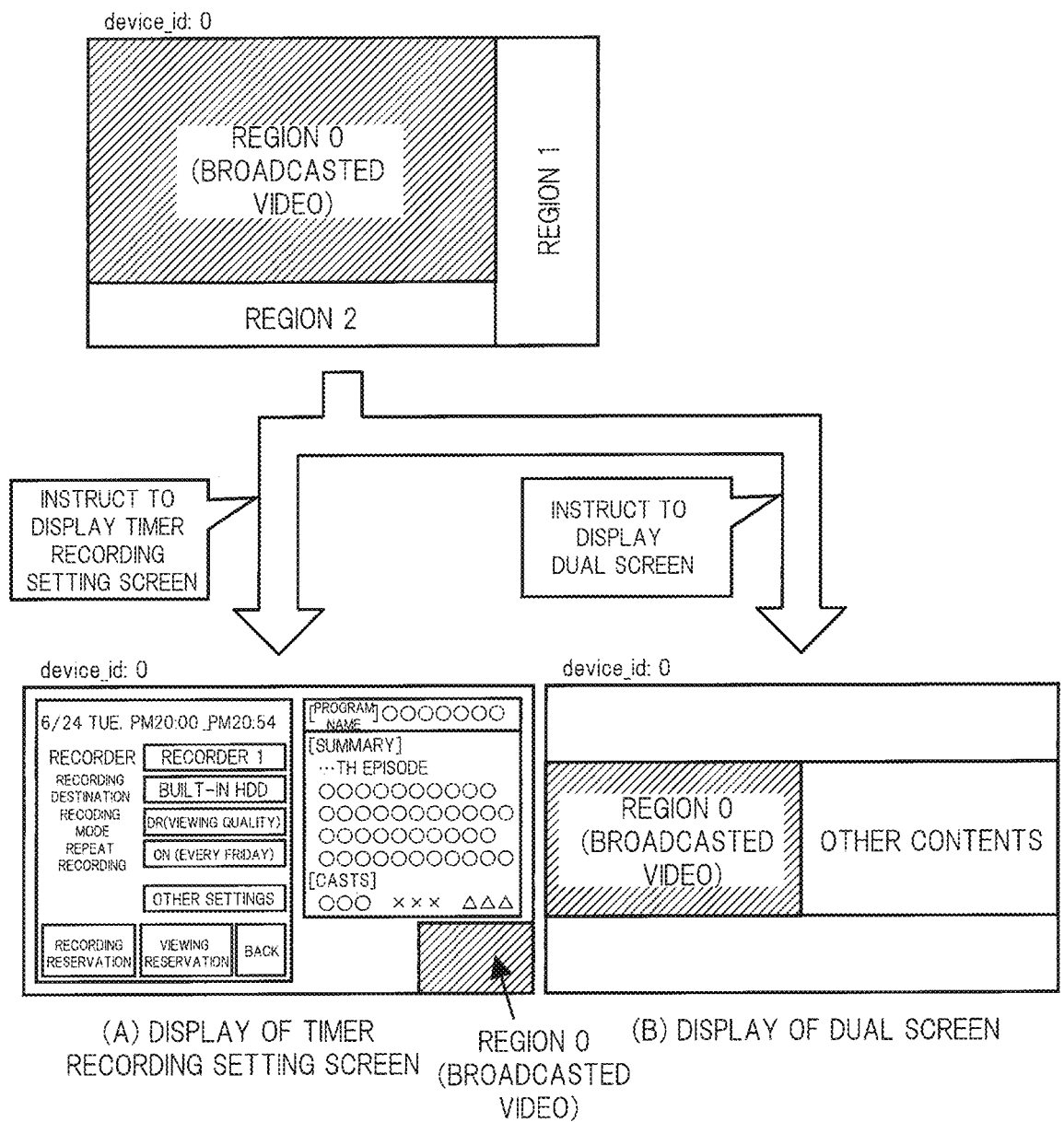
FIG. 18B is an explanatory diagram of an exceptional process of screen layout control based on the LCT.

Note that the exceptional process of the screen layout control is applied not only to the case of displaying the EPG screen but also to the case of displaying sub-screens of various setting screens (timer recording setting screen in the example of (A) of FIG. 18B) or displaying dual screens in the broadcast receiving apparatus 100, as shown in FIG. 18B.

In the case of the timer recording setting screen shown in (A) of FIG. 18B, a display area of broadcasting contents is shifted from the full-screen region to a sub-screen region on the right bottom corner of the screen. In the case of the dual screen display shown in (B) of FIG. 18B, the display area of broadcasting contents is shifted from the full-screen region to a divided screen region in the middle left side of the screen. In both cases, since the display area for displaying broadcasting contents is narrowed, compared to the case of using the entire screen, it is not preferable to maintain the control of screen layout region in the display area (that is, a plurality of broadcasting contents is kept displayed simultaneously in divided regions) from the viewpoint of offering fine visibility. For this reason, in the above-described situation, the broadcast receiving apparatus 100 of the present embodiment selects the broadcasting contents of the "region 0" and displays only the selected contents in the display area. Note that the broadcasting contents of the "region 1" or "region 2" may be selected and displayed depending on a region selection state right before the selection.

By performing the control described above, the easiness to see the broadcasting contents can be improved, compared to the case where various broadcasting contents are displayed while maintaining the control of screen layout region. The same applies also to the cases of displaying a sub-screen for a timer recording program list, displaying internet contents on a browser, and others.

[Aspect Ratio Converting Process of Video Signal]

In an aspect ratio for a video signal in television broadcasting service, there are "21:9" suitable for movie contents and the like in addition to "4:3" that has been used in conventional SDTV and "16:9" that is being used in recent HDTV. In the broadcasting system according to the present embodiment, information on the aspect ratio of the video signal may be described by the video component descriptor. FIG. 19A shows one example of a data structure of the video component descriptor. In FIG. 19A, a "video_aspect_ratio" parameter is information regarding the aspect ratio of the video signal. FIG. 19B shows one example of meanings of the "video_aspect_ratio" parameter. A different aspect ratio from those shown in FIG. 19B may further be assigned.

On the other hand, an aspect ratio of a display unit for television receiver (the broadcast receiving apparatus 100 according to the present embodiment or the like) that can receive the television broadcasting service is generally "16:9". Namely, when video contents whose aspect ratio is "4:3" or "21:9" are to be displayed on a common television receiver, an aspect ratio converting process may be executed.

Whether the aspect ratio converting process is to be executed or not may be determined by comparing specification of the monitor unit 162 in the broadcast receiving apparatus 100 with the "video_aspect_ratio" parameter of the video component descriptor. For example, in a case where the aspect ratio of the monitor unit 162 in the broadcast receiving apparatus 100 is "16:9" (3840 horizontal pixels×2160 vertical pixels, or the like) and a value of the "video_aspect_ratio" parameter is "0", "2", or "3", the aspect ratio converting process may not be executed. On the other hand, in a case where the aspect ratio is "16:9" and the value of the "video_aspect_ratio" parameter is "1" or "5", the aspect ratio converting process may be executed. Further, for example, in a case where the aspect ratio of the monitor unit 162 in the broadcast receiving apparatus 100 is "21:9" (5040 horizontal pixels×2160 vertical pixels, or the like) and the value of the "video_aspect_ratio" parameter is "0" or "5", the aspect ratio converting process may not be executed. On the other hand, in a case where the aspect ratio is "21:9" and the value of the "video_aspect_ratio" parameter is "1", "2", or "3", the aspect ratio converting process may be executed.

Figure 19C:
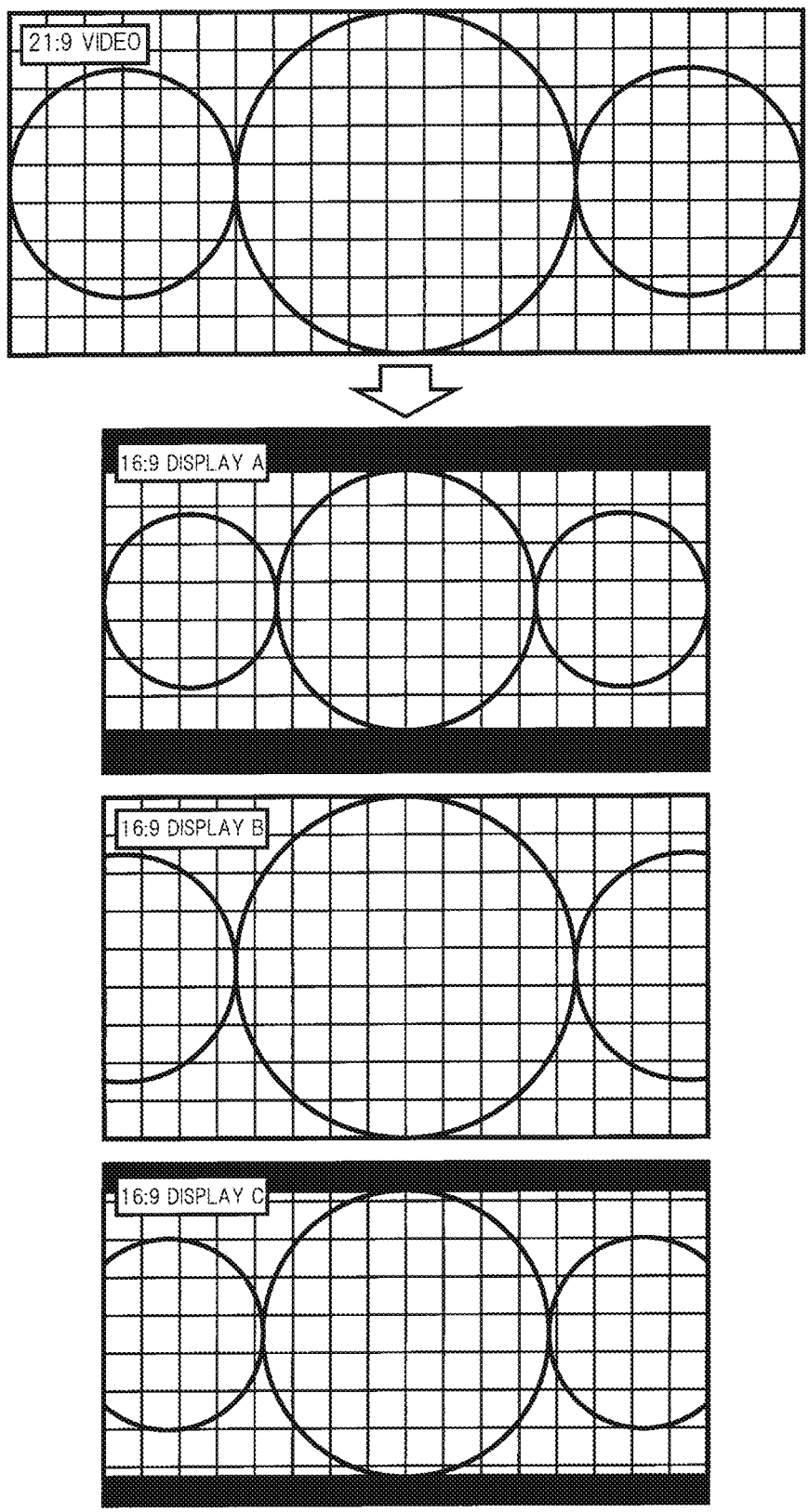
FIG. 19C is an explanatory diagram of an aspect ratio converting process of the broadcast receiving apparatus according to the first embodiment.
Figure 19D:
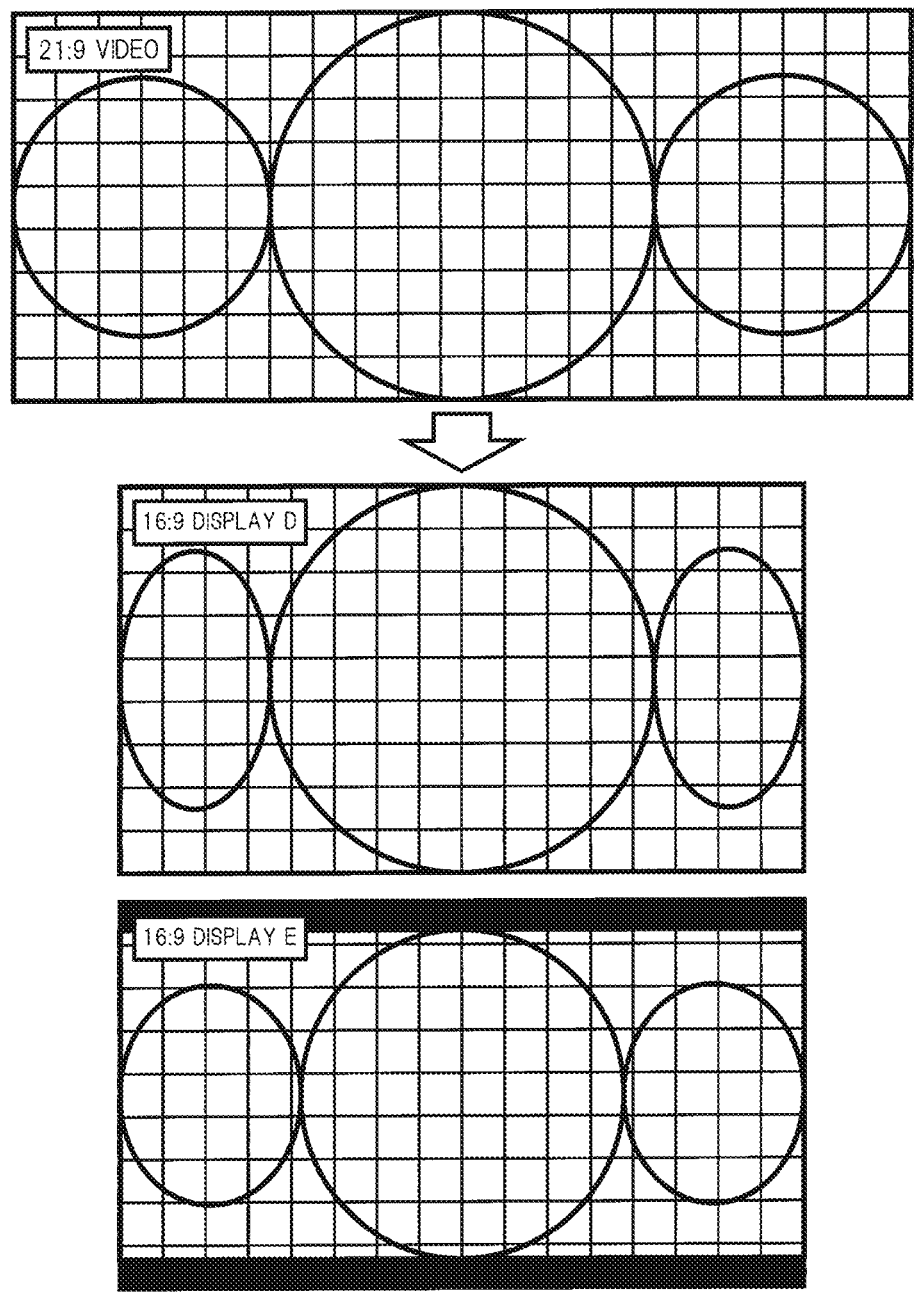
FIG. 19D is an explanatory diagram of an aspect ratio converting process of the broadcast receiving apparatus according to the first embodiment.

FIG. 19C and FIG. 19D show one example of the aspect ratio converting process in a case where the aspect ratio of the monitor unit 162 in the broadcast receiving apparatus 100 is "16:9" and the value of the "video_aspect_ratio" parameter is "5". In a case where video contents with an aspect ratio of "21:9" are displayed on the monitor unit 162 with an aspect ratio of "16:9", the aspect ratio may be converted into "16:9" by adding black zones to upper and lower portions of the video contents with the aspect ratio of "21:9" (display A in FIG. 19C). In this manner, the whole area of original video contents can be displayed without distortion. Further, by capturing only a central portion of the video contents with the aspect ratio of "21:9", the captured central portion may be displayed on the monitor unit 162 (display B in FIG. 19C). In this manner, a main portion of the original video contents can be enlarged and displayed. Further, the central portion may further be captured by somewhat adding black zones to the upper and lower portions of the video contents with the aspect ratio of "21:9" (display C in FIG. 19C). In this manner, the most portion of the original video contents can be enlarged and displayed. Further, the whole area may be displayed by compressing right and left end portions of the video contents with the aspect ratio of "21:9" (display D in FIG. 19D). In this manner, the whole area of the original video contents can be enlarged, and the main portion thereof can further be displayed without distortion. Further, the whole area may be displayed by somewhat adding black zones to the upper and lower portions of the video contents with the aspect ratio of "21:9" and further compressing the right and left end portions thereof (display E in FIG. 19D). In this manner, the whole area of the original video contents can be enlarged and displayed with small distortion of the right and left end portions thereof.

The user may be allowed to select how the aspect ratio converting process is to be executed by settings of a menu or the like. Alternatively, it may be switched by pressing a predetermined key of the remote controller or the like. Note that the aspect ratio of "21:9" described above contains ones whose aspect ratio substantially becomes "21:9" such as "2.35:1" for a so-called cinema scope. The numerical values of other aspect ratios are also similar.

[Display of EPG in Broadcast Receiving Apparatus]

In the broadcasting system of the present embodiment, time-series information related to events (so-called programs) included in services making up the broadcasting network is transmitted in the form of MH-EIT. The MH-EIT shown in FIG. 7E is classified into two classes by a table ID (corresponding to a "table_id" parameter in FIG. 7E), and can provide information of the current and next events in its own TLV stream and schedule information of events in its own TLV stream. The broadcast receiving apparatus 100 of the present embodiment refers to the MH-EIT and others to identity a service with a service ID (corresponding to the "service_id" parameter in FIG. 7E), thereby acquiring information of the start time, broadcasting time, and the like of each event to create an EPG screen. Further, the broadcast receiving apparatus 100 can display the created EPG screen on the monitor unit 162 by superposing it on video information and others in the video synthesizing unit 161.

Figure 20A:
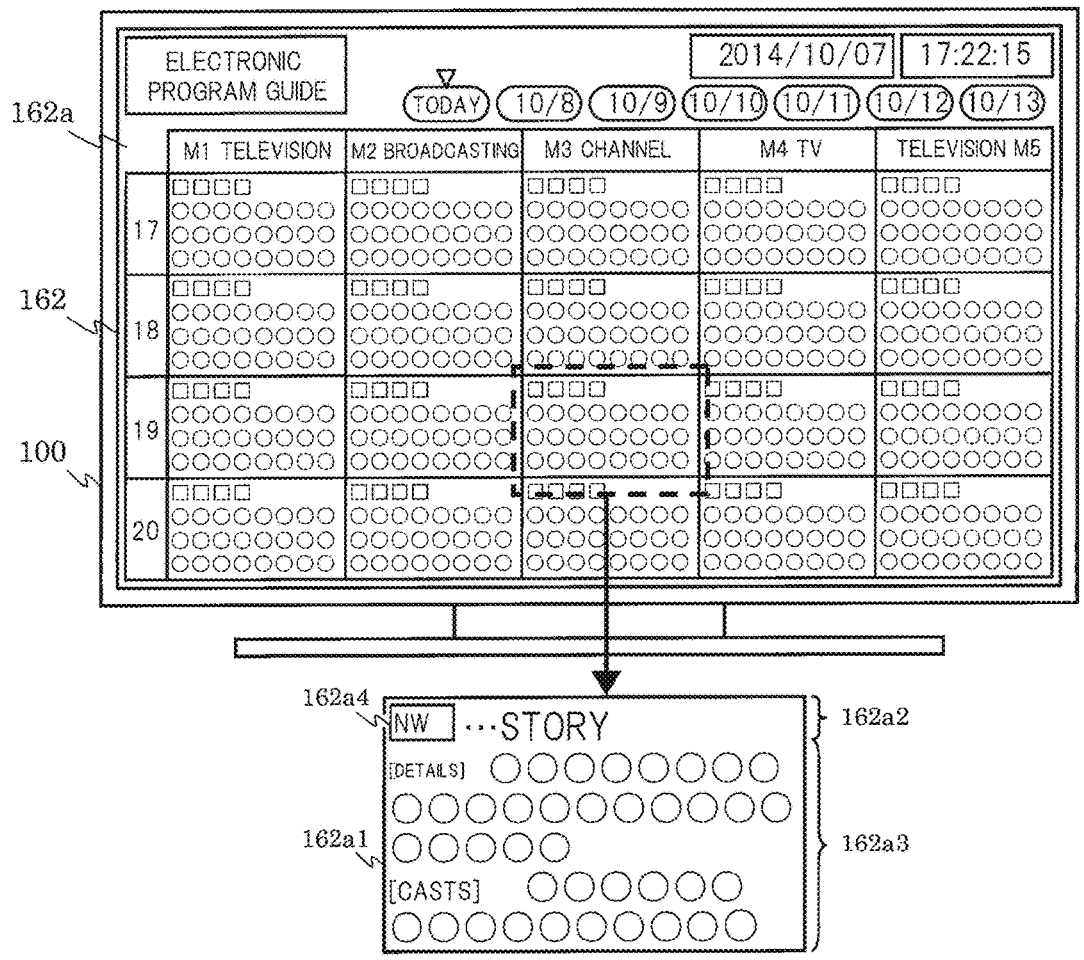
FIG. 20A is a screen display diagram of an EPG screen of the broadcast receiving apparatus according to the first embodiment.

FIG. 20A is a diagram showing one example of an EPG screen in the broadcast receiving apparatus 100 of the present embodiment. An EPG screen 162a has a matrix form with the vertical axis representing time and the horizontal axis representing service IDs (channels), and displays detailed information of broadcasting programs to be broadcasted in each channel in each time zone. Further, detailed information 162a1 of each broadcasting program is composed mainly of a title region 162a2 and a detail description region 162a3. Program information and the like described in an MH-short format event descriptor or an MH-extension format event descriptor and distributed may be displayed in the detailed information 162a1 of each broadcasting program. In a case where volume of the program information and the like described in each of the descriptors is large, abbreviated display may be executed during a normal time, and the whole program information may be displayed by pop-up at the time of selection by an operation of the remote controller (not shown in the drawings). Alternatively, at the time of the selection, the program information and the like described in each of the descriptors may be transmitted to the portable information terminal 700 that is being cooperated with the broadcast receiving apparatus 100, and the portable information terminal 700 may be instructed so as to display them on the display unit 741.

In the title region 162a2 in the detailed information 162a1 of each of the broadcasting programs, symbols and others expressing the title and properties of the broadcasting program are displayed. The symbols and others expressing the properties of the broadcasting program are, for example, symbols/characters indicating that the broadcasting program is a new program or rerun program, or may be a mark or the like standing for "data" indicating that the program supports data broadcasting by a broadcasting service, or may be a mark 162a4 or the like standing for "NetWork" indicating that contents, applications, and others related to the broadcasting program can be acquired through the network. In addition, the symbols and others expressing the properties of the broadcasting program may be substituted by differentiating the background color of the detailed information 162a1 from others or enclosing the display region of the detailed information 162a1 with a thick line.

Note that, even when control information (messages, tables, descriptors, etc.) in the broadcasting system of the present embodiment indicates that contents, applications, and others related to the broadcasting program can be acquired through the network, if access to server devices on the network cannot be made for such a reason that a LAN cable is not connected to the LAN communication unit 121 of the broadcast receiving apparatus 100, the screen may be controlled so as not to display the mark 162a4 or the like standing for "NetWork".

Figure 20B:
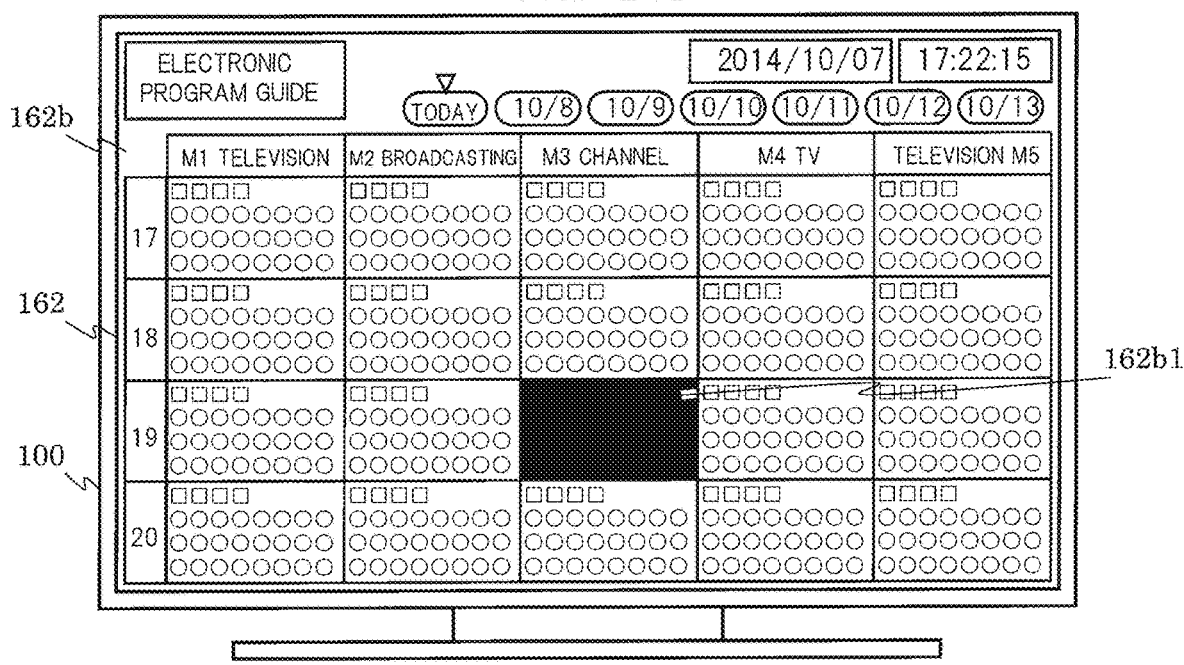
FIG. 20B is a screen display diagram of an EPG screen of the broadcast receiving apparatus according to the first embodiment.

In addition, when the broadcasting program is a network-distribution program distributed through the Internet 200 and therefore cannot be acquired from broadcast waves, and further the broadcast receiving apparatus 100 cannot access server devices on the network like in the case described above, the screen may be controlled so that a region of detailed information 162b1 displayed on an EPG screen 162b is grayed out as shown in FIG. 20B. Namely, the screen is controlled so as not to display detailed information of a network-distribution program that the user is not allowed to view. Alternatively, the gray-out process may be substituted by differentiating the background color of the detailed information 162b1 from others. Alternatively, a message such as "This program cannot be viewed" may be displayed in the detail description region 162a3 of the network-distribution program. It is also possible to notify the user that the broadcast receiving apparatus 100 is incapable of accessing server devices on the network or the user is not allowed to view a network-distribution program associated with the detailed information 162b1, by a popup message or the like when the user operates the remote controller (not shown) to select the detailed information 162b1.

Through the control described above, the broadcast receiving apparatus 100 can provide the user with information of broadcasting programs in a form that does not give any sense of discomfort to the user in accordance with the network connection state.

FIG. 20C is a diagram showing another example of the EPG screen in the broadcast receiving apparatus 100 of the present embodiment. In FIG. 20C, "M1 television", "M2 broadcasting", "M3 channel", "M4 TV", "Television M5", and others are the names of broadcast stations of respective channels, and the "M2 broadcasting" station provides broadcasting programs distributed through broadcast waves as well as network-distribution programs (information 162c1 indicated in a column of "network broadcasting" in FIG. 20C) distributed through the Internet 200 at the same time.

As shown in FIG. 20C, when a channel that provides only the network-distribution programs distributed through the Internet 200 is present, the screen is usually controlled to display the information of all the channels (including the information 162c1) as shown by an EPG screen 162c in (A) of FIG. 20C. On the other hand, in the case where the broadcast receiving apparatus 100 cannot access server devices on the network or the like, the screen may be controlled so as not to display information of the channel of "M2 broadcasting (network broadcasting)" that provides only the network-distribution programs distributed through the Internet 200 (information 162c1 in (A) of FIG. 20C) as shown by an EPG screen 162d in (B) of FIG. 20C.

Through the control described above, it becomes unnecessary for the user of the broadcast receiving apparatus 100 to check the information of a channel that provides programs that the user is not allowed to view.

[Display of Emergency Warning Broadcasting in Broadcast Receiving Apparatus]

The broadcast receiving apparatus 100 of the present embodiment can perform a process of receiving emergency warning broadcasting when an emergency warning broadcasting start control signal bit of a TMCC signal, which is included in transmission data including a TLV stream, changes from "0" to "1".

The emergency warning broadcasting may be provided as a broadcasting program of a dedicated channel (service ID), or may be provided as an application that displays a warning message on the full-screen scale or may be provided as character information in the form of a caption message. It is preferable that the character information in the form of a caption message is displayed regardless of the condition of the broadcast receiving apparatus 100 just before reception of the emergency warning broadcasting in a case where the emergency warning broadcasting is provided as character information in the form of a caption message. Namely, as shown in FIG. 21, when the broadcast receiving apparatus 100 receives emergency warning broadcasting in a state where the user views a regular broadcasting program by watching a program screen 162e of the broadcasting program displayed on the monitor unit 162, character information 162e1 by the emergency warning broadcasting is superposed and displayed on the program screen 162e. In the same manner, when the broadcast receiving apparatus 100 receives emergency warning broadcasting in a state where an EPG screen 162f is displayed on the monitor unit 162 in accordance with an instruction given by the user to display the EPG screen, character information 162f1 by the emergency warning broadcasting is superposed and displayed on the EPG screen 162f.

Through the control described above, even when the user selects an EPG screen, a setting screen, a timer recording program list screen, or an internet browser screen and causes the broadcast receiving apparatus 100 to display such a screen, it is possible to avoid overlooking important character information based on the received emergency warning broadcasting. Note that this control may be performed for the character information of an ordinary caption other than the emergency warning broadcasting.

Further, in a case where the emergency warning broadcasting is provided as the broadcasting program of the dedicated channel (service ID), the channel (service ID) for the emergency warning broadcasting may be selected automatically regardless of a channel (service ID) of a currently viewing program. Further, in a case where the emergency warning broadcasting is provided as the broadcasting program of the dedicated channel (service ID) or an application, the broadcasting program of the emergency warning broadcasting or the application may be distributed to external mobile terminal equipment that is cooperated with the broadcast receiving apparatus 100 (in the present embodiment, the portable information terminal 700 and the like) by means of control of the cooperating function executing unit 1103.

Further, in a case where a power source for the broadcast receiving apparatus 100 is not turned on at the time of delivery of the emergency warning broadcasting, the broadcast receiving apparatus 100 may execute control to turn on the power source thereof automatically. Alternatively, the broadcast receiving apparatus 100 may execute control so that notification that the emergency warning broadcasting is started is transmitted to the portable information terminal 700 that has a history of a cooperated operation with the broadcast receiving apparatus 100.

In the broadcast receiving apparatus 100 according to the present invention, the control described above allows to avoid the user from overlooking display of a video of an important broadcasting program or application based on the emergency warning broadcasting.

[Exceptional Process of Display Control]

The broadcast receiving apparatus 100 according to the present embodiment may execute an exceptional process as follows in a case where data transmitted through a path other than the TLV stream of each of data constituting the same package cannot be acquired, for example.

As described above with reference to FIG. 7A, in the broadcasting system compatible with the broadcast receiving apparatus 100 according to the present embodiment, data acquired from the TLV stream and data acquired from a path other than the TLV stream can be contained in the same package on the basis of the location information stored in the MPT (see FIG. 7C). However, data transmitted through a data transmission path other than the TLV stream, which is indicated by the location information, (for example, the IPv4 data flow or the IPv6 data flow of the communication line, MPEG2-TS for broadcast, or the like) are data that are acquired by other receiving function than the receiving function for the TLV/MMT streams. Therefore, even though the broadcast receiving apparatus 100 is operating, there are situations that data cannot be acquired through these transmission paths, such as a situation that the receiving function of these transmission paths does not operate, a situation that the receiving function itself is operating but a relay apparatus or the like on the transmission path does not operate, a situation that wired or wireless connection of these transmission paths is not made, or a situation that the broadcast receiving apparatus 100 is installed in an environment that these transmission paths cannot be connected at all.

Under such a situation, in a case where an event indicating that the location information stored in the MPT is associated so as to contain the data acquired from the TLV stream and the data acquired from the path other than the TLV stream in the same package is received, the broadcast receiving apparatus 100 according to the present embodiment may execute operations as follows.

For example, in a case where the LCT sets a plurality of regions in a screen as shown in FIG. 17D and FIG. 17E and is associated so that program video based on the data acquired from the TLV stream is displayed in "region 0" and contents based on the data acquired from the transmission path other than the TLV stream are displayed in "region 1" and/or "region 2" and the data to be displayed in "region 1" and/or "region 2" cannot be acquired through the transmission path other than the TLV stream, layout display of plural regions specified by the LCT may be prohibited. Specifically, even though the LCT is received, a state that the program video based on the data acquired from the TLV stream is displayed in "region 0" of the default layout display shown in FIG. 17C may be held, and the broadcast receiving apparatus 100 may not shift to layout display for plural regions as shown in FIG. 17D or FIG. 17E. Further, even though a change instruction from the default layout to the layout indicated by the LCT is further inputted into the operation input unit 170 of the broadcast receiving apparatus 100 in this state, the default layout display shown in FIG. 17C may be held, or the broadcast receiving apparatus 100 may not shift to the layout display for the plural regions as shown in FIG. 17D or FIG. 17E by switching to another data broadcasting screen.

Further, as another operation example in a case where the LCT sets a plurality of regions in a screen as shown in FIG. 17D and FIG. 17E and is associated so that program video based on the data acquired from the TLV stream is displayed in "region 0" and contents based on the data acquired from the transmission path other than the TLV stream are displayed in "region 1" and/or "region 2" and the data to be displayed in "region 1" and/or "region 2" cannot be acquired through the transmission path other than the TLV stream, a display frame of the plural regions indicated by the LCT as shown in FIG. 17D or FIG. 17E may be displayed temporarily, and the background color or a predetermined still image may be displayed in "region 1" or "region 2". In a case where the data cannot be acquired through the transmission path other than the TLV stream indicated by the location information of the MPT even though a given time elapses, display switching to return to the state of the default layout display shown in FIG. 17C may be executed. In this case, it is preferable that at the time of change from the layout shown in FIG. 17C to the layout shown in FIG. 17D or FIG. 17E and at the time of change from the layout shown in FIG. 17D or FIG. 17E to the layout shown in FIG. 17C, the broadcast receiving apparatus 100 operates so that the program video based on the data acquired from the TLV stream is continuously displayed in "region 0" of each of the layouts. This is because viewing of the program video by the user can be continued.

Further, when the data to be displayed in "region 1" or "region 2" cannot be acquired through the transmission path other than the TLV stream and it thereby becomes a state that the program video based on the data acquired from the TLV stream is displayed in "region 0" of the default layout display shown in FIG. 17C, by starting operations of various communicating functions or various receiving functions in the broadcast receiving apparatus 100 according to the present embodiment or changing a communication environment and/or a communication situation of the various communication function or a reception environment and/or a reception situation of the various receiving function, the broadcast receiving apparatus 100 may become a situation that the data to be displayed in "region 1" or "region 2" can be acquired through the transmission path other than the TLV stream. In this case, the broadcast receiving apparatus 100 according to the present embodiment may immediately switch from the default layout display shown in FIG. 17C to the layout of the plural regions indicated by the LCT as shown in FIG. 17D or FIG. 17E. Further, the broadcast receiving apparatus 100 may switch so that the program video based on the data acquired from the TLV stream is displayed in "region 0" and the contents based on the data acquired from the transmission path other than the TLV stream are displayed in "region 1" or "region 2". Alternatively, the broadcast receiving apparatus 100 may not execute the layout change immediately, and may execute the layout change after the change instruction from the default layout to the layout indicated by the LCT is inputted from the operation input unit 170. In this case, it is preferable to inform the user that the layout change becomes possible by means of OSD display or the like.

[Copyright Protecting Function]

In the digital broadcasting system compatible with the broadcast receiving apparatus 100 according to the present embodiment, by transmitting the copy control information so as to be contained in the MPT or the like, a copy control state for contents to which the MPT or the like refers may be indicated. The copy control state includes "freely copiable" (which may be divided into two types such as "freely copiable and requiring an encrypting process at the time of accumulation and output" and "freely copiable and not requiring the encrypting process at the time of accumulation and output"), "copiable only for one generation", "copiable given times" (for example, a so-called "dubbing 10" if copiable nine times+allowing move once), and "copy prohibition", for example. In this case, the broadcast receiving apparatus 100 according to the present embodiment may be configured so as to control, in accordance with the copy control information, an accumulating process of the contents to the storage (accumulation) unit 110, a recording process to a removable recording medium, an outputting process to external equipment, a copying process to external equipment, a moving process to external equipment, and the like.

Note that a target of the accumulating process may include not only the storage (accumulation) unit 110 in the broadcast receiving apparatus 100, but also the removable recording medium and the external equipment that is subjected to a protecting process such as the encrypting process so that contents accumulated therein can be reproduced only by the broadcast receiving apparatus 100. Specifically, for example, one set to a state that the one can be recorded or reproduced only by the broadcast receiving apparatus 100 among external recording apparatuses such as an HDD connected to the extension interface unit 124 is included.

<Contents Copy Control>

A concrete example of a process of contents copy control based on the copy control information will be described below.

First, in a case where the copy control information contained in the MPT or the like indicates "freely copiable", the broadcast receiving apparatus 100 according to the present embodiment may execute the accumulating process to the storage (accumulation) unit 110, the recording process to a removable recording medium, the outputting process to external equipment, the copying process to external equipment, the moving process to external equipment, and the like without any limitation. However, in a case where the control based on the copy control information is divided into "freely copiable and requiring an encrypting process at the time of accumulation and output" and "freely copiable and not requiring the encrypting process at the time of accumulation and output" and indicates "freely copiable and requiring an encrypting process at the time of accumulation and output", the broadcast receiving apparatus 100 can execute the accumulating process to the storage (accumulation) unit 110, the recording process to a removable recording medium, the outputting process to external equipment, the copying process to external equipment, and the moving process to external equipment without any limitation, but it is necessary to apply the encrypting process to the target in any case.

Further, in a case where the copy control information contained in the MPT or the like indicates "copiable only for one generation", the broadcast receiving apparatus 100 according to the present embodiment may be allowed to execute an accumulating process to the storage (accumulation) unit 110 after encryption, and a recording process to a removable recording medium that is subjected to the protecting process such as the encrypting process so that contents can be reproduced only by the broadcast receiving apparatus 100. Further, in a case where contents after accumulation is outputted to external equipment for viewing, the contents are encrypted and outputted together with the copy control information of "copy prohibition". Further, the so-called moving process to external equipment (a process of copying the contents to external equipment, and disenabling reproduction by a deleting process of the contents from the storage (accumulation) unit 110 or the like of the broadcast receiving apparatus 100) can be executed.

Further, in a case where the copy control information contained in the MPT or the like indicates "copiable given times", the broadcast receiving apparatus 100 according to the present embodiment may be allowed to execute the accumulating process to the storage (accumulation) unit 110 after encryption, and the recording process to the removable recording medium that is subjected to the protecting process such as the encrypting process so that contents can be reproduced only by the broadcast receiving apparatus 100. Further, in a case where contents after accumulation is outputted to external equipment for viewing, the contents are encrypted and outputted together with the copy control information of "copy prohibition". Further, the broadcast receiving apparatus 100 may be allowed to execute the copying process and the moving process to external equipment the predetermined number of times defined in advance. In a case where a so-called "dubbing 10" is defined, the broadcast receiving apparatus 100 can execute the copying process to external equipment nine times and the moving process to external equipment once.

Further, in a case where the copy control information contained in the MPT or the like indicates "copy prohibition", the broadcast receiving apparatus 100 according to the present embodiment prohibits the contents from being accumulated (or copied) to the storage (accumulation) unit 110 or the like. However, the broadcast receiving apparatus 100 may be configured so as to have a "temporary accumulation" mode in which the contents can be held to the storage (accumulation) unit 110 or the like only for a given time defined in advance or a given time specified by the control information (for example, by the MH-Expire descriptor, the contents usage control descriptor, or the like) contained in broadcasting signal. In this case, even in a case where the copy control information contained in the MPT or the like indicates "copy prohibition", the broadcast receiving apparatus 100 can temporarily hold the contents to the storage (accumulation) unit 110 or the like. In a case where the contents, for which the copy control information contained in the MPT or the like indicates "copy prohibition", are to be outputted to external equipment for viewing, the contents are encrypted and outputted together with the copy control information for "copy prohibition".

Note that output to external equipment for viewing described above may be executed through the video output unit 163 and the audio output unit 166 of the broadcast receiving apparatus 100 according to the present embodiment, or via the digital interface unit 125, the LAN communication unit 121, and the like. The copying process or the moving process to external equipment described above may be executed via the digital interface unit 125, the LAN communication unit 121, and the like.

FIG. 22A shows one example of a data structure of the contents copy control descriptor in the broadcasting system according to the present embodiment. In FIG. 22A, a "digital_recording_control_data" parameter is digital copy control information, and indicates information for controlling copy generation of contents. Further, FIG. 22B shows one example of parameter values of the digital copy control information and their meanings. For example, in a case where the parameter is "00", it indicates "freely copiable". In a case where the parameter is "01", definition by the provider is allowed. In a case where the parameter is "10", it indicates "copiable only for one generation". In a case where the parameter is "11", it indicates "copy prohibition". Further, FIG. 23 shows one example of a data structure of the contents usage control descriptor in the broadcasting system according to the present embodiment. A "copy_restriction_mode" parameter in FIG. 23 is a copy restriction mode, and indicates whether copy for which the number of copies is restricted can be executed or not.

In the broadcast receiving apparatus 100 according to the present invention, in a case where the digital copy control information is "01", the accumulating process in which copy can be executed the predetermined number of times defined by a broadcaster in advance can be executed. Alternatively, in a case where the digital copy control information is not "11" and the copy_restriction_mode indicates that the copy for which the number of copies is restricted is allowed, the broadcast receiving apparatus 100 may be allowed to execute the accumulating process in which copy can be executed the predetermined number of times defined by the broadcaster in advance. Alternatively, in this case, the number of copiable times for each content may be specified by using a part or all of a "reserved_future_use" parameter in a digital contents usage descriptor.

Through the process described above, the broadcast receiving apparatus 100 according to the present embodiment can realize the contents copy control for the "copiable given times" described above.

Further, in a case where a "retention mode" parameter in the contents usage control descriptor shown in FIG. 23 is a temporary accumulation control bit and the digital copy control information indicates "copy prohibition", the "retention_mode" parameter indicates whether temporary accumulation of target content is permitted or not. Further, a "retention state" parameter is a temporary accumulation permissible time, and indicates the temporary accumulation permissible time in a case where the temporary accumulation permissible bit permits the temporary accumulation of the target content.

In the broadcast receiving apparatus 100 according to the present invention, by referring information on each of the temporary accumulation control bit and the temporary accumulation permissible time, advisability of the temporary accumulation in a case where the digital copy control information of each content indicates "copy prohibition" and an accumulation time thereof can be controlled.

According to the processes described above, proper content protection can be achieved in accordance with the copy control information correlated with contents.

<Contents Output Control>

Next, a concrete example of a process of output control of contents to external equipment will be described below.

In the contents usage control descriptor shown in FIG. 23, an "image_constraint_token" parameter is a resolution limit bit, and indicates that image quality limit is to be required or not when contents are outputted to external equipment. In a case where the resolution limit bit indicates that the image quality limit is to be required, the broadcast receiving apparatus 100 according to the present embodiment executes the image quality limit for the target content when the target content is outputted to external equipment. Note that the image quality limit may not be required when the target content is accumulated to the storage (accumulation) unit 110 or the like. In the image quality limit, for example, received (or accumulated) UHD (7680 pixels×4320 pixels) video contents are converted into SHD (3840 pixels×2160 pixels) video and then outputted, or an HD (1920 pixels× 1080 pixels) video is converted into an SD (640 pixels×480 pixels) video and then outputted. Note that to what extent should the image quality limit of the target content be executed, that is, to what resolution an image quality of the target content is converted after the image quality limit may be specified by using a part or all of the "reserved_future_use" parameter of the digital contents usage descriptor.

In the similar manner as described above, for example, a frame rate limit bit or a pixel resolution power limit bit may be prepared by using a part or all of the "reserved_future_use" parameter, and limit of a frame rate or limit of pixel resolution power may be controlled when the contents are outputted to external equipment. In a case where the frame rate limit bit indicates that the limit of the frame rate is required, the broadcast receiving apparatus 100 according to the present embodiment executes the limit of the frame rate of the target content when the target content is outputted to the external equipment. For example, video contents with a frame rate of 120 Hz are converted into contents with a frame rate of 60 Hz, and then outputted. Further, in a case where the pixel resolution power limit bit indicates that the limit of the pixel resolution power is required, the broadcast receiving apparatus 100 according to the present embodiment executes the limit of resolution power of each pixel of the target content when the target content is outputted to the external equipment. For example, each pixel of video contents in which each pixel is constituted by 12 bits is converted into 8 bits, and then outputted.

Moreover, a resolution limit control flag, a frame rate limit control flag or a pixel resolution power limit control flag may be prepared by using a part or all of the "reserved_future_use" parameter, and whether the image quality limit, the frame rate limit or the pixel resolution power limit is to be executed or not may be controlled in accordance with the resolution limit control flag, the frame rate limit control flag, or the pixel resolution power limit control flag. For example, control may be executed so that the image quality limit is not executed in a case where the resolution limit control flag indicates that resolution limit control is executed in accordance with interface specification and an interface through which the target content is outputted includes a predetermined content protection technology. On the other hand, the control may be executed so that the image quality limit is executed in a case where the interface does not include the predetermined content protection technology in such a situation.

Specifically, for example, in a case where the digital interface unit 125 is an HDMI interface and the target content is outputted to external equipment connected to the HDMI interface and an HDMI interface included in the external equipment is compliant with HDCP (High-bandwidth Digital Content Protection) since version 2.2, the image quality limit is not executed, but output of the target content is executed. On the other hand, in a case where the version of HDCP of the HDMI interface in the external equipment is before 2.2 in such a situation, the image quality limit is executed, and the output of the target content is also executed. Namely, whether the image quality limit for the target content is to be executed or not may be controlled in accordance with whether the interface through which the target content is outputted includes the predetermined content protection technology defined in advance or not. Alternatively, in a case where the interface includes the content protection technology, whether the image quality limit for the target content is to be executed or not may be controlled in accordance with the version of the content protection technology. In a case where the resolution limit control flag does not indicate that the resolution limit control is to be executed in accordance with the interface specification, presence or absence of the image quality limit may be controlled in accordance with only the resolution limit bit. With respect to the frame rate limit control flag or the pixel resolution power limit control flag, the similar processes thereto may be executed.

Further, the copying process of the contents for which the copy control information described above indicates copy limitations such as "copiable only for one generation", "copiable given times", and "copy prohibition" to external equipment through the LAN communication unit 121 may be allowed only when the IP address of the external equipment which is the destination of a transmission packet sent from the broadcast receiving apparatus 100 is present in the same subnet as the IP address of the broadcast receiving apparatus 100, and may be prohibited when the IP address of the external equipment is outside the subnet in which the IP address of the broadcast receiving apparatus 100 is present. The same applies also to the case of the contents for which the copy control information indicates "freely copiable and requiring encoding process upon storage and output".

Similarly, the moving process, the copying process, and the like to external equipment through the LAN communication unit 121 after storing the contents for which the copy control information described above indicates copy limitations such as "copiable only for one generation", "copiable given times", and "freely copiable and requiring encoding process upon storage and output" temporarily in the storage (accumulation) unit 110 may be allowed only when the IP address of the external equipment which is the destination of a transmission packet sent from the broadcast receiving apparatus 100 is present in the same subnet as the IP address of the broadcast receiving apparatus 100, and may be prohibited when the IP address of the external equipment is outside the subnet in which the IP address of the broadcast receiving apparatus 100 is present.

Further, video and audio output for viewing contents stored in the storage (accumulation) unit 110 of the broadcast receiving apparatus 100 is allowed in principle only when the IP address of the external equipment which is the destination of a transmission packet sent from the broadcast receiving apparatus 100 is present in the same subnet as the IP address of the broadcast receiving apparatus 100, and the output is prohibited when the IP address of the external equipment is outside the subnet in which the IP address of the broadcast receiving apparatus 100 is present. However, when the external equipment is connected within a given period in the subnet in which the IP address of the broadcast receiving apparatus 100 is present and is registered (by paring) as equipment allowed to view the contents even outside the subnet in which the IP address of the broadcast receiving apparatus 100 is present, video and audio output for viewing the contents stored in the storage (accumulation) unit 110 of the broadcast receiving apparatus 100 to the external equipment may be allowed even when the IP address of the external equipment is outside the subnet in which the IP address of the broadcast receiving apparatus 100 is present. In this case, the video and audio output for viewing the contents is performed by encoding the contents.

However, the encrypting process may be controlled in accordance with a value of an "encryption_mode" parameter in the contents usage control descriptor shown in FIG. 23. Namely, in a case where the value of the "encryption_mode" parameter indicates that output protection for IP interface output is required, the encrypting process may be executed.

On the other hand, in a case where it indicates that the output protection for the IP interface output is not required, video output and audio output for the viewing may be executed without executing the encrypting process. Alternatively, in a case where the value of the "encryption_mode" parameter indicates that the output protection for the IP interface output is required, a range of the IP address of the external equipment in which the video output and the audio output for the viewing can be executed without being subjected to the encrypting process may be specified by using a part or all of the "reserved_future_use" parameter of the contents usage control descriptor. Namely, with respect to the predetermined IP address defined in advance, even though the IP address is not positioned in the same subnet as the IP address of the broadcast receiving apparatus 100, it is possible to execute the video output and the audio output for the viewing.

Further, by using a part or all of the "reserved_future_use" parameter of the contents usage control descriptor, a period of time in which a registering process (pairing) becomes effective may be specified. In this case, in a case where date and time when the registering process (pairing) for external equipment was executed are within the specified period of time, the broadcast receiving apparatus 100 may control so that video output and audio output for viewing are permitted with respect to the external equipment even though the external equipment is positioned outside the same subnet of the IP address of the broadcast receiving apparatus 100. In a case where the date and time are outside the specified period of time, the broadcast receiving apparatus 100 may control so that they are not permitted.

Further, the moving process, the copying process, the outputting process and the like of contents to external equipment through the LAN communication unit 121 as described above may be controlled in accordance with a value of a "remote_view_mode" parameter in the contents usage control descriptor. Namely, in a case where the value of the "remote_view_mode" parameter indicates that remote viewing of the target content is not permitted, the broadcast receiving apparatus 100 may control so that all of the moving process, the copying process, the outputting process and the like of contents to the external equipment through the LAN communication unit 121 are prohibited.

According to the processes described above, it is possible to realize appropriate content protection when the contents are outputted to the external equipment.

<First Exceptional Process of Contents Copy Control>

In the data structure of the contents copy control descriptor shown in FIG. 22A, first digital copy control information (the "digital_recording_control_data" parameter positioned immediately after "descriptor length") is control information for copy generation regarding the whole contents, while second digital copy control information (the "digital_recording_control_data" parameter positioned immediately after "component_tag") is control information for copy generation regarding each of components constituting the contents. Note that specification of each of the components is made by a "component_tag" parameter.

In the broadcasting system according to the present embodiment, in a case where control of copy generation of the whole contents (program) is executed, only the first digital copy control information is described in the contents copy control descriptor, and the control of the copy generation is executed by the first digital copy control information. On the other hand, in a case where the control of the copy generation is executed for each of components constituting the contents, both the first digital copy control information and the second digital copy control information are described in the contents copy control descriptor, and the control of the copy generation is executed. Moreover, in a case where the control of the copy generation is executed for each of components constituting the contents, a situation is thought that the first digital copy control information described in the contents copy control descriptor does not coincide with description of the second digital copy control information. In the situation described above, the broadcast receiving apparatus 100 according to the present embodiment may execute operations as described below.

First, a first operation example is a method of executing control so that the broadcast receiving apparatus 100 operates on the basis of copy generation control indicated by the first digital copy control information in a case where description of the first digital copy control information does not coincide with description of the second digital copy control information. In this case, simple copy generation control common to each of components constituting the same contents becomes possible.

Next, a second operation example is a method of executing control so that the broadcast receiving apparatus 100 operates on the basis of copy generation control indicated by the second digital copy control information in a case where the description of the first digital copy control information does not coincide with the description of the second digital copy control information. In this case, different copy generation control can be made for each of the components even though the components are components constituting the same contents, that is, more precise copy generation control becomes possible.

Moreover, a third operation example is a method of executing control so that the broadcast receiving apparatus 100 operates on the basis of digital copy control information having a stricter condition of two different types of digital copy control information in a case where the description of the first digital copy control information does not coincide with the description of the second digital copy control information. For example, in a case where one is "freely copiable" and the other is "copiable only for one generation", the operation is made in accordance with information with "copiable only for one generation". Alternatively, in a case where one is "copiable given times" and the other is "copy prohibition", the operation is made in accordance with information with "copy prohibition". Alternatively, in a case where both are "copiable given times", the operation is made in accordance with information for which the number of copiable times, which is separately specified, is smaller. In this case, it is possible to control copy generation more exactly.

By executing the processes described above, in the broadcast receiving apparatus 100 according to the present invention, it becomes possible to suitably operate even in a case where two different types of digital copy control information are described in the contents copy control descriptor.

<Second Exceptional Process of Contents Copy Control>

As described above by using FIG. 7A, in the digital broadcasting system compatible with the broadcast receiving apparatus 100 of the present embodiment, data that is acquired from a path (IPv4, IPv6, MPEG2-TS, URL, etc.) different from data that is acquired from a TLV stream of the broadcasting path may be included in the same package and the same event as the data that is acquired from the TLV stream based on the location information (see FIG. 7C) in the MTP or the like. The content protection that is performed when copy control information is included in the MPT in this case will be described.

First, when copy control information is included in the MPT or the like, data that is included in the same package and the same event based on the location information may be controlled in accordance with the copy control information included in the TLV stream even if the data is acquired from a path (IPv4, IPv6, MPEG2-TS, URL, etc.) different from data that is acquired from a TLV stream of the broadcasting path. As described above, the copy control states of contents specified by the copy control information include "freely copiable" (which may be divided into two types such as "freely copiable and requiring encoding process upon storage and output" and "freely copiable and not requiring encoding process upon storage and output"), "copiable only for one generation", "copiable given times" (e.g., a so-called "dubbing 10" if copiable nine times+ allowing move once), and "copy prohibition".

Herein, if data location indicated by the location information includes MPEG2-TS data transmitted by a different digital broadcasting signal, the transmitted MPEG2-TS data is correlated with copy control information also in the different digital broadcasting signal. Accordingly, a problem arises as to in what way and in accordance with which information the copy control of the MPEG2-TS data should be performed (which of the copy control information included in the TLV/MMT stream and the copy control information included in the MPEG2-TS should be referred to in performing copy control).

In the digital broadcasting system of the present embodiment, this problem can be solved by performing any one of the following operations in the broadcast receiving apparatus 100.

First Operation Example

In a first operation example, when copy control information is included in the MPT or the like and data that is included in the same package and the same event based on the location information includes MPEG2-TS data transmitted by a different digital broadcasting signal, priority is given to a copy control state indicated by the copy control information included in the TLV stream over a copy control state indicated by the copy control information included in the MPEG2-TS in performing copy control.

For example, when the copy control state indicated by the copy control information included in the TLV stream is "copiable only for one generation" while the copy control state indicated by the copy control information included in the MPEG2-TS is "copiable given times", even the data acquired from a path (digital broadcasting in the MPEG2-TS transmission format) different from the data acquired from the TLV stream may be subjected to copy control as the data contents of "copiable only for one generation". For example, when the copy control state indicated by the copy control information included in the TLV stream is "freely copiable" while the copy control state indicated by the copy control information included in the MPEG2-TS is "copiable given times", even the data acquired from a path (digital broadcasting in the MPEG2-TS transmission format) different from the data acquired from the TLV stream may be subjected to copy control as the data contents of "freely copiable".

By this operation, data acquired from a path other than the TLV stream can also be put in a copy control state desired in the broadcasting system compatible with the broadcast receiving apparatus 100 of the present embodiment.

Second Operation Example

In a second operation example, when copy control information is included in the MPT or the like and data that is included in the same package and the same event based on the location information includes MPEG2-TS data transmitted by a different digital broadcasting signal, a copy control state indicated by the copy control information included in the TLV stream is compared with a copy control state indicated by the copy control information included in the MPEG2-TS, and if the copy control state indicated by the copy control information included in the MPEG2-TS is severer than the copy control state indicated by the copy control information included in the TLV stream, the MPEG2-TS data is excluded from contents to be processed when performing the storing process to the storage (accumulation) unit 110, recording process on the removable recoding medium, or outputting process from the digital interface.

By this operation, with respect to the data acquired from the path other than the TLV stream, the original copy control information of the data set in the broadcasting system in which the data is transmitted is taken into account, and also the redundant copy control states on the broadcast receiving apparatus 100 of the present embodiment can be eliminated.

Further, if the copy control state indicated by the copy control information included in the MPEG2-TS is identical to or less severe than the copy control state indicated by the copy control information included in the TLV stream as a result of the above comparison, the MPEG2-TS data that is included in the same package and the same event based on the location information may be subjected to copy control as contents in the copy control state indicated by the copy control information included in the TLV stream.

By this operation, with respect to the data acquired from the path other than the TLV stream, the original copy control information of the data set in the broadcasting system in which the data is transmitted is taken into account, and the redundant copy control states on the broadcast receiving apparatus 100 of the present embodiment can be eliminated.

The copyright protection function of the broadcast receiving apparatus 100 of the present embodiment has been described as being performed based on the copy control information included in the MPT. However, the MPT is not the only table including the copy control information. The copy control information may be included also in tables other than the MPT such as the MH-service description table (MH-SDT), the MH-event information table (MH-EIT), or other tables shown in FIG. 6B, and the broadcast receiving apparatus 100 can perform the copyright protection process in accordance with the copy control information transmitted in these tables.

According to the above-described embodiment, it is possible to provide the broadcasting receiver supporting MMT digital broadcasting.

Second Embodiment

A second embodiment of the present invention will be described below. Constituent elements, processes, effects and the like of the second embodiment are the same as those of the first embodiment unless otherwise specified. For this reason, in the following description, differences between the first embodiment and the second embodiment are mainly described, and description of the matters common to both embodiments will be omitted as much as possible in order to avoid redundant description. Further, the following description will be made based on the assumption that a broadcast receiving apparatus of the second embodiment is a television receiver that supports both of MMT method and MPEG2-TS method as the media transport method.

[Hardware Configuration of Broadcast Receiving Apparatus]

FIG. 24 is a block diagram showing an example of an internal configuration of a broadcast receiving apparatus 800. The broadcast receiving apparatus 800 includes a main control unit 801, a system bus 802, a ROM 803, a RAM 804, a storage unit 810, a LAN communication unit 821, an extension interface unit 824, a digital interface unit 825, a first tuner/demodulating unit 831, a second tuner/demodulating unit 832, an MMT decode processing unit 841, an MPEG2-TS decode processing unit 842, a video synthesizing unit 861, a monitor unit 862, a video output unit 863, an audio synthesizing unit 864, a speaker unit 865, an audio output unit 866, and an operation input unit 870.

The main control unit 801, the system bus 802, the ROM 803, the RAM 804, the storage unit 810, the extension interface unit 824, the digital interface unit 825, the monitor unit 862, the video output unit 863, the speaker unit 865, the audio output unit 866, the operation input unit 870, and the like have functions equivalent to those of the main control unit 101, the system bus 102, the ROM 103, the RAM 104, the storage (accumulation) unit 110, the extension interface unit 124, the digital interface unit 125, the monitor unit 162, the video output unit 163, the speaker unit 165, the audio output unit 166, the operation input unit 170, and the like in the broadcast receiving apparatus 100 of the first embodiment, respectively, and detail descriptions thereof will be omitted.

The first tuner/demodulating unit 831 receives broadcast waves of a broadcasting service adopting the MMT method as the media transport method via an antenna (not shown), and tunes to (selects) a channel giving a service that the user wishes to have, under the control by the main control unit 801. Further, the first tuner/demodulating unit 831 demodulates a received broadcasting signal to acquire an MMT data string, and outputs the MMT data string to the MMT decode processing unit 841. The second tuner/demodulating unit 832 receives broadcast waves of a broadcasting service adopting the MPEG2-TS method as the media transport method via an antenna (not shown), and tunes to (selects) a channel giving a service that the user wishes to have, under the control by the main control unit 801. Further, the second tuner/demodulating unit 832 demodulates a received broadcasting signal to acquire an MPEG2-TS data string, and outputs the MPEG2-TS data string to the MPEG2-TS decode processing unit 842.

The MMT decode processing unit 841 receives the MMT data string output from the first tuner/demodulating unit 831, and performs processes of separating and decoding a video data string, an audio data string, a caption data string, a subtitle data string, and the like, which are real-time presentation elements, based on a control signal included in the MMT data string. The MMT decode processing unit 841 has the functions equivalent to those of the separating unit 132, the video decoder 141, the video color gamut conversion unit 142, the audio decoder 143, the caption decoder 144, the subtitle decoder 145, the subtitle synthesizing unit 146, the subtitle color gamut conversion unit 147, the data decoder 151, the cache unit 152, the application control unit 153, the browser unit 154, the application color gamut conversion unit 155, the sound source unit 156, and the like in the broadcast receiving apparatus 100 of the first embodiment. The MMT decode processing unit 841 is capable of performing the various processes described in the first embodiment. The details of the various processes have been described in the first embodiment, and further descriptions thereof will be omitted.

The MPEG2-TS decode processing unit 842 receives the MPEG2-TS data string output from the second tuner/demodulating unit 832, and performs processes of separating and decoding a video data string, an audio data string, a caption data string, a subtitle data string, and the like, which are real-time presentation elements, based on a control signal included in the MPEG2-TS data string. The MPEG2-TS decode processing unit 842 has the function equivalent to that of an IRD (Integrated Reviver Decoder) of a conventional television receiver that receives broadcast waves of a broadcasting service adopting the MPEG2-TS method as the media transport method, and detailed descriptions thereof will be omitted.

The video synthesizing unit 861 receives video information, subtitle information, and application information output from the MMT decode processing unit 841 and video information, subtitle information, and application information output from the MPEG2-TS decode processing unit 842, and properly performs a selection process and/or a superposition process. The video synthesizing unit 861 has a video RAM (not shown), and the monitor unit 862 and others are driven based on video information and others inputted to the video RAM. In addition, the video synthesizing unit 861 performs a scaling process, a superposing process of EPG screen information, and others under the control by the main control unit 801 when necessary. The audio synthesizing unit 864 receives audio information output from the MMT decode processing unit 841 and audio information output from the MPEG2-TS decode processing unit 842, and properly performs a selection process and/or a mixing process.

The LAN communication unit 821 is connected to the Internet 200 via the router device 200r, and transmits and receives data to and from server devices and other communication equipment on the Internet 200. Further, the LAN communication unit 821 acquires an MMT data string (or part of it) and an MPEG2-TS data string (or part of it) of a program transmitted through the communication line, and properly outputs them to the MMT decode processing unit 841 and the MPEG2-TS decode processing unit.

[Time Display in Broadcast Receiving Apparatus]

The broadcast receiving apparatus 800 of the present embodiment can display the current date and current time on the EPG screen and other various setting screens. Information related to the current date and current time is transmitted by an MH-TOT or the like in the case of a broadcasting service adopting the MMT method as the media transport method, and the information is transmitted by TOT (Time Offset Table) or the like provided in SI (Service Information) defined in the MPEG-2 system in the case of a broadcasting service adopting the MPEG2-TS method as the media transport method. The broadcast receiving apparatus 800 can acquire the information related to the current date and current time by referring to the MH-TOT and the TOT.

In general, when the video synthesizing unit 861 mainly selects video information and others output from the MMT decode processing unit 841, the video synthesizing unit 861 superposes the information related to the current date and current time acquired from the MH-TOT on the video information and others, and when the video synthesizing unit 861 mainly selects video information and others output from the MPEG2-TS decode processing unit 842, the video synthesizing unit 861 superposes the information related to the current date and current time acquired from the TOT on the video information and others.

However, since the broadcasting service adopting the MMT method as the media transport method is different from the broadcasting service adopting the MPEG2-TS method as the media transport method in coding/decoding processes, transmission paths, and the like, there is a possibility that inconsistency occurs in current time display between the case of selecting the broadcasting service adopting the MMT method as the media transport method and the case of selecting the broadcasting service adopting the MPEG2-TS method as the media transport method. For example, when an EPG screen 162g displaying channel information of the broadcasting service adopting the MMT method as the media transport method is switched to an EPG screen 162h displaying channel information of the broadcasting service adopting the MPEG2-TS method as the media transport method as shown in FIG. 25, the inconsistency caused when the display of current time is switched from a current time display 162g1 to a current time display 162h1 may give the user a feeling of visual discomfort.

In order to prevent the user from having such a feeling of visual discomfort, the broadcast receiving apparatus 800 of the present embodiment performs control to superpose the information related to the current date and current time acquired from the TOT on the video information and others even when the video synthesizing unit 861 mainly selects the video information and others output from the MMT decode processing unit 841. Namely, the broadcast receiving apparatus 800 of the present embodiment performs control to superpose current time information provided by the broadcasting service adopting the MPEG2-TS method as the media transport method, on the contents of the broadcasting service adopting the MMT method as the media transport method.

Through the control described above, the broadcast receiving apparatus 800 of the present embodiment always displays the current time information that is acquired by referring to the TOT. Thus, even when the broadcasting service adopting the MMT method as the media transport method and the broadcasting service adopting the MPEG2-TS method as the media transport method are switched to each other, it is possible to prevent the user from having such a feeling of visual discomfort due to inconsistency in the display of current time.

Figures 26A, 26B:
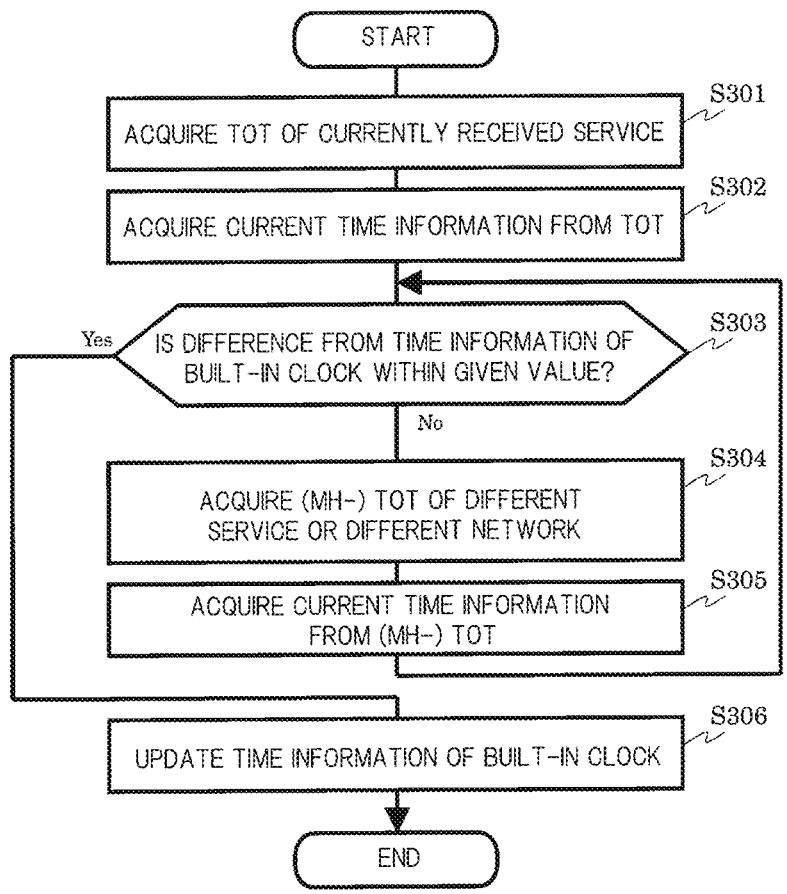
FIG. 26A is an explanatory diagram of an operation of selection control of a reference source of current time information according to the second embodiment.
FIG. 26B is an operation sequence diagram of an updating process of current time information according to the second embodiment.

FIG. 26A shows one example of selection control of a reference source of current time information in accordance with the reception state of broadcasting services in the broadcast receiving apparatus 800 of the present embodiment. The broadcast receiving apparatus 800 of the present embodiment always refers to the TOT to acquire current time information when the broadcast receiving apparatus 800 is in a condition in which it can receive the broadcasting service adopting the MPEG2-TS method as the media transport method, and refers to the MH-TOT to acquire current time information only when the broadcast receiving apparatus 800 is in a condition in which it cannot receive the broadcasting service adopting the MPEG2-TS method as the media transport method but can receive the broadcasting service adopting the MMT method as the media transport method.

In addition, the above-mentioned effect can be achieved also by performing control to superpose current time information provided by the broadcasting service adopting the MMT method as the media transport method on contents of the broadcasting service adopting the MPEG2-TS method as the media transport method contrary to the above control.

In both of the case of control in which current time information provided by the broadcasting service adopting the MPEG2-TS method as the media transport method is superposed on contents of the broadcasting service adopting the MMT method as the media transport method and the case of control in which current time information provided by the broadcasting service adopting the MMT method as the media transport method is superposed on contents of the broadcasting service adopting the MPEG2-TS method as the media transport method, the current time information can be corrected by referring to the "delta" parameter of the time information in the TMCC extension information region as described above in [Time Management of Broadcast Receiving Apparatus] of the first embodiment.

Further, in both cases of the broadcasting service in which the MMT method is adopted as the media transport method and the broadcasting service in which the MPEG2-TS method is adopted as the media transport method, there is a possibility that the MH-TOT or TOT transmitted by respective broadcasting services making up the network has an error due to the fault of the transmission system or the transmission failure. As the measures for the error of the MH-TOT or TOT described above, the broadcast receiving apparatus 800 of the present embodiment has a function of performing an updating process of time information of a built-in clock by acquiring an MH-TOT or TOT from a different broadcasting service in the same network or an arbitrary broadcasting service in another network and referring to current time information of the acquired MH-TOT or TOT when it is determined that the MH-TOT or TOT acquired from the service being received at present has an error.

FIG. 26B shows one example of an updating process of current time information in the case where the broadcasting service adopting the MPEG2-TS method as the media transport method is received in the broadcast receiving apparatus 800 of the present embodiment. Note that the process similar to that shown in FIG. 26B is possible even when the broadcasting service adopting the MMT method as the media transport method is received.

When the time information of the built-in clock is updated in the broadcast receiving apparatus 800 of the present embodiment, first, the receiving function executing unit 1102 acquires the TOT from the MPEG2-TS data string of the currently received broadcasting service (broadcasting serving adopting the MPEG2-TS method as the media transport method) (S301), and then acquires the current time information by referring to the acquired TOT (S302). Next, the receiving function executing unit 1102 performs the process of comparing the current time information acquired in the process of S302 and the time information of the built-in clock.

When the difference between the current time information acquired in the process of S302 and the time information of the built-in clock is within a given value (e.g., within 3 minutes) as a result of the comparison process (S303: Yes), the receiving function executing unit 1102 updates the time information of the built-in clock based on the current time information acquired in the process of S302 (S306). On the other hand, when the difference between the current time information acquired in the process of S302 and the time information of the built-in clock is not within the given value as a result of the comparison process (S303: No) or the TOT acquired in S301 has a flag or the like indicating that an error is present in the data, the receiving function executing unit 1102 acquires TOT from an MPEG2-TS data string of a different broadcasting service in the same network or acquires an MH-TOT from an MMT data string of an arbitrary broadcasting service (broadcasting serving adopting the MMT method as the media transport method) in another network (S304), and further acquires current time information from the acquired TOT or MH-TOT (S305). The receiving function executing unit 1102 can perform the comparison process of S303 again based on the current time information acquired in the process of S305.

Through the process described above, the broadcast receiving apparatus 800 of the present embodiment can perform the updating process of the time information of the built-in clock by acquiring an MH-TOT or TOT from a different broadcasting service in the same network or an arbitrary broadcasting service in another network and referring to current time information of the acquired MH-TOT or TOT when it is determined that the MH-TOT or TOT acquired from the service being received at present has an error.

When the current time information whose difference from the time information of the built-in clock falls within a given range cannot be acquired even by the repetition of S304 and S305 like in the initial setting after the product shipment, the time information of the built-in clock may be set newly based on the current time information acquired in the process of S302. In this manner, it is possible to deal with the case where the time information of the built-in clock of the broadcast receiving apparatus 800 of the present embodiment has an error.

[Display of EPG in Broadcast Receiving Apparatus]

Event schedule information of the broadcasting service adopting the MMT method as the media transport method is transmitted by MH-EIT or the like. On the other hand, event schedule information of the broadcasting service adopting the MPEG2-TS method as the media transport method is transmitted by EIT (Event Information Table) or the like included in SI defined in the MPEG-2 system. Therefore, in general, when video information or the like provided by the broadcasting service adopting the MMT method as the media transport method is displayed, the event schedule information (MH-EIT) of the broadcasting service adopting the MMT method can be acquired, and when video information or the like provided by the broadcasting service adopting the MPEG2-TS method as the media transport method is displayed, the event schedule information (EIT) of the broadcasting service adopting the MPEG2-TS method can be acquired.

However, the broadcast receiving apparatus 800 of the present embodiment can acquire both MH-EIT and EIT when displaying video information or the like provided by the broadcasting service adopting the MMT method as the media transport method as well as when displaying video information or the like provided by the broadcasting service adopting the MPEG2-TS method as the media transport method, and thus the user friendliness can be improved.

Figure 27A:
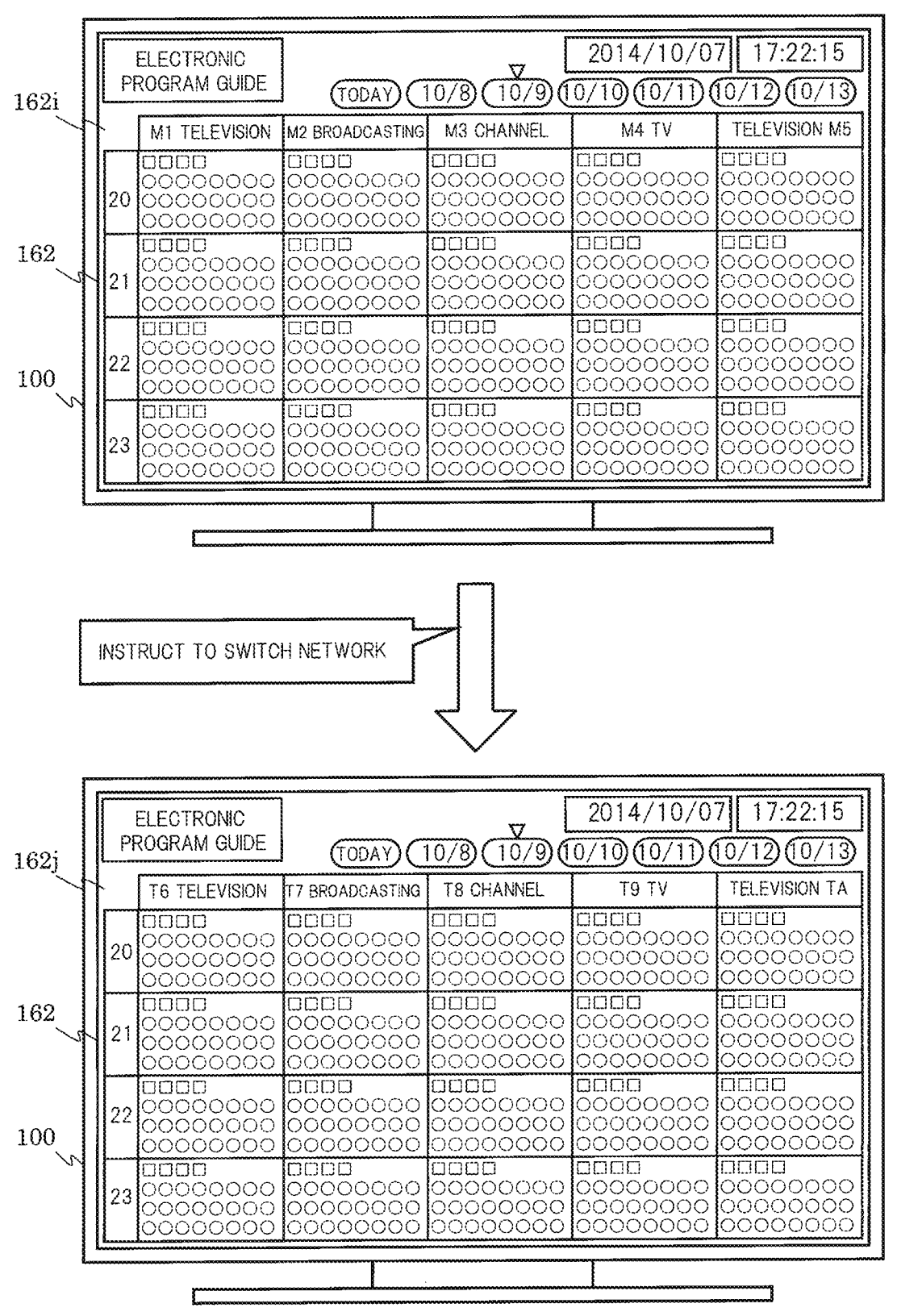

FIG. 27A shows one example of the EPG screen in the broadcast receiving apparatus 800 of the present embodiment. In FIG. 27A, an EPG screen 162*i* is an EPG screen that is created based on the MH-EIT of the broadcasting service adopting the MMT method as the media transport method, and "M1 television", "M2 broadcasting", "M3 channel", "M4 TV", "television M5" and the like are the names of broadcast stations that provide the broadcasting service adopting the MMT method as the media transport method. Further, an EPG screen 162*j* is an EPG screen that is created based on the EIT of the broadcasting service adopting the MPEG2-TS method as the media transport method, and "T6 television", "T7 broadcasting", "T8 channel", "T9 TV", "television TA" and others are the names of broadcast stations that provide the broadcasting service adopting the MPEG2-TS method as the media transport method.

For example, when the user who is watching a broadcasting program provided by the broadcasting service adopting the MMT method as the media transport method gives an instruction to display the EPG screen by operating the remote controller (not shown in the drawings), an initial EPG screen (not shown) appears. The initial EPG screen is an EPG screen that is created based on the MH-EIT of the broadcasting service adopting the MMT method as the media transport method, and shows detailed information of broadcasting programs of respective channels in a time zone of "from 17:00 (around current time)" on "Oct. 7, 2014 (today)". Then, if the user wishes to check detailed information of broadcasting programs of respective channels in a time zone of "from 20:00" on "Oct. 9, 2014" and gives an instruction to update the EPG screen by operating the remote controller (not shown in the drawings), the EPG screen 162i appears.

Subsequently, if the user wishes to check detailed information of broadcasting programs provided by the broadcasting service adopting the MPEG2-TS method as the media transport method and gives a network switching instruction by operating the remote controller (not shown), the EPG screen 162j appears. At this time, the broadcast receiving apparatus 800 of the present embodiment controls the screen to display detailed information of broadcasting programs of the respective channels in the same time zone on the same date (i.e., "from 20:00" on "Oct. 9, 2014") as those of the EPG screen 162i displayed just before the network switching, instead of the initial EPG screen that is created based on the EIT of the broadcasting service adopting the MPEG2-TS method as the media transport method (i.e., detailed information of broadcasting programs of the respective channels in the time zone of "from 17:00" on "Oct. 7, 2014").

Through the control described above, the user can consecutively check detailed information of broadcasting programs provided in the same time zone on the same date by a plurality of networks with different media transport methods by a simple operation. Namely, the user friendliness of the broadcast receiving apparatus 800 can be improved.

Figure 27B:
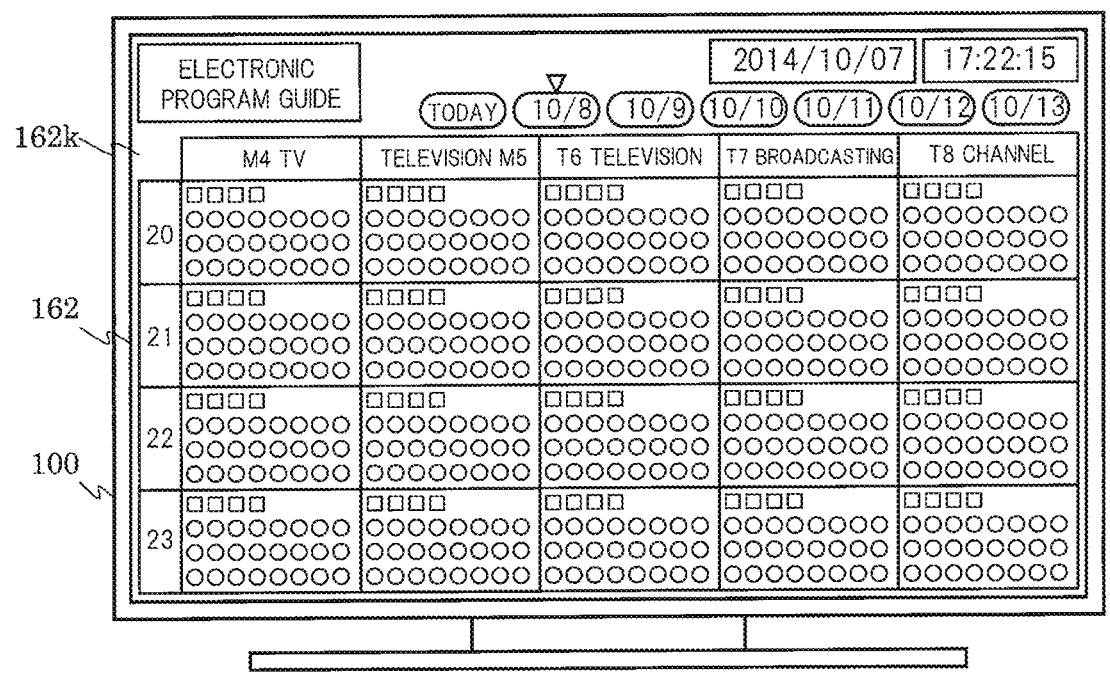
FIG. 27B is a screen display diagram of an EPG screen of the broadcast receiving apparatus according to the second embodiment.

FIG. 27B is a diagram showing an example of the EPG screen in the broadcast receiving apparatus 800 of the present embodiment that is different from the example mentioned above. An EPG screen 162k shows a state obtained by scrolling the EPG screen 162i of FIG. 27A in the direction of arrangement of the channels (horizontal direction) by the operation of the remote controller (not shown). Namely, in the example of FIG. 27B, by scrolling the EPG screen in the direction of arrangement of the channels (horizontal direction), the channel information that is created based on the MH-EIT of the broadcasting service adopting the MMT method as the media transport method and the channel information that is created based on the EIT of the broadcasting service adopting the MPEG2-TS method as the media transport method are displayed on the same time axis in a seamless manner.

Accordingly, even when the user wishes to check the channel information that is created based on the EIT of the broadcasting service adopting the MPEG2-TS method as the media transport method while checking the channel information that is created based on the MH-EIT of the broadcasting service adopting the MMT method as the media transport method, the user does not need to give a network switching instruction or the like by the operation of the remote controller (not shown). In addition, the user is allowed to collectively check detailed information of broadcasting programs provided in the same time zone on the same date by a plurality of networks with different media transport methods. Namely, the user friendliness of the broadcast receiving apparatus 800 can be improved.

Third Embodiment

A third embodiment according to the present invention will be described below. Constituent elements, processes, effects and the like of the present embodiment are the similar to those of the first embodiment unless otherwise specified. For this reason, in the following description, differences between the present embodiment and the first embodiment will be mainly described, and description of the matters common to both embodiments will be omitted as much as possible in order to avoid redundant description.

A broadcast receiving apparatus 100 according to the third embodiment of the present invention has a similar hardware configuration to that of the broadcast receiving apparatus 100 according to the first embodiment, and executes a control to realize a different copyright protecting function. Note that in the present embodiment, a content protection control for video of contents will be described. A similar control to one that will be explained below may be carried out for audio, or a different content protection control may be carried out for audio.

FIG. 28 is a view in which processes for a copyright protecting function in the broadcast receiving apparatus 100 according to the third embodiment are arranged. The broadcast receiving apparatus 100 according to the third embodiment switches copyright protecting processes for contents before or after an accumulating process for the contents depending upon whether received contents are contents with over 2K (that is, contents with the number of pixels that exceeds the number of pixels of 1920×1080), such as contents with 4K (the number of pixels of 3840×2160) or contents with 8K (the number of pixels of 7680×4320), or contents with 2K or less (that is, contents with the number of pixels that is 1920×1080 or less).

Specifically, as shown in FIG. 28, the broadcast receiving apparatus 100 executes a control to switch content protecting processes based on a parameter (for example, the "digital_recording_control_data" parameter) contained in the contents copy control descriptor that has been explained with reference to FIG. 22A and FIG. 22B and a parameter (for example, the "encryption_mode" parameter) contained in the contents usage control descriptor that has been explained with reference to FIG. 23 in accordance with the number of pixels of the received contents or the number of pixels after pixel number conversion in a case where the pixel number conversion is to be executed. Further, the broadcast receiving apparatus 100 according to the third embodiment of the present invention substantially invalidates the "image_constraint_token" parameter in the contents usage control descriptor shown in FIG. 23. Namely, even though any value is inputted into the "image_constraint_token" parameter, the broadcast receiving apparatus 100 according to the third embodiment may determine that limitation of resolution of a video signal output is not executed. Namely, an idea of copyright protection in the broadcast receiving apparatus 100 according to the third embodiment is that resolution of the video signal output is not limited against a user in accordance with the "image_constraint_token" parameter, and appropriate content protection is subjected to the contents in accordance with a state of the number of pixels before or after the accumulating process for the contents on the basis of the table shown in FIG. 28.

In the table shown in FIG. 28, the processes are described by dividing them into accumulation preprocessing and accumulation postprocessing on the basis of the accumulating process that is a process to record (or store) the received contents in the storage unit 110 shown in FIG. 8A or the like so that the received contents cannot be reproduced in an apparatus other than the broadcast receiving apparatus 100. The accumulation preprocessing may be executed before the accumulating process. The accumulation postprocessing is to be executed after the accumulating process. The accumulation preprocessing will first be described. Note that in the present embodiment, it is no need that the accumulating process for the contents is then executed even when expression of "before accumulation" for contents is used. This expression incudes both a meaning of "a state before accumulation in a case where contents is then to be accumulated actually" and a meaning of "without executing accumulation for contents".

[Contents at Time of Reception]

The broadcast receiving apparatus 100 according to the third embodiment receives contents with an MMT transmission method. Therefore, in the examples shown in FIG. 28, a transmission method is the MMT transmission method in all cases. Here, contents at the time of reception of the contents may be contents with over 2K (that is, contents with the number of pixels that exceeds the number of pixels of 1920×1080), such as contents with 4K (the number of pixels of 3840×2160) or contents with 8K (the number of pixels of 7680×4320), or may be contents with 2K or less (that is, contents with the number of pixels of 1920×1080 or less).

The broadcast receiving apparatus 100 may use data to be transmitted with the MMT method in order to determine whether the received contents are contents with over 2K or contents with 2K or less. Specifically, the broadcast receiving apparatus 100 may use information on the number of pixels of contents, which is contained in a header of a video coded stream (for example, an H.265/HEVC coded stream), or may use information on the number of pixels, which is stored in "video resolution" contained in the video component descriptor shown in FIG. 19A that has been explained in the first embodiment. The broadcast receiving apparatus 100 may execute such determination by using any data to be transmitted with the MMT method.

[Pixel Number Converting Process for Contents Before Accumulation After Reception of Contents]

The broadcast receiving apparatus 100 according to the third embodiment includes a pixel number converting unit (not shown in the drawings), which executes pixel number conversion for video, either before or after the video synthesizing unit shown in FIG. 8A. the broadcast receiving apparatus 100 is allowed to execute a pixel number converting process for decoded video of the received contents. As shown in the table of FIG. 28, there are a case where pixel number conversion is not executed for received contents with over 2K (that is, contents with the number of pixels that exceeds the number of pixels of 1920×1080), a case where pixel number conversion is executed to convert the received contents into other contents with over 2K, and a case where pixel number conversion is executed to convert the received contents into contents with 2K or less (that is, contents with the number of pixels that is 1920×1080 or less). Further, as shown in the table of FIG. 28, there are a case where pixel number conversion is not executed for the received contents with 2K or less (that is, contents with the number of pixels that is 1920×1080 or less) and a case where pixel number conversion is executed to convert the received contents into other contents with 2K or less (that is, contents with the number of pixels that is 1920×1080 or less).

[Outputting Process for Contents Before Accumulation to External Equipment After Reception of Contents]

In a case where the broadcast receiving apparatus 100 according to the third embodiment outputs contents before accumulation to external equipment after reception of the contents, the broadcast receiving apparatus 100 switches protecting processes for the contents in accordance with a state of the number of pixels of the contents. Specifically, the broadcast receiving apparatus 100 changes the content protecting processes in accordance with whether the number of pixels of the contents when the contents before accumulation are outputted to the external equipment after reception of the contents is the number of pixels that exceeds the number of pixels of 1920×1080 or the number of pixels of 1920×1080 or less. Here, the term "change content protecting processes" means that interpretation of a parameter (for example, the "digital_recording_control_data" parameter) contained in the contents copy control descriptor that has been explained with reference to FIG. 22A and FIG. 22B or a parameter (for example, the "encryption_mode" parameter) contained in the contents usage control descriptor that has been explained with reference to FIG. 23 is changed and content protecting processes for these parameters are switched.

Hereinafter, a concrete example of an outputting process of contents before accumulation to external equipment after reception of the contents shown in FIG. 28 will be described. The outputting process to the external equipment may be applied to a video outputting process when video decoded by the video decoder 141 shown in FIG. 8A or video obtained by converting the decoded video by the pixel number converting unit is outputted from the video output unit 163 to external equipment. As another example, the video output may be executed via an IP interface including the LAN communication unit 121 shown in FIG. 8A as hardware.

(1-1) A case where contents are outputted to external equipment without executing pixel number conversion for contents with over 2K (that is, contents with the number of pixels that exceeds the number of pixels of 1920×1080) at the time of reception thereof, or a case where contents are outputted to external equipment after pixel number conversion for the contents is executed and the contents are converted into contents with over 2K (that is, contents with the number of pixels that exceeds the number of pixels of 1920×1080) having the number of pixels other than that of the contents In this case, a value of the "encryption_mode" parameter of the contents usage control descriptor is not considered in output protection of the contents. In a case where the "digital_recording_control_data" parameter of the contents copy control descriptor is 00, content protection by HDCP is not executed, and contents are outputted. In a case where the "digital_recording_control_data" parameter of the contents copy control descriptor is 10, a high level of content protection after HDCP Revision 2.2 is applied to the contents, and the contents are then outputted. In a case where the "digital_recording_control_data" parameter of the contents copy control descriptor is 01, output itself is prohibited. In a case where the "digital_recording_control_data" parameter of the contents copy control descriptor is 11, a high level of content protection after HDCP Revision 2.2 is applied to the contents, and the contents are then outputted. In a case where the contents copy control descriptor of the received contents is not contained in the receive data for some reason or other, the contents are outputted without executing content protection by HDCP.

Hereinafter, the content protecting process in which interpretation of the "digital_recording_control_data" parameter contained in the contents copy control descriptor and the "encryption_mode" parameter contained in the contents usage control descriptor is executed as described above at the time when the contents before accumulation are outputted to external equipment will be called as "protecting process for contents with over 2K" when the contents before accumulation are outputted to external equipment.

(1-2) A case where contents are outputted to external equipment after pixel number conversion for contents with over 2K (that is, contents with the number of pixels that exceeds the number of pixels of 1920×1080) is executed at the time of reception thereof and the contents are converted into contents with 2K or less (that is, contents with the number of pixels that is 1920×1080 or less)

In a case where the "digital_recording_control_data" parameter of the contents copy control descriptor is 00 or in a case where the contents copy control descriptor of the received contents is not contained in the receive data for some reason or other, whether content protection at the time of output thereof is executed or not is switched in accordance with a value of the "encryption_mode" parameter of the contents usage control descriptor. At this time, in a case where the value of the "encryption_mode" parameter of the contents usage control descriptor is 1 and no content protection is specified, the contents can be outputted without executing the protection by HDCP. In a case where the value of the "encryption_mode" parameter of the contents usage control descriptor is 0 and content protection is specified, protection by HDCP Revision 1 or after Revision 2 is executed, and the contents are then outputted.

Further, in a case where the "digital_recording_control_data" parameter of the contents copy control descriptor is 10, protection by HDCP Revision 1 or after Revision 2 is executed regardless of the value of the "encryption_mode" parameter of the contents usage control descriptor, and the contents are then outputted. In a case where the "digital_recording_control_data" parameter of the contents copy control descriptor is 01, output itself is prohibited regardless of the value of the "encryption_mode" parameter of the contents usage control descriptor. In a case where the "digital_recording_control_data" parameter of the contents copy control descriptor is 11, protection by HDCP Revision 1 or after Revision 2 is executed regardless of the value of the "encryption_mode" parameter of the contents usage control descriptor, and the contents are then outputted. In a case where the contents copy control descriptor of the received contents is not contained in the receive data for some reason or other, the contents are outputted without executing content protection by HDCP.

Hereinafter, the content protecting process, in which interpretation of the "digital_recording_control_data" parameter contained in the contents copy control descriptor and the "encryption_mode" parameter contained in the contents usage control descriptor is executed as described above at the time when the contents before accumulation are outputted to external equipment, will be called as "protecting process for contents with 2K or less" when the contents before accumulation are outputted to external equipment.

(1-3) A case where contents are outputted to external equipment without executing pixel number conversion for contents with 2K or less (that is, contents with the number of pixels that is 1920×1080 or less) at the time of reception thereof, or a case where contents are outputted to external equipment after pixel number conversion for the contents is executed and the contents are converted into other contents with 2K or less (that is, contents with the number of pixels that is 1920×1080 or less) In this case, the "protecting process for contents with 2K or less" at the time when the contents before accumulation are outputted to external equipment, which has been explained in (1-2), is executed.

As explained in (1-1), (1-2), and (1-3) described above, at the time when the contents before accumulation are outputted to external equipment, interpretation of the "digital_recording_control_data" parameter contained in the contents copy control descriptor and the "encryption_mode" parameter contained in the contents usage control descriptor is switched in accordance with the number of pixels of the contents when the contents before accumulation are outputted to external equipment. In a case where contents with over 2K (that is, contents with the number of pixels that exceeds the number of pixels of 1920×1080), which are subjected to copy limitation, are outputted to external equipment in such a state, higher-level content protection is applied to the contents and the contents are outputted compared with a case where contents with 2K or less (that is, contents with the number of pixels that is 1920×1080 or less), which are subjected to copy limitation, are outputted to external equipment in such a state. This makes it possible to protect contents with over 2K (that is, contents with the number of pixels that exceeds the number of pixels of 1920×1080), which have a higher added value, even in external equipment appropriately.

[Content Protecting Process at Time of Accumulation of Contents]

It has already been explained that the broadcast receiving apparatus 100 according to the third embodiment switches the protecting processes for the contents in accordance with the state of the number of pixels of the contents in the outputting process of the contents before accumulation to external equipment after reception of the contents. This is because a reproducing apparatus that reproduces contents at an output destination is the external equipment and a compliant level (or a compatible level) of a content protecting process may differ depending upon a type of equipment.

On the other hand, in a case where contents are accumulated by a content accumulating function by which only the broadcast receiving apparatus 100 that received and recorded contents can reproduce the contents, there is no need to change processes in accordance with a state of the number of pixels of the contents. This is because the contents are just contents managed by the broadcast receiving apparatus 100 itself, and thus, there is no need to consider a plurality of compliant levels for the content protecting process. Therefore, in a case where contents are to be accumulated by the content accumulating function by which only the broadcast receiving apparatus 100 that received and recorded the contents can reproduce the contents in order to simplify management in the broadcast receiving apparatus 100, it is desirable that a common accumulation protecting process is executed even though the contents are contents with over 2K (that is, contents with the number of pixels that exceeds the number of pixels of 1920×1080) at the time of accumulation or contents with 2K or less (that is, contents with the number of pixels that is 1920×1080 or less). Note that a content accumulating process may be executed for the storage unit 110 (FIG. 8A), which is a recording medium built in the broadcast receiving apparatus 100 according to the third embodiment, for example. However, in a case where a local encrypting process peculiar to the broadcast receiving apparatus 100 is executed and management in which only the broadcast receiving apparatus 100 can reproduce the contents is executed, the contents may be accumulated in a recording medium such as an external hard disk.

In a content accumulating process shown in FIG. 28, a common accumulation protecting process described below is executed in any case of: contents in which pixel number conversion is not executed for contents with over 2K (that is, contents with the number of pixels that exceeds the number of pixels of 1920×1080) at the time of reception; contents in which pixel number conversion is executed for contents with over 2K (that is, contents with the number of pixels that exceeds the number of pixels of 1920×1080) at the time of reception and the number of pixels of the contents is converted into the other number of pixels of contents with over 2K (that is, contents with the number of pixels that exceeds the number of pixels of 1920×1080); contents in which pixel number conversion is executed for contents with over 2K (that is, contents with the number of pixels that exceeds the number of pixels of 1920×1080) at the time of reception and the contents are converted into contents with 2K or less (that is, contents with the number of pixels that is 1920×1080 or less); contents in which pixel number conversion is not executed for contents with 2K or less (that is, contents with the number of pixels that is 1920×1080 or less) at the time of reception; and contents in which pixel number conversion is executed for contents with 2K or less (that is, contents with the number of pixels that is 1920×1080 or less) at the time of reception and the contents are converted into other contents with 2K or less (that is, contents with the number of pixels that is 1920×1080 or less).

Here, the "common accumulation protecting process" means that an interpreting process for the "digital_recording_control_data" parameter contained in the contents copy control descriptor, the "encryption_mode" parameter contained in the contents usage control descriptor, and the other parameters, is common between contents with over 2K (that is, contents with the number of pixels that exceeds the number of pixels of 1920×1080) and contents with 2K or less (that is, contents with the number of pixels that is 1920×1080 or less) at the time of accumulation.

Hereinafter, concrete examples of the "common accumulation protecting process" in the content accumulating process shown in FIG. 28 will be described.

First, in a case where a value of the "digital_recording_control_data" parameter contained in the contents copy control descriptor is 00 and the contents are set as "copy free (copiable without any constraint condition)", the contents can be accumulated without limiting copy thereof. Copy control information on the recording medium at the time of accumulation when contents to be accumulated on the recording medium are managed may be accumulated as "copy free". Note that the copy control information on the recording medium, which is used for copy control of the accumulated contents, may be generated and managed separately from the value of the "digital_recording_control_data" parameter contained in the contents copy control descriptor, and there is no need to rewrite the value of the "digital_recording_control_data" parameter contained in the contents copy control descriptor.

In this case, a value of the "encryption_mode" parameter contained in the contents usage control descriptor is considered. In a case where this value is 1 and protection of contents is specified, a local encrypting process peculiar to the broadcast receiving apparatus 100 is applied to the contents when an accumulating process is executed, and the contents are then accumulated so that only the broadcast receiving apparatus 100 can reproduce the contents. In a case where the value of the "encryption_mode" parameter contained in the contents usage control descriptor is 0 and protection of the contents is not specified, the local encrypting process may not be executed (however, in this case, the local encrypting process may be applied thereto). The content protecting processes are not changed in accordance with the number of pixels of the contents before output to external equipment, copy to external equipment, or move to external equipment (will be described later) is executed while the contents are accumulated as "copy free", and a common content protecting process is executed. This makes it possible to simplify management in the broadcast receiving apparatus 100.

In a case where the value of the "digital_recording_control_data" parameter contained in the contents copy control descriptor is 10 and a value of the "copy_restriction_mode" parameter (see FIG. 23) contained in the contents usage control descriptor is 1, the contents are interpreted as contents for "copiable only for one generation", and in the accumulating process, the copy control information on the recording medium at the time of accumulation when the contents to be accumulated on the recording medium are managed is accumulated as "recopy prohibition (no more copies)". Note that the copy control information on the recording medium, which is used for the copy control of the accumulated contents, may be generated and managed separately from the value of the "digital_recording_control_data" parameter contained in the contents copy control descriptor, and there is no need to rewrite the value of the "digital_recording_control_data" parameter contained in the contents copy control descriptor. Note that when the accumulating process is executed as "recopy prohibition", the local encrypting process peculiar to the broadcast receiving apparatus 100 is applied to the contents, and the contents are then accumulated so that only the broadcast receiving apparatus 100 can reproduce the contents. A copying process for the contents for which the accumulating process is executed as "recopy prohibition" is prohibited. The content protecting processes are not changed in accordance with the number of pixels of the contents before output to external equipment, or move to external equipment (will be described later) as "recopy prohibition" is executed while the contents are accumulated as "recopy prohibition", and the common content protecting process is executed. This makes it possible to simplify management in the broadcast receiving apparatus 100.

In a case where the value of the "digital_recording_control_data" parameter contained in the contents copy control descriptor is 10 and the value of the "copy_restriction_mode" parameter contained in the contents usage control descriptor is 0, the contents are interpreted as contents for "copiable for restricted number", and in the accumulating process, the copy control information on the recording medium at the time of accumulation when the contents to be accumulated on the recording medium are managed can be accumulated as "copiable for restricted number". Note that the copy control information on the recording medium, which is used for the copy control of the accumulated contents, may be generated and managed separately from the value of the "digital_recording_control_data" parameter contained in the contents copy control descriptor, and there is no need to rewrite the value of the "digital_recording_control_data" parameter contained in the contents copy control descriptor. Note that when the accumulating process is executed as "copiable for restricted number", the local encrypting process peculiar to the broadcast receiving apparatus 100 is applied to the contents, and the contents are then accumulated so that only the broadcast receiving apparatus 100 can reproduce the contents. The content protecting processes are not changed in accordance with the number of pixels of the contents before output to external equipment, copy to external equipment, or move to external equipment (will be described later) as "copiable for restricted number" is executed while the contents are accumulated as "recopy prohibition", and the common content protecting process is executed. This makes it possible to simplify management in the broadcast receiving apparatus 100.

In a case where the value of the "digital_recording_control_data" parameter contained in the contents copy control descriptor is 11, the contents are interpreted as contents of "copy prohibition (copy never)". In this case, in a case where the broadcast receiving apparatus 100 is compliant with a "temporary accumulation" function, temporary accumulation can be executed. However, in a case where the broadcast receiving apparatus 100 is not compliant with the "temporary accumulation" function, accumulation is prohibited, and the accumulating process is thus not executed. In a case where the broadcast receiving apparatus 100 is compliant with the "temporary accumulation" function, in the accumulating process, the copy control information on the recording medium at the time of accumulation when the contents to be accumulated on the recording medium are managed is accumulated as "temporary accumulation", and contents having a fixed time (for example, 90 minutes) can be accumulated. In this case, accumulation time is managed in minutes, and the accumulated contents have to become reproduction disablement before exceeding the fixed time described above+one minute from the time of reception (=at the time of start of accumulation). As concrete examples of the reproduction disablement of the contents, there are a method of deleting contents themselves, a method of deleting an encryption key and the like, whereby reproduction of the contents may become impossible. With respect to contents for which the accumulating process is executed as "temporary accumulation", a copying process or a moving process is prohibited. The content protecting processes are not changed in accordance with the number of pixels of the contents before output to external equipment (will be described later) as "recopy prohibition" is executed while the contents are accumulated as "recopy prohibition", and the common content protecting process is executed. This makes it possible to simplify management in the broadcast receiving apparatus 100.

As explained above, at the time of accumulation of contents, interpretation of the "digital_recording_control_data" parameter contained in the contents copy control descriptor and the "encryption_mode" parameter contained in the contents usage control descriptor is not switched in accordance with the number of pixels of the contents at the time of accumulation, the content protecting process is commonalized. This makes it possible to simplify management in the broadcast receiving apparatus 100.

[Pixel Number Converting Process After Accumulation of Contents]

The broadcast receiving apparatus 100 according to the third embodiment includes a pixel number converting unit (not shown in the drawings), which executes pixel number conversion for video, either before or after the video synthesizing unit shown in FIG. 8A. Contents after accumulation are reproduced from the storage unit 110 shown in FIG. 8A, the video data are decoded by the video decoder 141, and the pixel number converting unit (not shown in the drawings) executes pixel number conversion for the video, whereby a pixel number converting process for the decoded video of the contents accumulated in the storage unit 110 can be executed.

As shown in the table of FIG. 28, the pixel number conversion is not executed for the received contents with over 2K (that is, contents with the number of pixels that exceeds the number of pixels of 1920×1080), but the pixel number conversion is executed for the accumulated contents with over 2K (that is, contents with the number of pixels that exceeds the number of pixels of 1920×1080) or the received contents with over 2K (that is, contents with the number of pixels that exceeds the number of pixels of 1920×1080) to convert the contents into other contents with over 2K (that is, contents with the number of pixels that exceeds the number of pixels of 1920×1080) and accumulate the contents. The pixel number conversion may not be executed for the accumulated contents with over 2K (that is, contents with the number of pixels that exceeds the number of pixels of 1920×1080) at the time of output, movement, or copy after accumulation. In this case, target contents for output, movement, or copy are contents with over 2K (that is, contents with the number of pixels that exceeds the number of pixels of 1920×1080).

Further, the pixel number conversion is not executed for the received contents with over 2K (that is, contents with the number of pixels that exceeds the number of pixels of 1920×1080), but the pixel number conversion is executed for the accumulated contents with over 2K (that is, contents with the number of pixels that exceeds the number of pixels of 1920×1080) or the received contents with over 2K (that is, contents with the number of pixels that exceeds the number of pixels of 1920×1080) to convert the contents into other contents with over 2K (that is, contents with the number of pixels that exceeds the number of pixels of 1920×1080) and accumulate the contents. The pixel number conversion may be executed for the accumulated contents with over 2K (that is, contents with the number of pixels that exceeds the number of pixels of 1920×1080) at the time of output, movement, or copy after accumulation to convert the contents into the other contents with over 2K. In this case, target contents for output, movement, or copy are contents with over 2K (that is, contents with the number of pixels that exceeds the number of pixels of 1920×1080).

Further, the pixel number conversion is not executed for the received contents with over 2K (that is, contents with the number of pixels that exceeds the number of pixels of 1920×1080), but the pixel number conversion is executed for the accumulated contents with over 2K (that is, contents with the number of pixels that exceeds the number of pixels of 1920×1080) or the received contents with over 2K (that is, contents with the number of pixels that exceeds the number of pixels of 1920×1080) to convert the contents into other contents with over 2K (that is, contents with the number of pixels that exceeds the number of pixels of 1920×1080) and accumulate the contents. The pixel number conversion may be executed for the accumulated contents with over 2K (that is, contents with the number of pixels that exceeds the number of pixels of 1920×1080) at the time of output, movement, or copy after accumulation to convert the contents into contents with 2K or less (that is, contents with the number of pixels of 11920×1080 or less). In this case, target contents for output, movement, or copy are contents with 2K or less (that is, contents with the number of pixels of 11920×1080 or less).

Further, the pixel number conversion is executed for the received contents with over 2K (that is, contents with the number of pixels that exceeds the number of pixels of 1920×1080) to convert the contents into contents with 2K or less (that is, contents with the number of pixels that is 1920×1080 or less) and accumulate them. The pixel number conversion may not be executed for the accumulated contents with 2K or less (that is, contents with the number of pixels that is 1920×1080 or less) at the time of output, movement, or copy after accumulation. In this case, target contents for output, movement, or copy are contents with 2K or less (that is, contents with the number of pixels that is 1920×1080 or less).

Further, the pixel number conversion is executed for the received contents with over 2K (that is, contents with the number of pixels that exceeds the number of pixels of 1920×1080) to convert the contents into contents with 2K or less (that is, contents with the number of pixels that is 1920×1080 or less) and accumulate them. The pixel number conversion may be executed for the accumulated contents with 2K or less (that is, contents with the number of pixels that is 1920×1080 or less) at the time of output, movement, or copy after accumulation to convert the contents into other contents with 2K or less (that is, contents with the number of pixels that is 1920×1080 or less). In this case, target contents for output, movement, or copy are contents with 2K or less (that is, contents with the number of pixels that is 1920×1080 or less).

Further, the pixel number conversion is not executed for the received contents with 2K or less (that is, contents with the number of pixels that is 1920×1080 or less), but the pixel number conversion is executed for the accumulated contents with 2K or less (that is, contents with the number of pixels that is 1920×1080 or less) or the received contents with 2K or less (that is, contents with the number of pixels that is 1920×1080 or less) to convert the contents into other contents with 2K or less (that is, contents with the number of pixels that is 1920×1080 or less) and accumulate the contents. The pixel number conversion may not be executed for the accumulated contents with 2K or less (that is, contents with the number of pixels that is 1920×1080 or less) at the time of output, movement, or copy after accumulation. In this case, target contents for output, movement, or copy are contents with 2K or less (that is, contents with the number of pixels that is 1920×1080 or less).

Further, the pixel number conversion is not executed for the received contents with 2K or less (that is, contents with the number of pixels that is 1920×1080 or less), but the pixel number conversion is executed for the accumulated contents with 2K or less (that is, contents with the number of pixels that is 1920×1080 or less) or the received contents with 2K or less (that is, contents with the number of pixels that is 1920×1080 or less) to convert the contents into other contents with 2K or less (that is, contents with the number of pixels that is 1920×1080 or less) and accumulate the contents. The pixel number conversion may be executed for the accumulated contents with 2K or less (that is, contents with the number of pixels that is 1920×1080 or less) at the time of output, movement, or copy after accumulation to convert the contents into other contents with 2K or less (that is, contents with the number of pixels that is 1920×1080 or less). In this case, target contents for output, movement, or copy are contents with 2K or less (that is, contents with the number of pixels that is 1920×1080 or less).

[Outputting Process to External Equipment After Accumulation of Contents]

It has already been explained that the broadcast receiving apparatus 100 according to the third embodiment does not switch the protecting processes for the contents in accordance with the state of the number of pixels of the contents in the content accumulating process, but executes the common content protecting process. This is because in a case where the contents are accumulated by the content accumulating function by which only the broadcast receiving apparatus 100 that received and recorded the contents can reproduce the contents, the contents are just contents managed by the broadcast receiving apparatus 100 itself, and thus, there is no need to consider a plurality of compliant levels for the content protecting process. On the other hand, in a case where the accumulated contents are outputted to external equipment, a compliant level of the content protecting process may differ depending upon a type of reproducing apparatus that reproduces the contents at an output destination. Therefore, it is desirable that the content protecting process is differentiated in accordance with the number of pixels of the contents when the accumulated contents are outputted to external equipment.

Hereinafter, a concrete example of an outputting process to external equipment after accumulation of contents shown in FIG. 28 will be described. The outputting process to external equipment after accumulation of contents may be applied to a video outputting process when video obtained by decoding video of contents accumulated in the storage unit 110 shown in FIG. 8A by the video decoder 141 or video obtained by converting the decoded video by the pixel number converting unit is outputted to external equipment from the video output unit 163. As another example, the video output may be executed via the IP interface including the LAN communication unit 121 shown in FIG. 8A as hardware.

(2-1) A case where the pixel number conversion is not executed for the received contents with over 2K (that is, contents with the number of pixels that exceeds the number of pixels of 1920×1080), the pixel number conversion is executed for the accumulated contents with over 2K (that is, contents with the number of pixels that exceeds the number of pixels of 1920×1080) or the received contents with over 2K (that is, contents with the number of pixels that exceeds the number of pixels of 1920×1080) to convert the contents into other contents with over 2K (that is, contents with the number of pixels that exceeds the number of pixels of 1920×1080) and accumulate the contents, and the pixel number conversion is not executed for the accumulated contents with over 2K (that is, contents with the number of pixels that exceeds the number of pixels of 1920×1080) when the contents after accumulation are outputted to external equipment In this case, target contents to be outputted to the exterior (external output) are contents with over 2K (that is, contents with the number of pixels that exceeds the number of pixels of 1920×1080).

The accumulated contents for which copy control information on the recording medium at the time of accumulation is set as "copy free" can be outputted without executing content protection by HDCP when the contents are reproduced and outputted to the exterior after accumulation. At this time, it is not considered whether protection of the contents is specified by the value of the "encryption_mode" parameter contained in the contents usage control descriptor at the time of accumulation or not. This makes it possible to communalize the process with the case where the "digital_recording_control_data" parameter of the contents copy control descriptor in (1-1) described above for outputting the contents to the exterior before accumulation is 00.

With respect to the accumulated contents for which the copy control information on the recording medium at the time of accumulation is set as "recopy prohibition", the accumulated contents for which the copy control information on the recording medium at the time of accumulation is set as "copiable for restricted number", and the accumulated contents for which the copy control information on the recording medium at the time of accumulation is set as "temporary accumulation", a high level of content protection after HDCP Revision 2.2 is applied to the contents and the contents are then outputted when the contents are reproduced and outputted to the exterior after accumulation.

Hereinafter, the content protecting process, in which the content protection as described above is executed in accordance with the copy control information on the recording medium when the contents after accumulation are outputted to external equipment as contents with over 2K (that is, contents with the number of pixels that exceeds the number of pixels of 1920×1080), will be called as "protecting process for contents with over 2K" when the contents after accumulation are outputted to external equipment.

(2-2) A case where the pixel number conversion is not executed for the received contents with over 2K (that is, contents with the number of pixels that exceeds the number of pixels of 1920×1080), the pixel number conversion is executed for the accumulated contents with over 2K (that is, contents with the number of pixels that exceeds the number of pixels of 1920×1080) or the received contents with over 2K (that is, contents with the number of pixels that exceeds the number of pixels of 1920×1080) to convert the contents into other contents with over 2K (that is, contents with the number of pixels that exceeds the number of pixels of 1920×1080) and accumulate the contents, and the pixel number conversion is executed for the accumulated contents with over 2K (that is, contents with the number of pixels that exceeds the number of pixels of 1920×1080) to convert the contents into other contents with over 2K when the contents after accumulation are outputted to external equipment In this case, target contents to be outputted to the exterior are contents with over 2K (that is, contents with the number of pixels that exceeds the number of pixels of 1920×1080), and are similar to the case of (2-1) described above. Therefore, the "protecting process for contents with over 2K" when the contents after accumulation are outputted to external equipment, which has been explained in (2-1), is executed.

(2-3) A case where the pixel number conversion is not executed for the received contents with over 2K (that is, contents with the number of pixels that exceeds the number of pixels of 1920×1080), the pixel number conversion is executed for the accumulated contents with over 2K (that is, contents with the number of pixels that exceeds the number of pixels of 1920×1080) or the received contents with over 2K (that is, contents with the number of pixels that exceeds the number of pixels of 1920×1080) to convert the contents into other contents with over 2K (that is, contents with the number of pixels that exceeds the number of pixels of 1920×1080) and accumulate the contents, and the pixel number conversion is executed for the accumulated contents with over 2K (that is, contents with the number of pixels that exceeds the number of pixels of 1920×1080) to convert the contents into contents with 2K or less (that is, contents with the number of pixels that is 1920×1080 or less) when the contents after accumulation are outputted to external equipment In this case, target contents to be outputted to the exterior are contents with 2K or less (that is, contents with the number of pixels that is 1920×1080 or less).

In this case, with respect to the accumulated contents for which the copy control information on the recording medium at the time of accumulation is set as "copy free", the content protecting processes are switched by taking into consideration whether protection is specified by the value of the "encryption_mode" parameter contained in the contents usage control descriptor at the time of accumulation or not. Specifically, in a case where the value of the "encryption_mode" parameter is 1 and protection of the contents is not specified, the contents can be outputted without executing content protection by HDCP when the contents are reproduced and outputted to the exterior after accumulation. In a case where the value of the "encryption_mode" parameter is 0 and protection of the contents is specified, protection by HDCP Revision 1 or after Revision 2 is executed and the contents are then outputted when the contents are reproduced and outputted to external equipment after accumulation. This makes it possible to communalize the process with the case where the "digital_recording_control_data" parameter of the contents copy control descriptor in (1-2) described above for outputting the contents to the exterior before accumulation is 00.

Further, with respect to the accumulated contents for which the copy control information on the recording medium at the time of accumulation is set as "recopy prohibition", the accumulated contents for which the copy control information on the recording medium at the time of accumulation is set as "copiable for restricted number", and the accumulated contents for which the copy control information on the recording medium at the time of accumulation is set as "temporary accumulation", protection by HDCP Revision 1 or after Revision 2 is executed and the contents are then outputted.

Hereinafter, the content protecting process, in which the content protection as described above is executed in accordance with the copy control information on the recording medium when the contents after accumulation are outputted to external equipment as contents with 2K or less (that is, contents with the number of pixels that is 1920×1080 or less), will be called as "protecting process for contents with 2K or less" when the contents after accumulation are outputted to external equipment.

(2-4) A case where the pixel number conversion is executed for the received contents with over 2K (that is, contents with the number of pixels that exceeds the number of pixels of 1920×1080) to convert the contents into contents with 2K or less (that is, contents with the number of pixels that is 1920×1080 or less), and the pixel number conversion is not executed for the accumulated contents with 2K or less (that is, contents with the number of pixels that is 1920×1080 or less) when the contents after accumulation are outputted to external equipment In this case, target contents to be outputted to the exterior are contents with 2K or less (that is, contents with the number of pixels that is 1920×1080 or less), and are similar to the case of (2-3) described above. Therefore, the "protecting process for contents with 2K or less" when the contents after accumulation are outputted to external equipment, which has been explained in (2-3), is executed.

(2-5) A case where the pixel number conversion is executed for the received contents with over 2K (that is, contents with the number of pixels that exceeds the number of pixels of 1920×1080) to convert the contents into contents with 2K or less (that is, contents with the number of pixels that is 1920×1080 or less), and the pixel number conversion is executed for the accumulated contents with 2K or less (that is, contents with the number of pixels that is 1920×1080 or less) to convert the contents into other contents with 2K or less (that is, contents with the number of pixels that is 1920×1080 or less) when the contents after accumulation are outputted to external equipment In this case, target contents to be outputted to the exterior are contents with 2K or less (that is, contents with the number of pixels that is 1920×1080 or less), and are similar to the case of (2-3) described above. Therefore, the "protecting process for contents with 2K or less" when the contents after accumulation are outputted to external equipment, which has been explained in (2-3), is executed.

(2-6) A case where the pixel number conversion is not executed for the received contents with 2K or less (that is, contents with the number of pixels that is 1920×1080 or less), the pixel number conversion is executed for the accumulated contents with 2K or less (that is, contents with the number of pixels that is 1920×1080 or less) or the received contents with 2K or less (that is, contents with the number of pixels that is 1920×1080 or less) to convert the contents into other contents with 2K or less (that is, contents with the number of pixels that is 1920×1080 or less), and the pixel number conversion is not executed for the accumulated contents with 2K or less (that is, contents with the number of pixels that is 1920×1080 or less) when the contents after accumulation are outputted to external equipment In this case, target contents to be outputted to the exterior are contents with 2K or less (that is, contents with the number of pixels that is 1920×1080 or less), and are similar to the case of (2-3) described above. Therefore, the "protecting process for contents with 2K or less" when the contents after accumulation are outputted to external equipment, which has been explained in (2-3), is executed.

(2-7) A case where the pixel number conversion is not executed for the received contents with 2K or less (that is, contents with the number of pixels that is 1920×1080 or less), the pixel number conversion is executed for the accumulated contents with 2K or less (that is, contents with the number of pixels that is 1920×1080 or less) or the received contents with 2K or less (that is, contents with the number of pixels that is 1920×1080 or less) to convert the contents into other contents with 2K or less (that is, contents with the number of pixels that is 1920×1080 or less), and the pixel number conversion is executed for the accumulated contents with 2K or less (that is, contents with the number of pixels that is 1920×1080 or less) when the contents after accumulation are outputted to external equipment to convert the contents into other contents with 2K or less (that is, contents with the number of pixels that is 1920×1080 or less)

In this case, target contents to be outputted to the exterior are contents with 2K or less (that is, contents with the number of pixels that is 1920×1080 or less), and are similar to the case of (2-3) described above. Therefore, the "protecting process for contents with 2K or less" when the contents after accumulation are outputted to external equipment, which has been explained in (2-3), is executed.

As explained in (2-1) to (2-7) described above, at the time when the contents are outputted to external equipment after accumulation, the content protecting processes are switched in accordance with the number of pixels of the contents when the contents after accumulation are outputted to external equipment. In a case where contents with over 2K (that is, contents with the number of pixels that exceeds the number of pixels of 1920×1080), which are subjected to copy limitation, are outputted to external equipment in such a state, higher-level content protection is applied to the contents and the contents are outputted compared with a case where contents with 2K or less (that is, contents with the number of pixels that is 1920×1080 or less), which are subjected to copy limitation, are outputted to external equipment in such a state. This makes it possible to protect contents with over 2K (that is, contents with the number of pixels that exceeds the number of pixels of 1920×1080), which have a higher added value, even in external equipment appropriately.

[Moving Process to External Equipment After Accumulation of Contents]

It has already been explained that in the content accumulating process, the broadcast receiving apparatus 100 according to the third embodiment executes the common content protecting process in accordance with the state of the number of pixels of the contents without switching the protecting processes of the contents. This is because in a case where the contents are accumulated by the content accumulating function by which only the broadcast receiving apparatus 100 that received and recorded the contents can reproduce the contents, the contents are just contents managed by the broadcast receiving apparatus 100 itself, and thus, there is no need to consider a plurality of compliant levels for the content protecting process. On the other hand, in a case where the accumulated contents are moved to external equipment, a compliant level of the content protecting process may differ depending upon a type of equipment as a movement destination. Therefore, it is desirable that the content protecting process is differentiated in accordance with the number of pixels of the contents when the accumulated contents are moved to external equipment.

Hereinafter, a concrete example of a moving process to external equipment after accumulation of contents shown in FIG. 28 will be described. Note that the moving process of contents to external equipment after the contents are accumulated in the storage unit 110 shown in FIG. 8A may be executed via the IP interface including the LAN communication unit 121 shown in FIG. 8A as hardware, for example.

(3-1) A case where the pixel number conversion is not executed for the received contents with over 2K (that is, contents with the number of pixels that exceeds the number of pixels of 1920×1080), the pixel number conversion is executed for the accumulated contents with over 2K (that is, contents with the number of pixels that exceeds the number of pixels of 1920×1080) or the received contents with over 2K (that is, contents with the number of pixels that exceeds the number of pixels of 1920×1080) to convert the contents into other contents with over 2K (that is, contents with the number of pixels that exceeds the number of pixels of 1920×1080) and accumulate the contents, and the pixel number conversion is not executed for the accumulated contents with over 2K (that is, contents with the number of pixels that exceeds the number of pixels of 1920×1080) when the contents after accumulation are moved to external equipment In this case, target contents to be moved to external equipment are contents with over 2K (that is, contents with the number of pixels that exceeds the number of pixels of 1920×1080).

The accumulated contents for which copy control information on the recording medium at the time of accumulation is set as "copy free" can be moved without executing content protection by DTCP when the contents are moved to external equipment after accumulation. At this time, it is not considered whether protection of the contents is specified by the value of the "encryption_mode" parameter contained in the contents usage control descriptor at the time of accumulation or not.

With respect to the accumulated contents for which the copy control information on the recording medium at the time of accumulation is set as "recopy prohibition", and the accumulated contents for which the copy control information on the recording medium at the time of accumulation is set as "copiable for restricted number", content protection is executed by DTCP2 (which is described in Reference document 1), which is a content protecting system with a higher level than that of DTCP-IP, whereby it is possible to move the contents to external equipment. Note that the external equipment can reproduce the contents protected by DTCP2 (that is, the contents protected by DTCP2 can be transmitted to the external equipment) only in a case where the external equipment is compliant with content protection by DPCT2 even though the external equipment is compliant with content protection by DTCP-IP. Therefore, the content protection by DPCT2 is more powerful than the content protection by DTCP-IP, but existing external equipment cannot be compliant with contents protected by DTCP2. On the other hand, the content protection by DTCP-IP cannot utilize a new content protection flag and the like for DPCT2. However, it becomes possible to move the contents to external equipment that is not compliant with DPCT2 but compliant with existing DTCP-IP.

[Reference document 1: Digital Transmission Licensing Administrator DTCP2 Presentation to CPTWG Jan. 27, 2016]

Hereinafter, the content protecting process, in which the content protection as described above is executed in accordance with the copy control information on the recording medium when the contents after accumulation are moved to external equipment as contents with over 2K (that is, contents with the number of pixels that exceeds the number of pixels of 1920×1080), will be called as "protecting process for contents with over 2K" when the contents after accumulation are moved to external equipment.

(3-2) A case where the pixel number conversion is not executed for the received contents with over 2K (that is, contents with the number of pixels that exceeds the number of pixels of 1920×1080), the pixel number conversion is executed for the accumulated contents with over 2K (that is, contents with the number of pixels that exceeds the number of pixels of 1920×1080) or the received contents with over 2K (that is, contents with the number of pixels that exceeds the number of pixels of 1920×1080) to convert the contents into other contents with over 2K (that is, contents with the number of pixels that exceeds the number of pixels of 1920×1080) and accumulate the contents, and the pixel number conversion is executed for the accumulated contents with over 2K (that is, contents with the number of pixels that exceeds the number of pixels of 1920×1080) to convert the contents into other contents with over 2K when the contents after accumulation are moved to external equipment In this case, target contents to be moved to external equipment are contents with over 2K (that is, contents with the number of pixels that exceeds the number of pixels of 1920×1080), and are similar to the case of (3-1) described above. Therefore, the "protecting process for contents with over 2K" when the contents after accumulation are moved to external equipment, which has been explained in (3-1), is executed.

(3-3) A case where the pixel number conversion is not executed for the received contents with over 2K (that is, contents with the number of pixels that exceeds the number of pixels of 1920×1080), the pixel number conversion is executed for the accumulated contents with over 2K (that is, contents with the number of pixels that exceeds the number of pixels of 1920×1080) or the received contents with over 2K (that is, contents with the number of pixels that exceeds the number of pixels of 1920×1080) to convert the contents into other contents with over 2K (that is, contents with the number of pixels that exceeds the number of pixels of 1920×1080) and accumulate the contents, and the pixel number conversion is executed for the accumulated contents with over 2K (that is, contents with the number of pixels that exceeds the number of pixels of 1920×1080) to convert the contents into contents with 2K or less (that is, contents with the number of pixels that is 1920×1080 or less) when the contents after accumulation are moved to external equipment In this case, target contents to be moved to external equipment are contents with 2K or less (that is, contents with the number of pixels that is 1920×1080 or less).

In this case, with respect to the accumulated contents for which the copy control information on the recording medium at the time of accumulation is set as "copy free", the content protecting processes are switched by taking into consideration whether protection is specified by the value of the "encryption_mode" parameter contained in the contents usage control descriptor at the time of accumulation or not. Specifically, in a case where the value of the "encryption_mode" parameter is 1 and protection of the contents is not specified, the contents can be moved without executing content protection by DTCP when the contents are moved to external equipment after accumulation. In a case where the value of the "encryption_mode" parameter is 0 and protection of the contents is specified, protection by DTCP (or DTCP-IP when the contents are moved via an IP interface) can be executed and then moved when the contents are moved to external equipment after accumulation. At this time, content protection by DTCP2 is not required.

Further, with respect to the accumulated contents for which the copy control information on the recording medium at the time of accumulation is set as "recopy prohibition", and the accumulated contents for which the copy control information on the recording medium at the time of accumulation is set as "copiable for restricted number", protection by DTCP (or DTCP-IP when the contents are moved via the IP interface) is executed, and the contents are then moved. At this time, content protection by DTCP2 is not required.

Hereinafter, the content protecting process, in which the content protection as described above is executed in accordance with the copy control information on the recording medium when the contents after accumulation are moved to external equipment as contents with 2K or less (that is, contents with the number of pixels that is 1920×1080 or less), will be called as "protecting process for contents with 2K or less" when the contents after accumulation are moved to external equipment.

(3-4) A case where the pixel number conversion is executed for the received contents with over 2K (that is, contents with the number of pixels that exceeds the number of pixels of 1920×1080) to convert the contents into contents with 2K or less (that is, contents with the number of pixels that is 1920×1080 or less), and the pixel number conversion is not executed for the accumulated contents with 2K or less (that is, contents with the number of pixels that is 1920×1080 or less) when the contents are moved to external equipment after accumulation In this case, target contents to be moved to external equipment are contents with 2K or less (that is, contents with the number of pixels that is 1920×1080 or less), and are similar to the case of (3-3) described above. Therefore, the "protecting process for contents with 2K or less" when the contents after accumulation are moved to external equipment, which has been explained in (3-3), is executed.

(3-5) A case where the pixel number conversion is executed for the received contents with over 2K (that is, contents with the number of pixels that exceeds the number of pixels of 1920×1080) to convert the contents into contents with 2K or less (that is, contents with the number of pixels that is 1920×1080 or less), and the pixel number conversion is executed for the accumulated contents with 2K or less (that is, contents with the number of pixels that is 1920×1080 or less) when the contents after accumulation are moved to external equipment to convert the contents into other contents with 2K or less (that is, contents with the number of pixels that is 1920×1080 or less)

In this case, target contents to be moved to external equipment are contents with 2K or less (that is, contents with the number of pixels that is 1920×1080 or less), and are similar to the case of (3-3) described above. Therefore, the "protecting process for contents with 2K or less" when the contents after accumulation are moved to external equipment, which has been explained in (3-3), is executed.

(3-6) A case where the pixel number conversion is not executed for the received contents with 2K or less (that is, contents with the number of pixels that is 1920×1080 or less), the pixel number conversion is executed for the accumulated contents with 2K or less (that is, contents with the number of pixels that is 1920×1080 or less) or the received contents with 2K or less (that is, contents with the number of pixels that is 1920×1080 or less) to convert the contents into other contents with 2K or less (that is, contents with the number of pixels that is 1920×1080 or less), and the pixel number conversion is not executed for the accumulated contents with 2K or less (that is, contents with the number of pixels that is 1920×1080 or less) when the contents are moved to external equipment after accumulation In this case, target contents to be moved to external equipment are contents with 2K or less (that is, contents with the number of pixels that is 1920×1080 or less), and are similar to the case of (3-3) described above. Therefore, the "protecting process for contents with 2K or less" when the contents after accumulation are moved to external equipment, which has been explained in (3-3), is executed.

(3-7) A case where the pixel number conversion is not executed for the received contents with 2K or less (that is, contents with the number of pixels that is 1920×1080 or less), the pixel number conversion is executed for the accumulated contents with 2K or less (that is, contents with the number of pixels that is 1920×1080 or less) or the received contents with 2K or less (that is, contents with the number of pixels that is 1920×1080 or less) to convert the contents into other contents with 2K or less (that is, contents with the number of pixels that is 1920×1080 or less), and the pixel number conversion is executed for the accumulated contents with 2K or less (that is, contents with the number of pixels that is 1920×1080 or less) when the contents are moved to external equipment after accumulation to convert the contents into other contents with 2K or less (that is, contents with the number of pixels that is 1920×1080 or less)

In this case, target contents to be moved to external equipment are contents with 2K or less (that is, contents with the number of pixels that is 1920×1080 or less), and are similar to the case of (3-3) described above. Therefore, the "protecting process for contents with 2K or less" when the contents after accumulation are moved to external equipment, which has been explained in (3-3), is executed.

As explained in (3-1) to (3-7) described above, at the time when the contents are moved to external equipment after accumulation, the content protecting processes are switched in accordance with the number of pixels of the contents when the contents after accumulation are moved to external equipment. In a case where contents with over 2K (that is, contents with the number of pixels that exceeds the number of pixels of 1920×1080), which are subjected to copy limitation, are moved to external equipment in such a state, higher-level content protection is applied to the contents and the contents are moved compared with a case where contents with 2K or less (that is, contents with the number of pixels that is 1920×1080 or less), which are subjected to copy limitation, are moved to external equipment in such a state. This makes it possible to protect contents with over 2K (that is, contents with the number of pixels that exceeds the number of pixels of 1920×1080), which have a higher added value, even in external equipment appropriately.

Note that even in a case of any of (3-1) to (3-7) described above, movement of the contents to external equipment includes a series of processes in which contents are copied to only one authorized external equipment and reproduction of original contents is disabled. At this time, the reproduction of the original contents must be disabled within one minute after the contents are copied to external equipment. As concrete examples of disablement of reproduction of contents, there are a method of deleting the contents themselves, or a method of deleting an encryption key for the contents. This may cause reproduction of the contents to be disabled.

[Copying Process to External Equipment After Accumulation of Contents]

It has already been explained that in the content accumulating process, the broadcast receiving apparatus 100 according to the third embodiment executes the common content protecting process in accordance with the state of the number of pixels of the contents without switching the protecting processes of the contents. This is because in a case where the contents are accumulated by the content accumulating function by which only the broadcast receiving apparatus 100 that received and recorded the contents can reproduce the contents, the contents are just contents managed by the broadcast receiving apparatus 100 itself, and thus, there is no need to consider a plurality of compliant levels for the content protecting process. On the other hand, in a case where the accumulated contents are copied to external equipment, a compliant level of the content protecting process may differ depending upon a type of equipment as a copy destination. Therefore, it is desirable that the content protecting process is differentiated in accordance with the number of pixels of the contents when the accumulated contents are copied to external equipment.

Hereinafter, a concrete example of a copying process to external equipment after accumulation of contents shown in FIG. 28 will be described. Note that the copying process of contents to external equipment after the contents are accumulated in the storage unit 110 shown in FIG. 8A may be executed via the IP interface including the LAN communication unit 121 shown in FIG. 8A as hardware, for example.

Further, with respect to the accumulated contents for which the copy control information on the recording medium at the time of accumulation is set as "recopy prohibition", copy of the contents to external equipment is prohibited. With respect to the accumulated contents for which the copy control information on the recording medium at the time of accumulation is set as "copiable for restricted number", copies can be generated up to nine in addition to the original contents. However, for example, in a case where the storage unit 110 shown in FIG. 8A, which accumulates the contents therein, is configured by a RAID system configured to execute backup processing in which a user cannot access the contents directly, a copy or copies for backup, which the user cannot access directly, may be left off from the restricted number of nine described above. In a case where the nine copies within a copy restricted number as described above are executed to plural pieces of external equipment via the IP interface, there is need to execute the copies in a state where a number such as one is managed for one authorized external equipment. After the copies of the restricted number described above (nine) are generated, the original contents can be moved to another external equipment by the moving process described above. The copying process for the nine contents and the moving process for the original contents are equivalent processing in which nine copies are generated in the broadcast receiving apparatus 100 at the time of accumulation of the contents, and ten contents including original contents are moved to external equipment one by one as the moving process.

Hereinafter, a concrete process to differentiate content protecting processes in accordance with the number of pixels of contents when accumulated contents are copied to external equipment will be described.

(4-1) A case where the pixel number conversion is not executed for the received contents with over 2K (that is, contents with the number of pixels that exceeds the number of pixels of 1920×1080), the pixel number conversion is executed for the accumulated contents with over 2K (that is, contents with the number of pixels that exceeds the number of pixels of 1920×1080) or the received contents with over 2K (that is, contents with the number of pixels that exceeds the number of pixels of 1920×1080) to convert the contents into other contents with over 2K (that is, contents with the number of pixels that exceeds the number of pixels of 1920×1080) and accumulate the contents, and the pixel number conversion is not executed for the accumulated contents with over 2K (that is, contents with the number of pixels that exceeds the number of pixels of 1920×1080) when the contents after accumulation are copied to external equipment In this case, target contents to be copied to external equipment are contents with over 2K (that is, contents with the number of pixels that exceeds the number of pixels of 1920×1080).

The accumulated contents for which copy control information on the recording medium at the time of accumulation is set as "copy free" can be copied without executing content protection by DTCP when the contents are copied to external equipment after accumulation. At this time, it is not considered whether protection of the contents is specified by the value of the "encryption_mode" parameter contained in the contents usage control descriptor at the time of accumulation or not.

With respect to the accumulated contents for which the copy control information on the recording medium at the time of accumulation is set as "recopy prohibition", copy thereof to external equipment is prohibited. In a case where the accumulated contents for which the copy control information on the recording medium at the time of accumulation is set as "copiable for restricted number" are copied to external equipment within the restricted number of nine as described above, content protection is executed by the DTCP2 described above that is a content protecting system with a higher level than that of DTCP-IP, and the contents can then be copied to external equipment (At this time, by transmitting copy target contents to external equipment one by one by using the moving process of DTCP2, the copy by managing the number of contents may be realized. In this case, the moving process is executed for one piece of contents in the restricted number of nine, and the number of copy target contents is thus reduced to become treatment equivalent of the reproduction disablement. However, reproduction disablement for the original contents themselves other than the restricted number of nine is not required.). Note that the external equipment can reproduce the contents protected by DTCP2 (that is, the contents protected by DTCP2 can be transmitted to the external equipment) only in a case where the external equipment is compliant with content protection by DPCT2 even though the external equipment is compliant with content protection by DTCP-IP. Therefore, the content protection by DPCT2 is more powerful than the content protection by DTCP-IP, but existing external equipment cannot be compliant with contents protected by DTCP2. On the other hand, the content protection by DTCP-IP cannot utilize a new content protection flag and the like for DPCT2. However, it becomes possible to copy the contents to external equipment that is not compliant with DPCT2 but compliant with existing DTCP-IP.

Hereinafter, the content protecting process, in which the content protection as described above is executed in accordance with the copy control information on the recording medium when the contents after accumulation are copied to external equipment as contents with over 2K (that is, contents with the number of pixels that exceeds the number of pixels of 1920×1080), will be called as "protecting process for contents with over 2K" when the contents after accumulation are copied to external equipment.

(4-2) A case where the pixel number conversion is not executed for the received contents with over 2K (that is, contents with the number of pixels that exceeds the number of pixels of 1920×1080), the pixel number conversion is executed for the accumulated contents with over 2K (that is, contents with the number of pixels that exceeds the number of pixels of 1920×1080) or the received contents with over 2K (that is, contents with the number of pixels that exceeds the number of pixels of 1920×1080) to convert the contents into other contents with over 2K (that is, contents with the number of pixels that exceeds the number of pixels of 1920×1080) and accumulate the contents, and the pixel number conversion is executed for the accumulated contents with over 2K (that is, contents with the number of pixels that exceeds the number of pixels of 1920×1080) to convert the contents into other contents with over 2K when the contents after accumulation are copied to external equipment In this case, target contents to be copied to external equipment are contents with over 2K (that is, contents with the number of pixels that exceeds the number of pixels of 1920×1080), and are similar to the case of (4-1) described above. Therefore, the "protecting process for contents with over 2K" when the contents after accumulation are moved to external equipment, which has been explained in (4-1), is executed.

(4-3) A case where the pixel number conversion is not executed for the received contents with over 2K (that is, contents with the number of pixels that exceeds the number of pixels of 1920×1080), the pixel number conversion is executed for the accumulated contents with over 2K (that is, contents with the number of pixels that exceeds the number of pixels of 1920×1080) or the received contents with over 2K (that is, contents with the number of pixels that exceeds the number of pixels of 1920×1080) to convert the contents into other contents with over 2K (that is, contents with the number of pixels that exceeds the number of pixels of 1920×1080) and accumulate the contents, and the pixel number conversion is executed for the accumulated contents with over 2K (that is, contents with the number of pixels that exceeds the number of pixels of 1920×1080) to convert the contents into contents with 2K or less (that is, contents with the number of pixels that is 1920×1080 or less) when the contents after accumulation are copied to external equipment In this case, target contents to be copied to external equipment are contents with 2K or less (that is, contents with the number of pixels that is 1920×1080 or less).

In this case, with respect to the accumulated contents for which the copy control information on the recording medium at the time of accumulation is set as "copy free", the content protecting processes are switched by taking into consideration whether protection is specified by the value of the "encryption_mode" parameter contained in the contents usage control descriptor at the time of accumulation or not. Specifically, in a case where the value of the "encryption_mode" parameter is 1 and protection of the contents is not specified, the contents can be copied without executing content protection by DTCP when the contents are copied to external equipment after accumulation. In a case where the value of the "encryption_mode" parameter is 0 and protection of the contents is specified, protection by DTCP (or DTCP-IP when the contents are copied via an IP interface) can be executed and then copied when the contents are copied to external equipment after accumulation. At this time, content protection by DTCP2 is not required.

With respect to the accumulated contents for which the copy control information on the recording medium at the time of accumulation is set as "recopy prohibition", copy thereof to external equipment is prohibited. In a case where the accumulated contents for which the copy control information on the recording medium at the time of accumulation is set as "copiable for restricted number" are copied to external equipment within the restricted number of nine as described above, protection by DTCP (or DTCP-IP when the contents are copied via an IP interface), and the contents are then copied. At this time, content protection by DTCP2 is not required. In order to realize the copy by managing the number of contents, a moving function of DTCP may be used for copy of the contents one by one at this time. In this case, since the moving process is executed for one piece of contents within the restricted number of nine, the number of contents as the copy target is reduced and to become treatment equivalent of the reproduction disablement. However, reproduction disablement for the original contents themselves other than the restricted number of nine is not required.

Hereinafter, the content protecting process, in which the content protection as described above is executed in accordance with the copy control information on the recording medium when the contents after accumulation are copied to external equipment as contents with 2K or less (that is, contents with the number of pixels that is 1920×1080 or less), will be called as "protecting process for contents with 2K or less" when the contents after accumulation are copied to external equipment.

(4-4) A case where the pixel number conversion is executed for the received contents with over 2K (that is, contents with the number of pixels that exceeds the number of pixels of 1920×1080) to convert the contents into contents with 2K or less (that is, contents with the number of pixels that is 1920×1080 or less), and the pixel number conversion is not executed for the accumulated contents with 2K or less (that is, contents with the number of pixels that is 1920×1080 or less) when the contents are copied to external equipment after accumulation In this case, target contents to be copied to external equipment are contents with 2K or less (that is, contents with the number of pixels that is 1920×1080 or less), and are similar to the case of (4-3) described above. Therefore, the "protecting process for contents with 2K or less" when the contents after accumulation are copied to external equipment, which has been explained in (4-3), is executed.

(4-5) A case where the pixel number conversion is executed for the received contents with over 2K (that is, contents with the number of pixels that exceeds the number of pixels of 1920×1080) to convert the contents into contents with 2K or less (that is, contents with the number of pixels that is 1920×1080 or less), and the pixel number conversion is executed for the accumulated contents with 2K or less (that is, contents with the number of pixels that is 1920×1080 or less) when the contents are copied to external equipment after accumulation to convert the contents into other contents with 2K or less (that is, contents with the number of pixels that is 1920×1080 or less)

In this case, target contents to be copied to external equipment are contents with 2K or less (that is, contents with the number of pixels that is 1920×1080 or less), and are similar to the case of (4-3) described above. Therefore, the "protecting process for contents with 2K or less" when the contents after accumulation are copied to external equipment, which has been explained in (4-3), is executed.

(4-6) A case where the pixel number conversion is not executed for the received contents with 2K or less (that is, contents with the number of pixels that is 1920×1080 or less), the pixel number conversion is executed for the accumulated contents with 2K or less (that is, contents with the number of pixels that is 1920×1080 or less) or the received contents with 2K or less (that is, contents with the number of pixels that is 1920×1080 or less) to convert the contents into other contents with 2K or less (that is, contents with the number of pixels that is 1920×1080 or less), and the pixel number conversion is not executed for the accumulated contents with 2K or less (that is, contents with the number of pixels that is 1920×1080 or less) when the contents after accumulation are copied to external equipment In this case, target contents to be copied to external equipment are contents with 2K or less (that is, contents with the number of pixels that is 1920×1080 or less), and are similar to the case of (4-3) described above. Therefore, the "protecting process for contents with 2K or less" when the contents after accumulation are copied to external equipment, which has been explained in (4-3), is executed.

(4-7) A case where the pixel number conversion is not executed for the received contents with 2K or less (that is, contents with the number of pixels that is 1920×1080 or less), the pixel number conversion is executed for the accumulated contents with 2K or less (that is, contents with the number of pixels that is 1920×1080 or less) or the received contents with 2K or less (that is, contents with the number of pixels that is 1920×1080 or less) to convert the contents into other contents with 2K or less (that is, contents with the number of pixels that is 1920×1080 or less), and the pixel number conversion is executed for the accumulated contents with 2K or less (that is, contents with the number of pixels that is 1920×1080 or less) when the contents after accumulation are copied to external equipment to convert the contents into other contents with 2K or less (that is, contents with the number of pixels that is 1920×1080 or less)

In this case, target contents to be copied to external equipment are contents with 2K or less (that is, contents with the number of pixels that is 1920×1080 or less), and are the similar to the case of (4-3) described above. Therefore, the "protecting process for contents with 2K or less" when the contents after accumulation are copied to external equipment, which has been explained in (4-3), is executed.

As explained in (4-1) to (4-7) described above, at the time when the contents are copied to external equipment after accumulation, the content protecting processes are switched in accordance with the number of pixels of the contents when the contents after accumulation are copied to external equipment. In a case where contents with over 2K (that is, contents with the number of pixels that exceeds the number of pixels of 1920×1080), which are subjected to copy limitation, are copied to external equipment in such a state, higher-level content protection is applied to the contents and the contents are copied compared with a case where contents with 2K or less (that is, contents with the number of pixels that is 1920×1080 or less), which are subjected to copy limitation, are copied to external equipment in such a state. This makes it possible to protect contents with over 2K (that is, contents with the number of pixels that exceeds the number of pixels of 1920×1080), which have a higher added value, even in external equipment appropriately.

With respect to a case where the accumulated contents are copied to external equipment as "copiable for restricted number" within the restricted number of nine as described above, even in a case where any of the "protecting process for contents with over 2K" when the contents after accumulation are copied to external equipment and the "protecting process for contents with 2K or less" when the contents after accumulation are copied to external equipment, which have been explained in (4-1) to (4-7) described above, is utilized, one is equally decreased from the number of remaining copiable contents. There is no need to set a difference in management of the number of copiable contents itself on the basis of a difference between the content protecting processes at the time of copy.

Note that the broadcast receiving apparatus 100 according to the third embodiment may be configured to respectively prohibit output, movement, and copy of external equipment that is compliant with the content protection function that has been explained for each condition in the outputting process to the exterior, the moving process to the exterior, and the copying process to the exterior, which have been explained above.

In a case where the "digital_recording_control_data" information and the "encryption_mode" information, which are intended for protection of the same received contents are transmitted via a broadcast transmission path with a plurality of different tables or descriptors, or in a case where they are transmitted via both the broadcast transmission path and a communication line with the same or different table or descriptor, information with the highest priority may be used for the content protecting process that has been explained in the present embodiment by using a predetermined priority determining process based on a type of table, a type of descriptor, or a type of transmission route.

Further, the HDCP described above, which is a content protection system used for the outputting process of the contents before accumulation to external equipment and the outputting process of the contents after accumulation to external equipment, is a content protection system that protects contents such as decoded video. The DTCP, DTCP-IP, or DTCP2, which is used for processing such as movement or copy of the contents after accumulation to external equipment, is a content protection system that protects contents such as encoded video. The types of the contents as a protection target are different. Nevertheless, a threshold value when the broadcast receiving apparatus 100 according to the third embodiment switches the content protecting processes in accordance with the number of pixels of the contents is set to be equal for a boundary between the contents with over 2K (that is, contents with the number of pixels that exceeds the number of pixels of 1920×1080) and the contents with 2K or less (that is, contents with the number of pixels that is 1920×1080 or less). Thus, by equalizing the switching threshold value when to switch the content protecting processes in accordance with the number of pixels even in the content protection system in which the types of contents as the protection target are different, it is possible to avoid types of conditional branches to switch the content protecting processes from being increased as much as possible, and this makes it possible to simplify the processing. Therefore, this is effective.

According to the third embodiment of the present invention described above, it is possible to switch the content protecting processes in accordance with the number of pixels of the contents even in any case of the outputting process of the contents after accumulation to external equipment, the moving process of the contents to external equipment, or the copying process of the contents to external equipment in addition to the outputting process of the contents before accumulation to external equipment. This makes it possible to protect contents with the high number of pixels, which have a higher added value, even in external equipment appropriately. Further, by executing the common content protection during accumulation of the contents regardless of the number of pixels of the contents, it is possible to simplify the processing. Namely, in a case of the outputting process, the moving process, or the copying process to various kinds of external equipment respectively having various content protection levels, the content protecting processes are switched in accordance with the number of pixels of the contents. This makes it possible to simplify the processing by executing the common content protection for accumulation of contents that cannot be reproduced only by the equipment itself regardless of the number of pixels of the contents.

Fourth Embodiment

Hereinafter, a fourth embodiment of the present invention will be described. The fourth embodiment of the present invention includes the similar hardware configuration to that of the broadcast receiving apparatus 800 according to the second embodiment. Configuration, processes, effects and the like of the present embodiment are the similar to those of the second embodiment except for a content protecting process. For this reason, in the following description, differences between the present embodiment and the second embodiment will be mainly described, and description of the matters common to both embodiments will be omitted as much as possible in order to avoid redundant description.

A broadcast receiving apparatus 800 according to the fourth embodiment of the present invention has a similar hardware configuration to that of the broadcast receiving apparatus 800 according to the second embodiment, and executes a control to realize a different copyright protecting function. Note that in the present embodiment, a content protection control for video of contents will be described. A similar control to one that will be explained below may be carried out for audio, or a different content protection control may be carried out for audio.

FIG. 29 is a view in which processes for a copyright protecting function in the broadcast receiving apparatus 800 according to the third embodiment are arranged. The broadcast receiving apparatus 800 according to the fourth embodiment switches copyright protecting processes for contents before or after a content accumulating process depending upon whether received contents are contents with over 2K (that is, contents with the number of pixels that exceeds 1920×1080), such as contents with 4K (the number of pixels: 3840×2160) or contents with 8K (the number of pixels: 7680×4320), or contents with 2K or less (that is, contents with the number of pixels that is 1920×1080 or less).

In FIG. 29, a content protecting process shown in each of rows whose transmission method is MMT is a content protecting process that is applied to contents for which a receiving process is executed by the MMT decode processing unit 841 of the broadcast receiving apparatus 800 shown in FIG. 24. The content thereof is the same as the content protecting process of FIG. 28 that has been explained in the third embodiment, and thus, its explanation will be omitted.

On the other hand, in FIG. 29, a content protecting process shown in a row whose transmission method is MPEG2-TS is a content protecting process that is applied to contents for which a receiving process is executed by the MPEG2-TS decode processing unit 842 of the broadcast receiving apparatus 800 shown in FIG. 24.

Contents that the broadcast receiving apparatus 800 according to the fourth embodiment of the present invention receives in an MPEG2-TS transmission method are contents with 2K or less (that is, contents with the number of pixels that is 1920×1080 or less) in any case.

Since the contents received in the MPEG2-TS transmission method are the contents with 2K or less (that is, contents with the number of pixels that is 1920×1080 or less), the broadcast receiving apparatus 800 according to the fourth embodiment of the present invention commonalizes the process between the contents with 2K or less (that is, contents with the number of pixels that is 1920×1080 or less) received in the MPEG2-TS transmission method and the contents with 2K or less (that is, contents with the number of pixels that is 1920×1080 or less) received in an MMT transmission method. Specifically, in either case, the content protecting process for the contents with 2K or less (that is, contents with the number of pixels that is 1920×1080 or less) received in the MMT transmission method that has been explained in the third embodiment may be executed.

Here, a format of the table by which control information used for content protection is transmitted is different between the MMT transmission method and the MPEG2-TS transmission method. Specifically, in the MMT transmission method, a contents copy control descriptor and a contents usage control descriptor are mainly transmitted by an MPT (or MH-EIT, MH-SDT), for example. On the other hand, in the MPEG2-TS transmission method, a digital copy control descriptor and a contents usage descriptor, which are corresponding to copy control related information, are mainly transmitted by a PMT (program map table) (or EIT, SDT), for example. Therefore, the formats of the table and the descriptor by which the copy control related information is transmitted are different.

However, the same format for a "digital_recording_control_data" parameter and a "copy_restriction_mode" parameter stored in the descriptor can further be used between the MMT transmission method and the MPEG2-TS transmission method. Therefore, the broadcast receiving apparatus 800 according to the fourth embodiment of the present invention communalizes interpretation of the "digital_recording_control_data" parameter and the "copy_restriction_mode" parameter to specify protection of the contents between the MMT transmission method and the MPEG2-TS transmission method.

This makes it possible to communalize the external outputting process of contents before accumulation, the content accumulating process, the external outputting process of the contents after accumulation, the moving process of contents after accumulation to external equipment, and the copying process of the contents after accumulation to external equipment between the case of the contents with 2K or less (that is, contents with the number of pixels that is 1920×1080 or less) received in the MPEG2-TS transmission method and the case of the contents with 2K or less (that is, contents with the number of pixels that is 1920×1080 or less) received in the MMT transmission method. This makes it possible to simplify the processes. As each concrete processing, the content protecting process for the contents with 2K or less (that is, contents with the number of pixels that is 1920×1080 or less) received in the MMT transmission method that has been explained in the third embodiment is executed. Since the content has already been explained in the third embodiment, explanation thereof will be omitted.

Moreover, by communalizing the processes, the content protecting process in the case of the contents with 2K or less (that is, contents with the number of pixels that is 1920×1080 or less) received in the MPEG2-TS transmission method can commonalize the content protecting process in the case of the contents with 2K or less (that is, contents with the number of pixels that is 1920×1080 or less) for the contents with over 2K (that is, contents with the number of pixels that exceeds the number of pixels of 1920×1080) received in the MMT transmission method before accumulation thereof or after accumulation thereof by means of the pixel number converting process in addition to the content protecting process in the case of the contents with 2K or less (that is, contents with the number of pixels that is 1920×1080 or less) received in the MMT transmission method. Therefore, an effect to simplify the processing becomes very high.

According to the fourth embodiment of the present invention described above, it is possible to obtain the similar effects to those according to the third embodiment with respect to the contents received in the MMT transmission method. Further, with respect to the contents with the predetermined number of pixels or less, it is possible to commonalize the content protecting process between the contents received in the MMT transmission method and the contents received in the MPEG2-TS transmission method not only for the outputting process of the contents before accumulation to external equipment, but also for any case of the outputting process of the contents after accumulation to external equipment, the moving process to external equipment, or the copying process to external equipment. Therefore, it becomes possible to simplify the process beyond the transmission method.

As described above, the examples of the embodiments according to the present invention have been explained using the first to fourth embodiments. However, the configurations for achieving the technique of the present invention are not limited to those embodiments, and may be modified in various ways. For example, some constituent elements of an embodiment may be replaced with those of another embodiment, and a constituent element of an embodiment may be added to a constituent element of another embodiment. These modifications are all within the scope of the present invention. In addition, numerical values, messages, and others in the specification and drawings are described by way of example, and the effects of the present invention are not impaired even when values, messages, and others different from those are used.

A part or all of the functions and the like of the present invention described above may be achieved by means of hardware, for example, by designing such functions with integrated circuits. Alternatively, it may be achieved by means of software by causing a microprocessor unit or the like to interpret and execute operating programs for achieving respective functions. It is also possible to use hardware and software in combination.

Note that the software that controls the broadcast receiving apparatus 100 may be stored in advance in the ROM 103 and/or the storage (accumulation) unit 110 of the broadcast receiving apparatus 100 at the time of product shipment. The software may be acquired from the other application server 500 or the like on the Internet 200 through the LAN communication unit 121 after the product shipment. Alternatively, the software stored in a memory card, optical disc, or the like may be acquired through the extension interface unit 124.

Further, control lines and data lines considered to be necessary for the description are shown in the drawings, and all the control lines and data lines included in the product are not always shown in the drawings. Actually, it is presumable that almost all constituent elements are connected with each other.

REFERENCE SINGS LIST 100, 800 . . . broadcast receiving apparatus, 100a . . . antenna, 101, 801 . . . main control unit, 102, 802 . . . system bus, 103, 803 . . . ROM, 104, 804 . . . RAM, 110, 810 . . . storage unit, 121, 821 . . . LAN communication unit, 124, 824 . . . extension interface unit, 125, 825 . . . digital interface unit, 131, 831, 832 . . . tuner/demodulating unit, 132 . . . separating unit, 141 . . . video decoder, 142 . . . video color gamut conversion unit, 143 . . . audio decoder, 144 . . . caption decoder, 145 . . . subtitle decoder, 146 . . . subtitle synthesizing unit, 147 . . . subtitle color gamut conversion unit, 151 . . . data decoder, 152 . . . cache unit, 153 . . . application control unit, 154 . . . browser unit, 155 . . . application color gamut conversion unit, 156 . . . sound source unit, 161, 861 . . . video synthesizing unit, 162, 862 . . . monitor unit, 163, 863 . . . video output unit, 164, 864 . . . audio synthesizing unit, 165, 865 . . . speaker unit, 166, 866 . . . audio output unit, 170, 870 . . . operation input unit, 841 . . . MMT decode processing unit, 842 . . . MPEG2-TS decode processing unit, 200 . . . Internet, 200r . . . router device, 200a . . . access point, 300t . . . radio tower, 300s . . . broadcast satellite (or communication satellite), 300 . . . broadcast station server, 400 . . . service provider server, 500 . . . other application server, 600 . . . mobile phone communication server, 600b . . . base station, 700 . . . portable information terminal.

The invention claimed is:

1. A content receiving apparatus comprising:
a first content receiver configured to receive contents and control information regarding content protection for the contents received by the first content receiver, which are transmitted in a first transmission method;
a second content receiver configured to receive contents and control information regarding content protection for the contents received by the second content receiver, which are transmitted in a second transmission method, the second transmission method being different from the first transmission method;
a storage configured to store the contents received by the first content receiver or the second content receiver;
a first video output interface configured to output, to first external equipment, video of the contents received by the first content receiver or the second content receiver, or video of the contents stored by the storage;
a second video output interface configured to output, to second external equipment, video of the contents received by the first content receiver or the second content receiver, or video of the contents stored by the storage, the second video output interface being a different type of interface from the first video output interface;
an infrared communication interface; and
a controller configured to control content protecting processes for the storage, the first video output interface, or the second video output interface,
wherein a first type of content protection is applicable for the first video output interface,
wherein at least two levels of content protection in the first type of content protection are applicable for the first video output interface,
wherein a second type of content protection is applicable for the second video output interface, the second type of content protection being different from the first type of content protection,
wherein at least two levels of content protection in the second type of content protection are applicable for the second video output interface,
wherein control states of the storage, the first video output interface, and the second video output interface controlled by the controller include:
a first video outputting process state in which the storage does not store the contents and the contents are outputted from the first video output interface to the first external equipment;
a storing process state in which the storage stores the contents; and
a second video outputting process state in which the contents are outputted from the first video output interface to the first external equipment, or from the second video output interface to the second external equipment, after a storing process for the contents by the storage,
wherein the controller is configured to execute switching of the levels of the content protecting processes for the first video output interface in accordance with a number of pixels of the video of the contents received by the first content receiver in the first video outputting process state,
wherein the controller is configured to execute switching of the levels of the content protecting processes for both the first video output interface and the second video output interface in accordance with the number of pixels of the video of the contents in the second video outputting process state,
wherein the number of pixels of a threshold value to execute the switching of the levels of the content protecting processes is equal between the first video outputting process state and the second video outputting process state, wherein the content protecting processes in the first video outputting process state and the second video outputting process state for the contents with a number of pixels that is equal to or less than the number of pixels of the threshold value in the contents received by the first content receiver is common to the content protecting processes in the first video outputting process state and the second video outputting process state for the contents received by the second content receiver, for each of the first video output interface and the second video output interface, and wherein the second video output interface is a LAN interface.

2. The content receiving apparatus according to claim 1, wherein the at least two levels of content protection in the second type of content protection include DTCP-IP content protection and DTCP2 content protection.

3. The content receiving apparatus according to claim 1, wherein the LAN interface is a wireless LAN interface.

4. The content receiving apparatus according to claim 1, wherein the first video output interface is an HDMI interface.

5. The content receiving apparatus according to claim 4, wherein the first type of content protection includes HDCP content protection.

6. A content receiving apparatus comprising:
a first content receiver configured to receive contents and control information regarding content protection for the contents received by the first content receiver, which are transmitted in a first transmission method;
a second content receiver configured to receive contents and control information regarding content protection for the contents received by the second content receiver, which are transmitted in a second transmission method, the second transmission method being different from the first transmission method;
a storage configured to store the contents received by the first content receiver or the second content receiver;
an HDMI interface configured to output, to first external equipment, video of the contents received by the first content receiver or the second content receiver, or video of the contents stored by the storage;
a LAN interface configured to output, to second external equipment, video of the contents received by the first content receiver or the second content receiver, or video of the contents stored by the storage, the LAN interface being a different type of interface from the HDMI interface;
an infrared communication interface;
a controller configured to control content protecting processes for the storage, the HDMI interface, or the LAN interface;
a non-volatile memory configured to store operating software; and
a random access memory configured to be used for the operating software,
wherein a first type of content protection is applicable for the HDMI interface, wherein at least two levels of content protection in the first type of content protection are applicable for the HDMI interface,
wherein a second type of content protection is applicable for the LAN interface, the second type of content protection being different from the first type of content protection,
wherein at least two levels of content protection in the second type of content protection are applicable for the LAN interface,
wherein control states of the storage, the HDMI interface, and the LAN interface controlled by the controller include:
a first video outputting process state in which the storage does not store the contents and the contents are outputted from the HDMI interface to the first external equipment;
a storing process state in which the storage stores the contents; and
a second video outputting process state in which the contents are outputted from the HDMI interface to the first external equipment, or from the LAN interface to the second external equipment, after a storing process for the contents by the storage,
wherein the controller is configured to execute switching of the levels of the content protecting processes for the HDMI interface in accordance with a number of pixels of the video of the contents received by the first content receiver in the first video outputting process state,
wherein the controller is configured to execute switching of the levels of the content protecting processes for both the HDMI interface and the LAN interface in accordance with the number of pixels of the video of the contents in the second video outputting process state,
wherein the number of pixels of a threshold value to execute the switching of the levels of the content protecting processes is equal between the first video outputting process state and the second video outputting process state, and
wherein the content protecting processes in the first video outputting process state and the second video outputting process state for the contents with a number of pixels that is equal to or less than the number of pixels of the threshold value in the contents received by the first content receiver is common to the content protecting processes in the first video outputting process state and the second video outputting process state for the contents received by the second content receiver, for each of the HDMI interface and the LAN interface.

7. The content receiving apparatus according to claim 6, wherein the at least two levels of content protection in the second type of content protection include DTCP-IP content protection and DTCP2 content protection.

8. The content receiving apparatus according to claim 6, wherein the LAN interface is a wireless LAN interface.

9. The content receiving apparatus according to claim 6, wherein the first type of content protection includes HDCP content protection.

* * * * *